(12) United States Patent
Lem et al.

(10) Patent No.: US 6,214,908 B1
(45) Date of Patent: Apr. 10, 2001

(54) COMPOSITION CONTAINING NOVEL MODIFIER

(75) Inventors: Kwok Wai Lem, Randolph; Alan Letton, Morristown, both of NJ (US); Thomas Paul John Izod, Midlothian, VA (US); Francis Stephen Lupton, Evanston, IL (US); William Brian Bedwell, Chicago, IL (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/356,622

(22) Filed: Jul. 19, 1999

Related U.S. Application Data

(60) Provisional application No. 60/094,949, filed on Jul. 31, 1998.

(51) Int. Cl.$^7$ .................................................. C08L 95/00
(52) U.S. Cl. .................. 524/59; 524/59; 524/68; 524/70; 524/71; 524/425; 521/49.8; 521/40; 428/489
(58) Field of Search ................................ 524/59, 68, 70, 524/71, 425, 426; 428/489; 521/49.8, 40

(56) References Cited

U.S. PATENT DOCUMENTS

| | | | |
|---|---|---|---|
| H1250 | 11/1993 | Gilmore et al. | 524/68 |
| 4,328,147 | 5/1982 | Chang et al. | 524/59 |
| 4,547,399 | 10/1985 | Fujihara et al. | 427/138 |
| 4,835,199 | 5/1989 | Futamura et al. | 524/66 |
| 5,002,987 | 3/1991 | Schulz | 524/60 |
| 5,032,640 | * 7/1991 | Fachini | 524/426 |
| 5,437,923 | * 8/1995 | Kalkanoglu | 428/489 |
| 5,451,621 | 9/1995 | Usmani et al. | 524/68 |
| 5,498,667 | 3/1996 | David et al. | 525/166 |
| 5,518,188 | 5/1996 | Sharer | 241/14 |
| 5,626,939 | 5/1997 | Kotlair et al. | 428/97 |
| 5,665,447 | 9/1997 | Greaves et al. | 428/68 |
| 5,681,952 | 10/1997 | Sifniades et al. | 540/540 |
| 5,702,199 | 12/1997 | Fishback et al. | 404/17 |
| 5,710,196 | 1/1998 | Willard | 524/68 |
| 5,744,524 | 4/1998 | Manandhar et al. | 524/70 |
| 5,899,034 | * 5/1999 | Vermilion et al. | 52/219 |

FOREIGN PATENT DOCUMENTS

| | | |
|---|---|---|
| 57-044661 | 3/1982 | (JP) . |
| WO 97/20813 | 6/1997 | (WO) . |

* cited by examiner

*Primary Examiner*—Peter A. Szekely
(74) *Attorney, Agent, or Firm*—Melanie L. Brown; Virginia S. Andrews; Roger H. Criss

(57) ABSTRACT

A composition comprising a binder and a residue wherein the residue comprises a blend of polypropylene, styrene butadiene rubber and calcium carbonate. The residue is a novel material derived as a coproduct from the medium-pressure depolymerization of nylon 6 carpet. The compositions are useful as road asphalt, asphalt roof membranes, molding compounds, and plastic lumber such as palisades and spacers.

15 Claims, 39 Drawing Sheets

FIGRUE 22

US 6,214,908 B1

COMPOSITION CONTAINING NOVEL MODIFIER

RELATED APPLICATIONS

This application claims the priority date of provisional application Ser. No. 60/094,949, filed Jul. 31, 1998.

BACKGROUND OF THE INVENTION

1. Field of the Invention

This invention relates to a composition containing a binder and a modifier. More specifically, this invention relates to a composition containing a binder and a modifier which is a novel material derived as a coproduct from the medium pressure depolymerization of nylon 6 carpet. The compositions are useful as road asphalt, roof membranes, molding compounds, and plastic lumber.

2. Brief Description of Related Art

Asphalt is commonly used as a roadway material due to its low material cost and ease of application. In general, maintenance is required to repair cracks and holes in the pavement, often at significant costs. This has become a major issue for our nation in recent years due to higher traffic volumes, increased loads and higher tire pressures. Clearly, improved overall performance grades of asphalt which will lead to a reduction in maintenance costs are desirable. The performance improvements, however, have to be achieved in a manner that does not increase significantly the base asphalt paving economics.

It is known that a variety of polymer additives, such as polyethylene and thermoplastic elastomers, can improve the level of field performance of asphalt. The use of polyethylene as a modifier improving rheological properties for paving asphalt has been disclosed in, for example, D. N. Little and G. Legnani, (1989). The use of polyethylene as a modifier for roofing asphalt to increase coating viscosity and hardness has been disclosed in, for example, U.S. Pat. No. 4,328,147. The addition of elastomers to asphalt has been shown to improve flow characteristics and reduce cracking of the asphalt, especially at low temperatures due to heavy loads. U.S. Pat. Nos. 4,547,399, 4,835,199, and 5,002,987 exemplify the use of elastomers in asphalt. U.S. Pat. No. 5,744,524 teaches a polymer-modified asphalt which further comprises a dispersing agent to generate a polymer modified asphaltic composition with good dispersion characteristics. A. Usmani (1996) teaches a carboxylated monomer/polymer additive to a filled, polypropylated asphalt to improve thermostability. Addition of elastomers, however, presents difficulties at higher use temperatures as the asphalt becomes sticky, and rutting occurs in high traffic areas of the roadway. Solutions to this problem are sought by adding graft copolymer resins comprising a rubbery polymeric substrate and a rigid polymeric superstrate, as described for example in U.S. Pat. No. 5,710,196.

Asphalt is an inexpensive thermoplastic and, therefore, the inclusion of costly polymer additives is economically unattractive despite the property gains observed. Therefore, polymer additives are as yet not widely used in asphalt paving despite the improvements they impart in pavement properties such as crack resistance and reduced rutting. The use of less costly plastic modifiers derived from waste polymer sources is an option being studied by a number of investigators, for example, in V. J. Peters and D. V. Holmquist (1992), and U.S. Pat. No. 5,702,199. The use of waste carpet material as a modifier for asphalt has been disclosed in U.S. Pat. No. 5,665,447 and in G. S. Gordon et al. (1993), and as a modifier for concrete in Y. Wang et al. (1993). None of these three disclosure teaches nor suggests the use of coproduct produced in medium-pressure depolymerization of nylon waste carpet as a modifier for compositions.

SUMMARY OF THE INVENTION

In this invention, the addition of coproduct, a unique blend of predominantly polypropylene (PP), styrene butadiene rubber (SBR) and calcium carbonate ($CaCO_3$), leads to a significant improvement in the performance of the asphalt. The unique combination of the three main components results in a range of asphalt property enhancements that are not achievable by simple physical combination of the individual components. In addition, the coproduct, since it is derived from recycled carpet through a novel process, has a very favorable cost position compared to other polymer-based asphalt modifiers.

The solution to the problem in the art is a composition comprising a binder and a residue wherein the residue comprises a blend of polypropylene, styrene butadiene rubber and calcium carbonate. The residue is a unique coproduct derived from the medium-presssure depolymerization of nylon 6 carpet, a novel process taught in commonly-assigned U.S. Pat. No. 5,681,952.

In one preferred embodiment, coproduct is mixed with hot asphalt as the binder. The level of coproduct added to the asphalt is between about 0.5 weight % (wt %) to about 80 wt %, more preferably between about 2 wt % to about 50 wt % and most preferably between about 5 wt % to about 30 wt %. This embodiment results in a significant reduction in the creep stiffness and improvement of the Theological properties at both high and low temperature in the resultant binder-residue composition compared to the binder alone. For instance, healing, the rebonding of microcracks during rest periods between loads, is improved in this embodiment. Addition of aggregate to this embodiment yields a composition useful for paving applications.

In another preferred embodiment, coproduct is mixed with a plastic as the binder. The level of coproduct added to the plastic is between about 0.5 wt % to about 80 wt %, more preferably between about 2 wt % to about 70 wt %, and most preferably between about 9 wt % to about 60 wt %.

In another preferred embodiment, coproduct is mixed with a thermoset polyester as the binder. The level of coproduct added to the plastic is between about 0.5 wt % to about 80 wt %, more preferably 2 wt % to about 50 wt %, and most preferably about 5 wt % to about 20 wt %.

DETAILED DESCRIPTION OF THE PREFERRED EMBODIMENTS

The term "binder" as used herein refers to any material which functions to hold together residue in a solid state or mass, as the result of cooling, heating, or curing. Thus, binder includes: bitumen, which includes asphalt and coal tars; polymers, elastomers and rubbers, thermosets, thermoplastics, and liquid crystalline polymers, and mixtures, blends, and copolymers thereof. Thermosets include: thermoset polyester, vinyl ester resins, phenolic resins, silicone resins, epoxy resins, furan resins, polyurethane resins, aminoplastics such as urea-formaldehyde resin, melamine-formaldehyde resin, cyanate ester resins, and etc. Thermoplastics include: polyolefins such as low density polyethylene (LDPE), high density polyethylene (HDPE), polypropylene, polystyrene, acrylic plastics such as poly (methyl methacrylate), poly(vinyl chloride), poly(vinyl acetate), polyamide and polyimide such as nylon 66, aromatic nylon such as Kevlar®, polyacetal, polycarbonates, etc. Also included are the thermoplastics that have derivatives containing p-phenylene groups such as polyphenylenes ethers, polyphenylene sulfides, polysulfones, and polyester resins such as poly(ethylene terephthalate), and poly (butylene terephalate), polycaprolactones, etc. Also included are liquid crystal polymers such as thermotropic and lyotropic polymers such as liquid crystal polyesters and amides, etc. Mixtures, blends, and copolymers thereof which includes waste streams from, for instance, recycling facilities are also included. Binder excludes caprolactam.

The term "residue" as used herein refers to the novel coproduct of the medium pressure depolymerization of nylon 6 waste carpet, using no added catalyst, taught in commonly-assigned U.S. Pat. No. 5,681,952, hereby incorporated by reference. Coproduct comprises calcium carbonate, styrene butadiene rubber and polypropylene, the main components of whole carpet backing material. Coproduct comprises essentially no residual nylon 6 polyamide material, that is, less than about 5% residual nylon 6 material, and preferably less than about 1% residual nylon 6 polyamide material. Coproductmay contain up to about 5% or other polymers including polyester, nylon 66 and other minor degraded polymer components found in commercially-available carpets. "Residue" and "coproduct" are used interchangeably herein.

Figure 1:
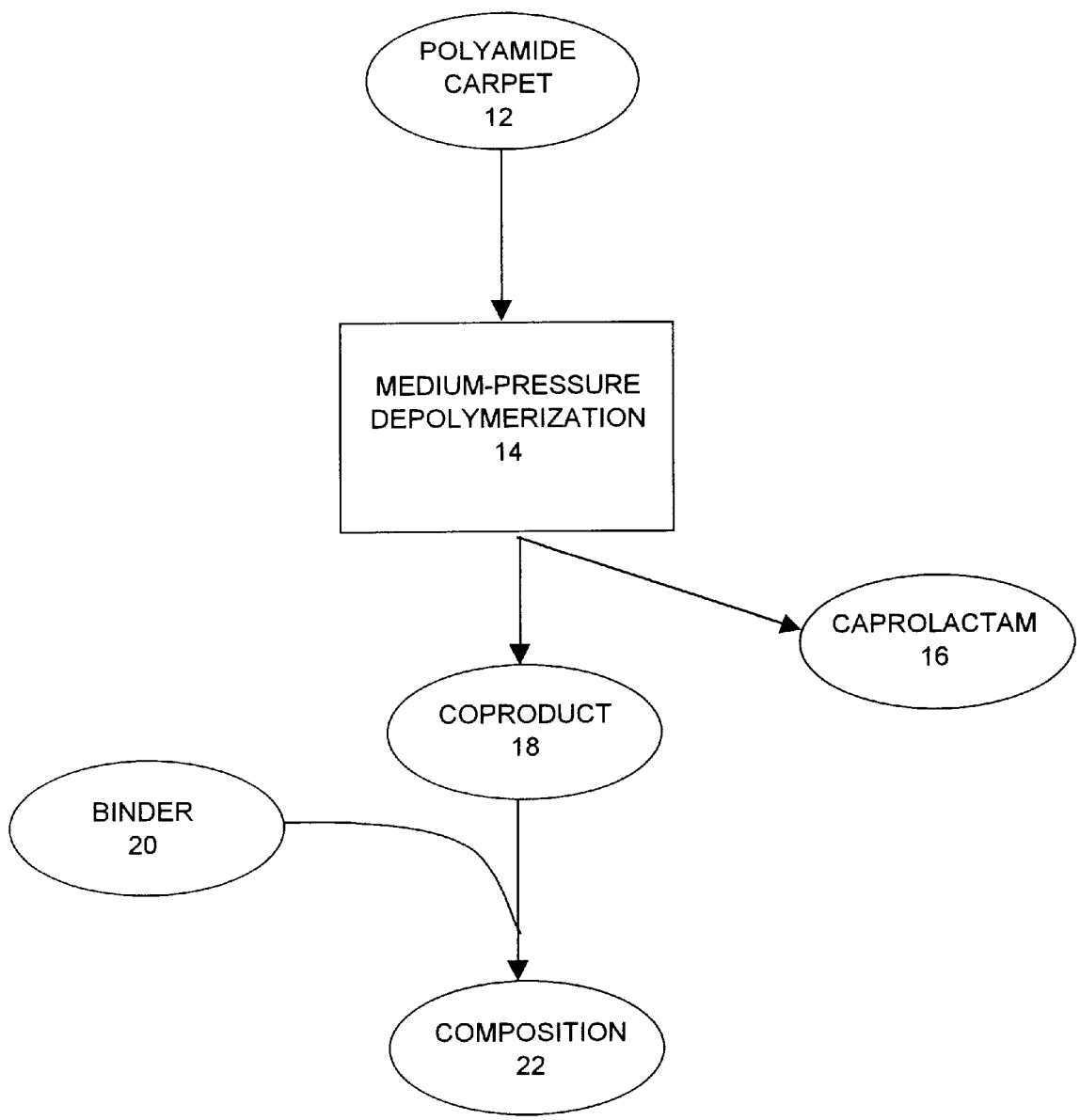
FIG. 1 shows a schematic diagram of the invention.

Coproduct is the critical component to this invention. Coproduct is a solid at room temperature and is produced in the medium pressure depolymerization process described in commonly-assigned U.S. Pat. No. 5,681,952. As illustrated in the schematic in FIG. 1, in the abovementoned process, shredded carpet 12, having polyamide face fiber, is converted via depolymerization 14 into two products: high purity epsilon caprolactam 16 and a solid residue 18, referred to in this invention as coproduct. It has been found through extensive experimentation that coproduct can be added to a variety of binders 20 to create novel and useful compositions 22.

To understand the composition of coproduct, an appreciation of the initial carpet construction is helpful. Carpet is a composite material comprising a face fiber, such as nylon 6, nylon 66, polypropylene, woven through a primary backing typically made of polypropylene. A secondary backing, again typically made of polypropylene, is attached to the primary with an adhesive layer of styrene butadiene rubber latex filled with calcium carbonate. The polypropylene/ styrene butadiene rubber latex construction accounts for approximately 95% of all residential and commercial carpets in the United States. A typical composition of a carpet shows the face fiber at 45% by weight, calcium carbonate at 35% by weight, styrene butadiene rubber at 9% by weight, and the polypropylene at 11% by weight. The medium-pressure depolymerization process (U.S. Pat. No. 5,681,952) converts the nylon 6 fraction of the carpet into epsilon caprolactam. The remaining components of the carpet, mainly polypropylene, styrene butadiene rubber and calcium carbonate are formed into a unique blend, referred to as coproduct. As a result of the extreme conditions encountered during the depolymerization, these non-nylon components undergo some level of mixing and possible chemical modification. As such the resulting coproduct is a unique blend of the three main non-nylon components. A typical composition for the coproduct is about 63% calcium carbonate, about 18% polypropylene and about 19% styrene butadiene rubber by weight. The manner in which these three main components are combined is critical to the coproduct's ability to modify the properties of asphalt. In no way should coproduct be considered as a physical mix of the three components. Analysis by microscopy, solvent extraction, thermal gravimetric analysis (TGA) and Fourier transform infrared spectroscopy (FTIR) shows that the calcium carbonate particles are essentially coated with styrene butadiene rubber. Also, from gel permeation chromatography, the polypropylene fraction has a significantly reduced molecular weight and narrowed molecular weight distribution compared to the molecular weight and molecular weight distribution of the polypropylene fraction prior to depolymerization. In addition, infrared studies suggest that the carbon-carbon double character of the SBR latex has changed (for instance, by hydrogenation). In other words, the conditions encountered in the proprietary depolymerization process create a unique blend of the three main components that make up coproduct.

Asphalt is a complex mixture of hydrocarbons derived from the fractional distillation of crude oil where the heaviest residue is processed into different grades of asphalt. An elemental analysis of asphalt shows that the composition by weight is approximately 82–86% carbon, 8–11% hydrogen, 1–1.5% oxygen, and 1–6% sulfur, with trace amounts of nitrogen, vanadium, nickel and iron (S. J. Rozeveld et. al., 1997). Asphalts are typically divided into four main groups: asphaltenes, resins, aromatics and saturates (Whiteoak, 1990). Asphaltenes are the highest molecular weight constituents, being highly polar complex aromatic materials. Asphaltenes constitute 5–25% of the total asphalt and have a hydrogen/ carbon ratio of 1.1:1. Asphaltenes are believed to be sheets of aromatic and naphthenic ring structures held together by hydrogen bonds (Altgen and Harle,1975). Resins are very polar in nature and act as a dispersing agent for the asphaltenes. The aromatics and saturates are the lightest molecular weight group in asphalt. The aromatics are the lowest molecular weight naphthenic compounds, and the saturates consist of both aliphatic hydrocarbons and alkyl naphthenes and alkyl aromatics. Together, the aromatics and saturates (oily phase) constitute the major portion of asphalt (40–50%). Asphalt is often regarded as a colloidal system consisting of high molecular asphaltenes/resin micelles dispersed in a lower molecular weight oily medium.

Asphalt binder, modified or not, is typically mixed with aggregate to produce an asphalt mixture. "Aggregate" refers to stones or gravel. The performance of asphalt cement-aggregate systems (asphalt concrete) is influenced by the Theological properties of the asphalt binder as well as other factors including mix composition, aggregate properties, and void content. Pavement grade asphalt concrete undergo a short cyclic load under normal service conditions, and a large accumulation of permanent strain will develop over time, leading to failure. The areas of importance critical to the long term performance of flexible pavements are a). stiffness and stiffness-temperature relationships, b). fatigue resistance, c). permanent deformation resistance, d). low-temperature cracking resistance, and e). strength characteristics.

To test the performance changes of asphalts containing varying levels of additive the specifications and procedures set down in the Strategic Highway Research Program (SHRP) "Background of SUPERPAVE™ ASPHALT BINDER TEST METHODS", hereby incorporated by reference to the extent necessary to complete this disclosure, were followed. The tests performed included: penetration (hardness), dynamic shear rheometry (DSR), rotational viscometry (RV), bending beam rheometry (BBR), and direct tension tester (DTT). The asphalt mixtures are aged following the two SHRP procedures, rolling thin film oven (RTFO) and pressure aging vessel (PAV). These procedures are intended to simulate hardening (durability) characteristics. After both types of aging, the asphalt mixtures are re-tested using the SHRP tests listed above. All the tests were done at the Texas Transporation Institute (TTI).

The asphalt compositions of the present invention can be prepared by techniques known in the art These techniques include both low and high shear mixing techniques, preferably carried out at elevated temperatures. The temperature used should not exceed the degradation temperature of the asphalt, although it may vary based on the chemical composition of the asphalt. The coproduct may be added as a dry material. Its size may be reduced as desired by any method known in the art.

The other compositions of the present invention likewise may be prepared by techniques known in the art. Elevated temperature, if used, should not exceed the degradation temperature of the binder, and may vary accordingly. The coproduct may be added as a dry material. Its size may be reduced as desired by any method known in the art.

Testing Methods

The hardness/penetration test was performed according to ASTM D-5. Each specimen was tested at 100 grams force for 5 seconds at 77° F. (25° C.).

Dynamic shear rheometry (DSR) using a Bohlin Rheometer CVO instrument was used to characterize the viscous and elastic behavior of samples by measuring the complex shear modulus ($G^*$) and phase angle ($\delta$) at a fixed frequency of 10.08 radians per second (rad/s). The measurement was done according to the guidelines in "Background of SUPERPAVE™ ASPHALT BINDER TEST METHODS". The following fixed parameters were used throughout the examples that related to the DSR measurement: 12% strain amplitude; 25 millimeter (mm) plate diameter; 1 mm plate gap; and 5 minutes equilibrium time.

Bending beam rheometry (BBR) was performed using a Thermoelectric Bending Beam Rheometer from Cannon Instrument Company and was done according to the guidelines in "Background of SUPERPAVE™ ASPHALT BINDER TEST METHODS". This test uses engineering beam theory to measure stiffness of a small asphalt beam sample under a creep load of 980 milli-Newton (mN) (100 gram) force. The beam dimensions were: length was 125 mm, width was 12.70 mm and thickness was 6.35 mm. The force calibration constant for the rheometer was 0.149 mN/bit with a deflection constant of 0.16 micrometer per Newton. The sample beam was placed in a freezer at $-10°$ C., then quickly transferred to a testing chamber at $-16°$ C. The soak time at $-16°$ C. was 30 minutes. A 1997 version of the Cannon BBW w 1.0 software was used for data computation.

To measure complex viscosity, G' and G", a Rheometrics RDA-II was used to measure dynamic properties of the various asphalt samples as a function of frequency and temperature. A 2000 g-cm force rebalance torque transducer was used, along with 25 mm parallel plates. The frequency range was 0.1 rad/s to 100 rad/s with five points per decade. The temperature range used was $-40°$ C. to $30°$ C. with $5°$ C. steps. The plate gap was 4 mm. The frequency/temperature sweep data were analyzed with Rheometrics' TTS package contained in the Orchestrator® operating software. Mastercurves were generated from the raw data using horizontal shifting, residual minimization as the computational method, cubic spline interpolation, and the highest accuracy setting.

$^{13}C$ solid-state NMR spectra were acquired under conditions of cross-polarization and magic-angle spinning (CPMAS) at spinning speeds ranging from 3–5 kHz on a Chemagnetics CMX-300 solid-state NMR spectrometer. $^{13}C$ spin-lattice relaxation rates in the rotating frame were measured by employing a spin lock following cross-polarization with a 45 kHz spin locking field. No $^{1}H$ decoupling was applied during the spin lock, however, decoupling was applied during the acquisition of the signal.

RTFO-aging and PAV-aging were performed in accordance with "Background of SUPERPAVE™ ASPHALT BINDER TEST METHODS". The temperature was controlled to the nearest $0.1°$ C.

Permanent deformation of asphalt and gravel mixtures was assessed by evaluating the potential for the mixtures to deform under repeated load triaxial testing at $40°$ C. with no confinement and a repeated deviatoric stress of 35 kPa. Deformation was recorded by means of two linear variable differential transformers (LVDT) positioned 180 degrees apart. Testing was performed using a servo-hydraulic MTS machine.

In order that those skilled in the art will be better able to practice the invention, the following examples are given by way of illustration and not by way of limitation.

EXAMPLES

Coproduct Characterization

To characterize the chemical and physical properties of the coproduct, the following instrumental techniques were employed: elemental analysis, TGA, gel permeation chromatography (GPC), FTIR, rheometry, and calorimetry. Samples of carpet backing layer were also subjected to GPC and FTIR for comparison purposes.

Elemental Analysis of the Coproduct

The level of calcium was established via a standard method (SW846/601 0), using an Inductive Couple Plasma (ICP) technique. Four samples of the coproduct were taken at distinctly different times during the operation of the depolymerization pilot plant. The results of the calcium analysis are shown in Table 1, expressed as calcium carbonate. These results reflected the variability of the post-consumer carpet feedstock typically provided to the depolymerization pilot plant. An average value of about 63 wt % in the coproduct was observed.

TABLE 1

|  | Sample 1 | Sample 2 | Sample 3 | Sample 4 |
| --- | --- | --- | --- | --- |
| $CaCO_3$, wt % | 58.1 | 58.4 | 61.8 | 70.7 |

Characterzation of Coproduct by TGA

The TGA experiments were conducted using a Seiko Instrument RTG 220 thermal analyzer. About 15 milligrams of sample was placed in a platinum pan, and the material was heated from about $23°$ C. to $1000°$ C. at a heating rate $10°$ C./min under an air atmosphere. The air source was bottled compressed air. The flow rate of the air was maintained at 200 milliliter per minute (ml/min) during the experiment.

The weight loss and the rate of weight loss of ground coproduct in air revealed five steps in the decomposition. The temperatures and corresponding weight loss percentages of these five steps are shown in Table 2. The first three steps may account for the decomposition of polyolefins (such as polypropylene) and SBR; the fourth is due to the oxidation of char/carbon residue into carbon dioxide; the fifth step is the decomposition of $CaCO_3$ to CaO and $CO_2$. TGA of coproduct passed once, twice or three times through a cage mill showed the same steps of decomposition and similar weight losses at each step.

TABLE 2

|  |  | Weight Loss @ Temperature (° C.), Wt % | | | | | Temperature (° C.) at Maximum Rate of Weight Loss | | | | |
| --- | --- | --- | --- | --- | --- | --- | --- | --- | --- | --- | --- |
|  |  | ≦38 | 349 | 499 | 600 | 1000 | 1 | 2 | 3 | 4 | 5 |
| Ground coproduct |  | 0.0 | −10.0 | −30.8 | −34.7 | −60.5 | 313 | 425 | 456 | 517 | 732 |
| Cage- | 1 Pass | 0.0 | −10.3 | −30.4 | −34.9 | −60.3 | 325 | 450 | 463 | 525 | 731 |
| milled | 2 Passes | 0.0 | −11.5 | −31.6 | −36.2 | −61.6 | 325 | 432 | 456 | 525 | 734 |
| coproduct | 3 Passes | 0.0 | −10.5 | −31.1 | −35.8 | −61.0 | 335 | — | 460 | 525 | 734 |

Both PP and SBR could have been carbonized, yielding a low amount of char, before the material is oxidized to form $CO_2$ at temperature above $400°$ C. The decomposition of $CaCO_3$ to CO (the weight loss at $1000°$ C.) provided an estimate of the inorganic fraction of the coproduct.

Both the elemental analysis and the TGA confirmed that coproduct has an inorganic fraction which is approximately 63% of the total coproduct composition. Also, the TGA results support the claim that the coproduct is an inextricable mixture of the three major components.

Determination of Molecular Weight Parameters by GPC

The molecular weight distribution of the PP in two samples each of the original carpet backing and the coproduct was determined by GPC. The GPC analysis was performed on a Waters 150C. instrument with two PLgel linear mixed-B columns at 135° C. The mobile phase was 1,2,4-Trichlorobenzene at a flow rate of 1.0 ml/min, and the sample injection volume was 200 microliter ($\mu$l). The dissolution of samples was carried out at 150° C. on a wrist action shaker for 16 hours. All samples were analyzed with a refractive index detector and calibrated against universal polypropylene standards. The data analysis of the chromatograms was handled with Nelson 2600 system software. The GPC results are listed in Table 3 and are shown graphically in FIG. 2.

a minor component. Table 4 lists peaks identifying each component.

TABLE 4

| Component | IR Peaks (cm$^{-1}$) |
| --- | --- |
| CaCO$_3$ | 2518, 1796, ~1450 (broad), 874 |
| PP | 2929, 1462, 1378, 1160, 999, 973, 899, 840, 809 |
| SBR | 3060, 3020, 756, 699 |

The FTIR analysis showed that washing with methylene chloride removed SBR, but left the ratio of PP to CaCO$_3$ unchanged. Subtracting the "after" washing spectrum from the "before" washing spectrum and normalizing (i.e. removing) the CaCO$_3$ and PP components of the spectrum showed the difference in relative levels of SBR. In addition, there was another series of peaks corresponding to a low level of nylon indicating that not all the nylon was converted to caprolactam in the depolymerization process.

TABLE 3

| Sample ID | Mz$^1$ | Mpeak$^2$ | M$_w^3$ | M$_n^4$ | M$_w$/M$_n$ | Mz/M$_w$ | Mhh+/Mhh-$^5$ |
| --- | --- | --- | --- | --- | --- | --- | --- |
| Carpet Back Sample #1 | 255,500 | 107,500 | 127,100 | 32,900 | 3.9 | 2.0 | 8.3 |
| Carpet Back Sample #2 | 245,400 | 101,000 | 125,000 | 34,900 | 3.6 | 2.0 | 8.4 |
| Coproduct Sample #1 | 17,300 | 8,200 | 10,000 | 4,500 | 2.2 | 1.7 | 7.7 |
| Coproduct Sample #2 | 17,100 | 8,100 | 9,700 | 4,100 | 2.4 | 1.8 | 7.8 |

$^1$"Mz" is the Z and Z + 1 average molecular weight.
$^2$"Mpeak" is the maximum peak value from a differential molecular distribution curve.
$^3$"M$_w$" is the weight average molecular weight in daltons.
$^4$"M$_n$" is the number average molecular weight in daltons.
$^5$"Mhh+/Mhh-" is the ratio of molecular weights at the half height of the polymer distribution.

Figure 2:
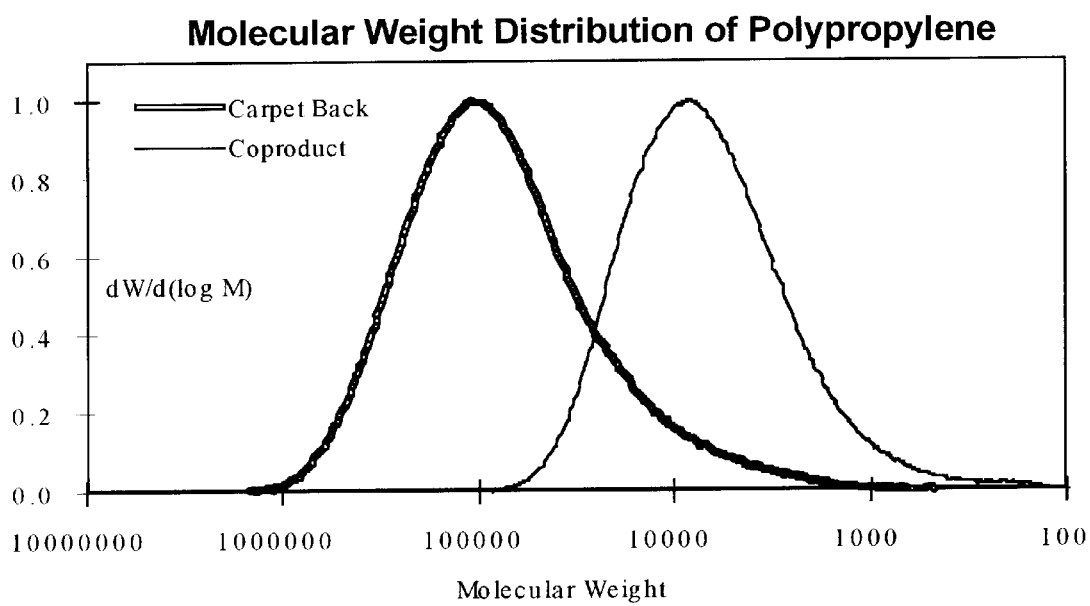
FIG. 2 shows a plot of polypropylene molecular weight distributions for carpet backing and coproduct.

It can be seen from Table 3 and FIG. 2, that as a result of the depolymerization process, the PP was degraded with a molecular weight reduction of an order of magnitude. The PP polydispersity, M$_w$/M$_n$ was reduced from about 3.75 to 2.3 as a result of conditions in the depolymerizabon reactor. These results were consistent with the expectation from the literature on polypropylene degradation.

FTIR Analysis of Coproduct

Coproduct was analyzed using an FTIR (Bruker Model FTS 88) spectrometer. Coproduct samples were analyzed before and after extraction with methylene chloride. Reference pieces of the original carpet backing were also analyzed. The extraction was as follows: 5 wt % of ground coproduct was added to methylene chloride in a sealed glass tube. The mixture was agitated at 24° C. for 24 hours. The liquid phase was decanted and the same amount of fresh methylene chloride was added to the glass tube. This was repeated three times.

The dried, washed coproduct samples were analyzed in powder form either as the bulk powder or as a 3% mixture in potassium bromide (KBr) using a diffuse reflectance sampling accessory. Analysis of the coproduct bulk powder produced a non-linear absorbancy response, with weaker peaks appearing to be more intense than they should be. Mixing the powdered coproduct sample with KBr powder reduced this effect.

The IR spectra of the coproduct sample before and after washing with methylene chloride show that the major components in both samples were CaCO$_3$ and PP with SBR as There was a weak, broad absorbency in the region ~1760–1650 cm$^{-1}$ that is not due to the nylon. This absorbency may indicate a low level oxidation of the PP.

Determination of Flow Behavior of Coproduct by Rheometery

Figure 3:
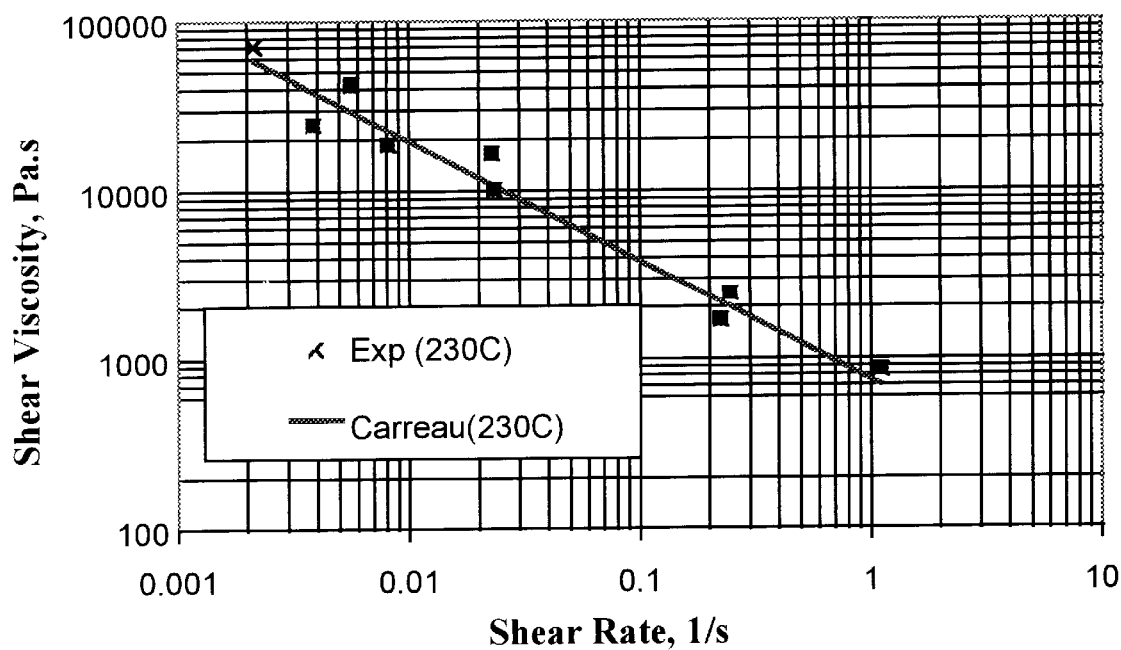
FIG. 3 shows a plot of coproduct flow behavior at 230° C.

The flow behavior of coproduct at 170° C., 190° C., and 230° C. was evaluated using a Rheometrics RDA-II, a parallel plate rheometer. The parallel plates were 25 mm with a gap of 4 mm. The coproduct sample was kept at the desired temperature for about 5 minutes prior to the test. The flow behavior data at 230° C. of the molten coproduct is shown in FIG. 3. The flow behavior of the coproduct was highly shear thinning even at relatively low shear rates. Such behavior can be fitted well to Carreau's model (Tadmor and Gogos, 1979) in Eq. (1)

$$\eta(\gamma) = \mu_0 \{1 + (\kappa_1 \gamma)^{782}\}^{(\kappa_3 - 1)/\kappa_2} \qquad (1)$$

where $\mu_0$ is the zero shear viscosity, $\gamma$ is the shear rate, and $\kappa_1$, $\kappa_2$, and $\kappa_3$ are constants. The parameters $\mu_0$, $\gamma$, $\kappa_1$, $\kappa_2$, and $\kappa_3$, in the Carreau's model are listed in Table 5 for coproduct at all three temperatures; units for the parameters are provided, unless the parameter is dimensionless. Also listed is R$^2$ which is a measure of the goodness of fit of the data to the model.

TABLE 5

Parameters for Carreau's model

| Temp, °C. | Shear Rate Range, 1/s | $\mu_0$, Pa·s | $\kappa_1$, s | $\kappa_2$ | $\kappa_3$ | $R^2$ |
|---|---|---|---|---|---|---|
| 170 | 0.000065–0.0056 | $1.22 \times 10^7$ | 0.00105 | 0.1810 | −6.9718 | 0.9352 |
| 190 | 0.00011–0.0059 | $2.334 \times 10^6$ | 1402.4 | 0.3883 | −0.0705 | 0.9946 |
| 230 | 0.00213–1.0989 | $1.678 \times 10^6$ | $5.303 \times 10^4$ | 2.5985 | 0.2901 | 0.9282 |

Determination of Heat Content

The coproduct samples were sent to Froehling & Robertson, Inc. for determination of its heat content (BTU) by ASTM 2015-85. The heat content of the samples ranged from 6100 BTU/lb to 6914 BTU/lb of coproduct. An average value of 6600 BTU/lb was established. This level of heat content makes coproduct attractive as an alternative fuel source, eg. in cement manufacturing.

Experiment 1: Asphalt Binders

Four types of asphalts, utilized in the Strategic Highway Research Program (SHRP), were employed as binders in the invention and were the Comparative Examples (Comp. Ex.). The SHRP Binder Characterization and Evaluation Program selected eight asphalts, designated core asphalts and coded as AAA-1, AAB-1, AAC-1, AAD-1, AAF-1, AAG-1, AAK-1 and AAM-1, for extensive characterization. The results are available in *Binder Characterization and Evaluation Vol. 2: Chemistry*, (1993) Strategic Highway Research Program, National Research Council, SHRP-A-368. The four asphalts chosen for use herein vary in chemical and physical properties. For example, AAD has a high percent of asphaltenes, and AAG and AAM have a very low percent. AAA, AAD and AAG have similar number average molecular weights, while AAM has a much higher number average molecular weight. These are listed in Table 6 with their classification, and their performance grade (PG) as established by the SHRP. Additional information about these polymers is available in S.-C. Huang, et al. (1998).

TABLE 6

| Comp. Ex. | Name of Asphalt | Classification | Performance Grade |
|---|---|---|---|
| A | AAG | AR4000 | PG 58-10 |
| B | AAM | AC-20 | PG 64-16 |
| C | AAD | AR4000 | PG 58-28 |
| D | AAA | AC-10 | PG 58-28 |

Coproduct is fairly brittle, due to the high calcium carbonate content, and can be readily ground to redure size. In the Inventive Examples (Inv. Ex.), coproduct at three different particles sizes was mixed at different temperatures and in different amounts into three different types of asphalt binders. "Chip" was the largest particle size and "cage-milled" was the smallest particle size, being a fine powder. "Chip" is about 0.25 to 1 inch (6.35 mm to 25.4 mm) in diameter; "ground chip" is about 5 to 100 micrometer($\mu$M) and "cage-milled" is about 1 to 30 $\mu$M. The low level of 7.5 weight percent (wt %) for coproduct addition to binder represents a typical level for polyolefins being used as an additive in asphalt applications, while the high level (20 wt %) is a typical level for inorganic fillers. The weight % is the weight of coproduct divided by the sum of the weights of the asphalt and the coproduct.

Inv. Exs. 1 through 9 were prepared using a two-liter, three-neck resin reaction kettle equipped with a temperature controller and an agitator which was a two-inch helical screw impeller. The speed of the agitation was kept at about 800 revolutions per minute (rpm). About 500 grams of molten asphalt at 275° F. was discharged into the resin kettle and the material was heated to the desired temperature. When the temperature reached the desired temperature, the appropriate amount of coproduct was slowly added to the mixing kettle. After the discharge of the coproduct was complete, and the temperature returned to the desired level, mixing was continued for an additional 30 minutes. Finally, the coproduct-modified asphalt was discharged into sample containers for performance evaluation.

Inv. Exs. 10 through 13 were prepared using a two-liter Waring blender. A glass wool blanket was wrapped around the blender container to minimize heat loss. The blender container (with blanket) was placed in an oven at 180° C. for about ten minutes. About 400 grams of molten AAD asphalt (Comp. Ex. C) at 170° C. was discharged into the blender container. The desired amount of coproduct was quickly added to the container and the mixture was mixed vigorously at about 20,000 rpm. The mixing time was 1.0 minutes for Inv. Exs. 11 and 12, and 2.5 minutes for Inv. Exs. 10 and 13. In these four Inventive Examples, the temperature loss due to convection cooling was less than 10° C. The coproduct-modified asphalt was then discharged into sample containers for performance evaluation.

As part of the design of the experiment, replicate measurements were made on Inv. Ex. 1, and selected other Inventive Examples. Where more than one measurement was taken, to indicate the replicate, the measurements are labelled "i", "ii", etc as appropriate after the Inventive Example number. In addition, separate batches were prepared for some formulations; these are indicated by the Inventive Example number followed by a letter (eg. 2a).

Sediment was found in all the Inventive Examples as a result of the coproduct containing $CaCO_3$. As expected, the coproduct dispersion in asphalt improved with finer particle size, with the cage-milled coproduct having the best dispersion. At higher temperatures (190° C. vs. 150° C.), the coproduct was more readily dispersed, mostly due to the melting of the PP fraction (crystalline melting for PP is 165° C.).

Comp. Exs., A, B and C, and Inv. Exs. 1 through 9 were tested for hardness/penetration in accordance with ASTM D-5. These data are presented in Table 7.

TABLE 7

| Comp. Ex. | Inv. Ex. | Asphalt | Content wt % | Location 1 | Location 2 | Location 3 | Average | Hardness increase[6] |
|---|---|---|---|---|---|---|---|---|
| A | | AAG | 0 | 53 | 50 | 53 | 52 | — |
| | 1i | AAG | 13.0 | 40 | 40 | 40 | 40 | 23% |
| | 1ii | AAG | 13.0 | 36 | 38 | 37 | 37 | 29% |
| | 1iii | AAG | 13.0 | 38 | 39 | 38 | 38 | 27% |
| B | | AAM | 0 | 60 | 60 | 60 | 60 | — |
| | 2a | AAM | 20.0 | 25 | 26 | 24 | 25 | 58% |
| | 2b | AAM | 20.0 | 31 | 27 | 23 | 27 | 55% |
| | 3 | AAM | 7.5 | 38 | 36 | 36 | 37 | 38% |
| | 4 | AAM | 20.0 | 42 | 41 | 40 | 41 | 32% |
| | 5 | AAM | 7.5 | 35 | 34 | 35 | 35 | 42% |
| C | | AAD | 0 | 133 | 126 | 120 | 126 | — |
| | 6a | AAD | 7.5 | 90 | 91 | 86 | 89 | 29% |
| | 6b | AAD | 7.5 | 78 | 72 | 80 | 77 | 39% |
| | 7 | AAD | 20.0 | 59 | 58 | 57 | 58 | 54% |
| | 8 | AAD | 7.5 | 85 | 85 | 84 | 85 | 33% |
| | 9 | AAD | 20.0 | 68 | 66 | 66 | 67 | 47% |

[6]The hardness increase was calculated by dividing the difference between the average hardness of the unfilled asphalt and filled asphalt by the average hardness of the unfilled asphalt.

Comp. Wx. A was the hardest unfilled asphalt used in this experiment. As shown in Inv. Exs. 1i through 1iii, addition of coproduct to 13 wt % yielded an increase in hardness for this asphalt. An increase in hardness as the result of coproduct addition was also evidenced in Inv. Exs. 2 through 9. These Inventive Exs. further demonstrated that the hardness generally increased with the weight percent of coproduct.

These and subsequent data demonstrated that the dominant factor in influencing the physical properties of the modified asphalt compared to the unmodified asphalt was the extent of coproduct loading (weight percent) in the asphalt composition.

Dynamic shear rheometry was used to characterize the viscous and elastic behavior, at intermediate to high temperatures, of Comparative and Inventive Examples by measuring the complex shear modulus ($G^*$) and phase angle ($\delta$). As explained in "Background of SUPERPAVE™ ASPHALT BINDER TEST METHODS" (1994) and "SUPERPAVE™ Performance Graded Asphalt Binder Specification and Testing" (1997), high values of $G^*$ and low values of $\delta$ are needed to achieve rutting resistance. The ratio, $G^*/\sin(\delta)$, is used to incorporate both important parameters into one term for specification purposes. In Table 8, the data for the Comparative Examples measured at three different temperatures is presented. These data were fully consistent with what was expected based on their PG classification. In Table 9, the data for Inv. Exs. 1 through 13 is presented.

TABLE 8

| Comp. Ex. | Asphalt | Test Temp. | $G^*$ (kPa) | $\delta$ (degrees) | $G^*/\sin(\delta)$ (kPa) | Strain Amp (%) | Test Status[7] |
|---|---|---|---|---|---|---|---|
| A | AAG | 64° C. | 0.9622 | 90.0000 | 0.9622 | 11.8700 | Failed |
| | | 58° C. | 2.2773 | 89.6000 | 2.2773 | 11.8700 | Passed |
| | | 52° C. | 3.9038 | 89.1000 | 3.9045 | 11.7500 | Passed |
| B | AAM | 64° C. | 1.2378 | 86.9000 | 1.2378 | 12.1100 | Passed |
| | | 58° C. | n.d.[8] | n.d. | n.d. | n.d. | — |
| | | 52° C. | 6.0857 | 83.6000 | 6.1235 | 12.3500 | Passed |
| C | AAD | 64° C. | 0.6498 | 86.8000 | 0.6508 | 11.9300 | Failed |
| | | 58° C. | 1.3553 | 84.7000 | 1.3610 | 11.9800 | Passed |
| | | 52° C. | 2.8622 | 82.6000 | 2.8860 | 11.7300 | Passed |

[7]In the Performance Graded Asphalt Binder Specification (found in "Background of SUPERPAVE ™ ASPHALT BINDER TEST METHODS" or "SUPERPAVE ™ Performance Graded Asphalt Binder Specification and Testing"), the $G^*/\sin(\delta)$ must meet or exceed 1.00 kPa at the test temperature to pass.
[8]"n.d." means not determined. Given that Comp. Ex. B had a $G^*/\sin(\delta)$ value in excess of 1.00 kPa at 64° C., it is expected to pass at 58° C. as well.

TABLE 9

| Inv. Ex. | Asphalt | Content (wt %) | Test Temp. | $G^*$ (kPa) | $\delta$ (degrees) | $G^*/\sin(\delta)$ (kPa) | Strain Amp (%) | Test Status |
|---|---|---|---|---|---|---|---|---|
| 1i | AAG | 13.0 | 64° C. | 2.1137 | 86.3000 | 2.1181 | 12.140 | Passed |
| | | | 52° C. | 13.0490 | 84.000 | 13.0930 | 11.760 | Passed |
| 1ii | AAG | 13.0 | 64° C. | 1.6942 | 84.6000 | 1.7018 | 12.280 | Passed |
| | | | 52° C. | 9.4607 | 83.6000 | 9.5203 | 12.060 | Passed |

TABLE 9-continued

| Inv. Ex. | Asphalt | Content (wt %) | Test Temp. | G* (kPa) | δ (degrees) | G*/sin(δ) (kPa) | Strain Amp (%) | Test Status |
|---|---|---|---|---|---|---|---|---|
| 1iii | AAG | 13.0 | 64° C. | 1.7994 | 89.0000 | 1.7997 | 12.220 | Passed |
|  |  |  | 52° C. | 11.0780 | 87.6000 | 11.0880 | 11.730 | Passed |
| 2a | AAM | 20.0 | 64° C. | 2.9729 | 81.0000 | 3.0060 | 12.290 | Passed |
|  |  |  | 52° C. | 14.1910 | 78.8000 | 14.4660 | 12.190 | Passed |
| 2b | AAM | 20.0 | 64° C. | 3.2250 | 80.4000 | 3.2990 | 11.900 | Passed |
|  |  |  | 52° C. | 24.3300 | 76.0000 | 24.9580 | 12.190 | Passed |
| 3 | AAM | 7.5 | 64° C. | 3.1249 | 80.8000 | 3.1660 | 12.170 | Passed |
|  |  |  | 52° C. | 14.3990 | 78.2000 | 14.7090 | 12.180 | Passed |
| 4 | AAM | 20.0 | 64° C. | 6.7049 | 76.1000 | 6.9069 | 12.380 | Passed |
|  |  |  | 52° C. | 29.2290 | 74.000 | 30.5160 | 12.000 | Passed |
| 5 | AAM | 7.5 | 64° C. | 2.8090 | 82.3000 | 2.8346 | 12.010 | Passed |
|  |  |  | 52° C. | 13.9760 | 77.1000 | 14.3400 | 12.030 | Passed |
| 6a | AAD | 7.5 | 64° C. | 1.1740 | 83.9000 | 1.1810 | 12.060 | Passed |
|  |  |  | 52° C. | 4.933 | 79.3000 | 3.4870 | 12.130 | Passed |
| 6b | AAD | 7.5 | 64° C. | 1.3468 | 84.3000 | 1.3535 | 11.940 | Passed |
|  |  |  | 52° C. | 3.9310 | 78.7000 | 6.0478 | 11.900 | Passed |
| 7 | AAD | 20.0 | 64° C. | 4.384 | 81.0000 | 4.801 | 12.120 | Passed |
|  |  |  | 52° C. | 14.2730 | 73.7000 | 14.7280 | 12.350 | Passed |
| 8 | AAD | 7.5 | 64° C. | 1.2850 | 84.1000 | 1.2919 | 12.090 | Passed |
|  |  |  | 52° C. | 3.7152 | 79.1000 | 3.8202 | 11.870 | Passed |
| 9 | AAD | 20.0 | 64° C. | 2.8494 | 82.9000 | 2.8712 | 12.040 | Passed |
|  |  |  | 52° C. | 12.7450 | 77.7000 | 13.0440 | 12.440 | Passed |
| 10 | AAD | 7.5 | 64° C. | 1.0920 | 84.40 | 1.0956 | 11.93 | Passed |
| 11 | AAD | 20.0 | 64° C. | 1.8896 | 84.20 | 1.8994 | 11.68 | Passed |
| 12 | AAD | 7.5 | 64° C. | 1.3570 | 84.20 | 1.3639 | 11.92 | Passed |
| 13 | AAD | 20.0 | 64° C. | 1.9068 | 82.50 | 1.9068 | 12.18 | Passed |

The data in Table 9 demonstrate that the values of G* and δ for the different coproduct-and-asphalt compositions were highly dependent on the extent of coproduct loading, test temperature and frequency used in testing. The addition of coproduct to any of the Comparative Examples improved the performance. Notably the addition of coproduct to AAD (Comp. Ex. C vs Inv. Exs. 6 through 13) and to AAG (Comp. Ex. A vs. Inv. Ex. 1) yielded compositions that passed the test at 64° C. Even with an addition of only 7.5 wt % of coproduct, AAD-based compositions (Inv. Exs. 6, 8, 10 and 12) passed the DSR test at 64° C. Thus, the addition of the coproduct greatly affected the dynamic shear behavior of the asphalt binders evaluated, and enhanced their performance.

DSR was also performed at four higher temperatures on samples of a larger batch of Inv. Ex. 11. The larger batch quantity was needed to provided sufficient material for studies of coproduct-modified asphalt with aggregate added. For the larger batches, a large colloid-mill (Eppenbach colloid mill from Gifford-Wood Company, Husdon, N.Y.) equipped with a 3.5 gallon tank was used to prepare the coproduct-modified asphalt binders. The tank was wrapped with a heating band to maintain temperature during mixing. About 2000 grams of molten asphalt at 170° C. was discharged into the collioid mills at a temperature about 170° C. The desired amount of ground chip coproduct was added to the container quickly. The mixture was mixed vigorously at a maximum setting. The mixing time was about 10 minutes. The temperature of the mixture was higher than 170° C. by about 2° C. to 5° C. due to viscous dissipation in mixing. The mixture was then discharged into sample containers for performance evaluation. The mixture appeared to have good dispersion, and the samples were stored in a cool room with controlled humidity (50° F.@ 50% relative humidity).

The DSR data for the four higher temperature studies are in Table 10 and, when compared to Comp. Ex. C data in Table 8, show that the addition of 20 wt % coproduct to AAD asphalt dramatically extended the higher temperature performance (both G* and δ) of AAD asphalt from failing at 64° C. to passing at 76° C.

TABLE 10

| Inv. Ex. | Test Temp. | Asphalt | Content wt % | G* (kPa) | δ (degrees) | G*/sin(δ) (kPa) | Strain Amp (%) | Test Status |
|---|---|---|---|---|---|---|---|---|
| 11 | 52° C. | AAD | 20 | 14.2730 | 75.7000 | 14.7280 | 12.35 | Passed |
|  | 64° C. | AAD | 20 | 3.3384 | 81.0000 | 3.3801 | 12.12 | Passed |
|  | 72° C. | AAD | 20 | 1.5466 | 83.7000 | 1.5561 | 12.27 | Passed |
|  | 76° C. | AAD | 20 | 1.0676 | 82.9000 | 1.0757 | 12.16 | Passed |

Asphalt filled with an inorganic filler were prepared to compare to the coproduct-modified compositions. Comp. Exs. E, F and G were comprised of 20% hydrate lime in asphalt binder as shown in Table 14. The lime was −200 mesh. These Comparative Examples were prepared using the three-neck resin reaction kettle and helical screw impeller used for Inv. Exs. 1 through 9 and were mixed at 170° C. The data are shown in Table 11. In contrast to Inv. Exs. 7 and 9, Comp. Ex. E failed the test at 58° C. Comp. Ex. F showed that the 20 wt % hydrate lime actually reduced the G*/sin(δ) compared to the same asphalt in the absence of hydrate lime (Comp. Ex. A) at 64° C. The 20 wt % hydrate lime only slightly increased the G*/sin(δ) value for AAM asphalt (Comp. Ex. B vs Comp. Ex. G). These data suggest the coproduct does not act merely as an inorganic filler despite its high proportion of CaCO$_3$. Furthermore, the benefits of adding coproduct to asphalt were realized at low coproduct loading (ex. 7.5 wt %).

In contrast, an unusual behavior in coproduct-modified AAD asphalt was observed that was not observed in the coproduct-modified AAM or AAG asphalts. Specifically,

TABLE 11

| Comp. Ex. | Asphalt | Content wt % | Test Temp. | G* (kPa) | δ (degrees) | G*/sin(δ) (kPa) | Strain Amp (%) | Test Status |
|---|---|---|---|---|---|---|---|---|
| E | AAD | 20 | 58° C. | 0.8998 | 82.800 | 0.9068 | 12.02 | Failed |
| F | AAG | 20 | 64° C. | 0.8698 | 88.300 | 0.8702 | 12.02 | Failed |
| G | AAM | 20 | 64° C. | 1.3064 | 86.000 | 1.3096 | 12.16 | Passed |

Bending beam rheometry was used to characterize the viscoelastic characteristics of the various compositions at low temperatures in accordance with the guidelines in "Background of SUPERPAVE™ ASPHALT BINDER TEST METHODS". In the test, designed by SHRP, a creep load is used to simulate the thermal stresses that gradually build up in a pavement when temperature drops. Two parameters are evaluated with BBR. Measured stiffness (creep stiffness) is a measure of how the asphalt resists constant loading. To pass the test detailed in "Background of SUPERPAVE™ ASPHALT BINDER TEST METHODS", it should not exceed 300 mPa at the 60 second time point. The m-value is the creep rate and is the change in asphalt stiffness with time during loading. The test guidelines require the m-value to be equal to or greater than 0.300 at 60 seconds. The data presented in Table 12 was measured at −16° C.

addition of 7.5 wt % coproduct to AAD (Inv. Exs. 6, 8, 10 and 12) resulted in a very marginal increase in stiffness and an increase in m-value compared to the unfilled AAD asphalt (Comp. Ex. C). At high coproduct loading, the behavior followed that for coproduct filled AAM and AAG: at 20 wt % coproduct, the addition of coproduct increased the stiffness and decreased the "m-value" of AAD asphalt.

Although the nature of the interactions between coproduct and AAD asphalt are not understood, it is suspected that at low coproduct concentration, the coproduct may plasticize AAD. At 7.5 wt % coproduct, the increase in the "m-value" of AAD asphalt (see FIG. 3b) suggests that the coproduct may have changed the morphology of the asphalt network.

BBR was also performed on aged asphalt samples having 20 wt % coproduct. The samples were aged by two consecutive aging processes in accordance with SHRP guide-

TABLE 12

| Comp. Ex. | Inv. Ex. | Asphalt | Content wt % | Force, mN | Deflection, mm | Measured Stiffness, MPa | m-Value |
|---|---|---|---|---|---|---|---|
| A | | AAG | 0 | 1004 | 0.171 | 473.00 | 0.334 |
| | 1i | AAG | 13.0 | 985 | 0.114 | 697.00 | 0.263 |
| | 1ii | AAG | 13.0 | 1010 | 0.103 | 791.00 | 0.233 |
| | 1iii | AAG | 13.0 | 985 | 0.110 | 722.00 | 0.253 |
| B | | AAM | 0 | 987 | 0.422 | 189.00 | 0.316 |
| | 2ai | AAM | 20.0 | 994 | 0.211 | 380.00 | 0.245 |
| | 2aii | AAM | 20.0 | 1007 | 0.255 | 318.00 | 0.261 |
| | 2bi | AAM | 20.0 | 988 | 0.265 | 301.00 | 0.267 |
| | 2bii | AAM | 20.0 | 1009 | 0.261 | 312.00 | 0.275 |
| | 3 | AAM | 7.5 | 996 | 0.336 | 238.00 | 0.282 |
| | 4 | AAM | 20.0 | 1015 | 0.297 | 276.00 | 0.268 |
| | 5 | AAM | 7.5 | 990 | 0.317 | 251.00 | 0.279 |
| C | | AAD | 0 | 976 | 1.632 | 48.20 | 0.484 |
| | 6ai | AAD | 7.5 | 990 | 1.595 | 50.00 | 0.513 |
| | 6aii | AAD | 7.5 | 1001 | 1.245 | 64.80 | 0.512 |
| | 6bi | AAD | 7.5 | 1007 | 1.669 | 48.60 | 0.470 |
| | 6bii | AAD | 7.5 | 990 | 1.104 | 72.30 | 0.463 |
| | 7 | AAD | 20.0 | 991 | 0.896 | 89.20 | 0.446 |
| | 8 | AAD | 7.5 | 1011 | 1.194 | 68.30 | 0.460 |
| | 9 | AAD | 20.0 | 1001 | 0.743 | 109.00 | 0.421 |
| | 10 | AAD | 7.5 | 1000 | 2.009 | 40.1(?) | 0.532 |
| | 11 | AAD | 20.0 | 997 | 0.675 | 119 | 0.451 |
| | 12 | AAD | 7.5 | 1015 | 1.548 | 52.9 | 0.523 |
| | 13 | AAD | 20.0 | 997 | 0.815 | 98.6 | 0.471 |

These data showed that the addition of 13 wt % coproduct to AAG (Inv. Ex. 1) increased the stiffness and lowered the "m-value" of the original asphalt binder (Comp. Ex. A). Similarly, addition of coproduct to AAM asphalt at 7.5 wt % (Inv. Exs. 3 and 5) and at 20 wt % (Inv. Exs. 2 and 4) increased the stiffness and lowered the m-value compared to the original binder (Comp. Ex. B).

lines. The first was rolling thin film oven (RTFO) and the second was pressure aging vessel (PAV). The coproduct-loaded samples which were subjected to the aging process came from the large-scale batch described for Inv. Ex. 11 in Table 10. BBR data for aged samples is presented in Table 13. The temperature at which the BBR was performed is indicated in the table.

TABLE 13

| | | | Results of Bending Beam Rheometer (@ 60 s) | | | |
|---|---|---|---|---|---|---|
| Comp. Ex. | Inv. Ex. | Test Temperature (° C.) | Force | Deflection, mm | Measured Stiffness, MPa | m-Value |
| A | | −16 | 998 | 0.176 | 457 | 0.260 |
| B | | −16 | 976 | 0.671 | 117 | 0.291 |
| C | | −16 | 989 | 0.999 | 80 | 0.408 |
| | 11i | −12 | 1002 | 0.588 | 137 | 0.367 |
| | 11ii | | 1000 | 0.48 | 168 | 0.347 |
| | 11 | −16 | 992 | 0.57 | 142 | 0.358 |
| | 11i | −18 | 984 | 0.196 | 405 | 0.273 |
| | 11ii | | 1001 | 0.256 | 315 | 0.284 |
| | 11 | −22 | 992 | 0.139 | 575 | 0.233 |

The data in Table 13 demonstrate, as expected, that aging increased stiffness and decreased m-value when compared to the corresponding unaged sample. The SHRP guidelines for aged samples are: the stiffness must be less than 300 MPa and the m-value must be equal to or greater than 0.3 to pass the test at a given temperature. Although not tested, Comp. Ex. C, having a PG 58–28 rating, must pass the test at −18° C. Inv. Ex. 11 did not pass the test at −18° C. or lower, however, it did pass at both −12°C. and −16° C. It is possible that an aged sample having a lower level of coproduct loading (7.5 wt %) in AAD would retain the −18° C. passing status.

In dynamic shear flow, the storage modulus (G') and the loss modulus (G") are measures of the elastic and viscous responses of a viscoelastic material. For a given filled viscoelastic system, these quantities depend on frequency ($\omega$), temperature(T), and filler volume fraction ($\phi_f$). For dynamic shear measurements, one uses plots of G' and G" against $\omega$ with T and $\phi_f$. Often, G' and G" are plotted against $a_T \omega$ to construct a mastercurve by superposition, where $a_T$ is the time-temperature shift factor, which varies with temperature.

In the past, efforts have been made to match rheological properties from steady shear to dynamic shear measurements at very low values of shear rate or oscillatory frequency. It was Han and coworkers who first suggested the use of logarithmic plots to connect elastic and viscous responses in steady shear flow to dynamic shear measurements. These temperature independent correlations are useful to interpret and compare Theological behavior of different fluids without the need for measurement at different temperatures and shear rate or oscillatory frequency.

Han and Lem (1983) pointed out that in dynamic shear flow, one may consider the oscillatory frequency, $\omega$ to be an input variable imposed on the fluid, whereas both G' and G" are the output elastic and viscous responses of the fluid subjected to testing. Therefore, by using the established fact that G' is related to stored energy, and G" to dissipated energy, it was found that the logarithmic plots of G' against G" give rise to temperature independent correlations.

These well developed rheological theories should apply to asphalts. Asphalt itself is a complex low molecular weight thermoplastic whose Theological properties depend on molecular structure and chemical composition. Therefore, one may surmise that the addition of coproduct would only complicate the rheological properties of asphalt systems, i.e., we are mixing an immiscible blend (mixture of cured styrene butadiene rubber, polypropylene, and asphalt in coproduct) with a suspension (calcium carbonate filled asphalt).

To further characterize some of the inventive asphalt compositions, they and the unfilled asphalt binders, were subjected to a range of oscillatory frequencies and temperatures to measure complex viscosity, G'and G". Included with these samples were Comp. Ex. D and two coproduct-filled composition based on this asphalt. Inv. Ex. 14 contained 7.5 wt % coproduct added to AAA and Inv. Ex. 15 contained 20 wt % coproduct added to AAA.

Figure 4:
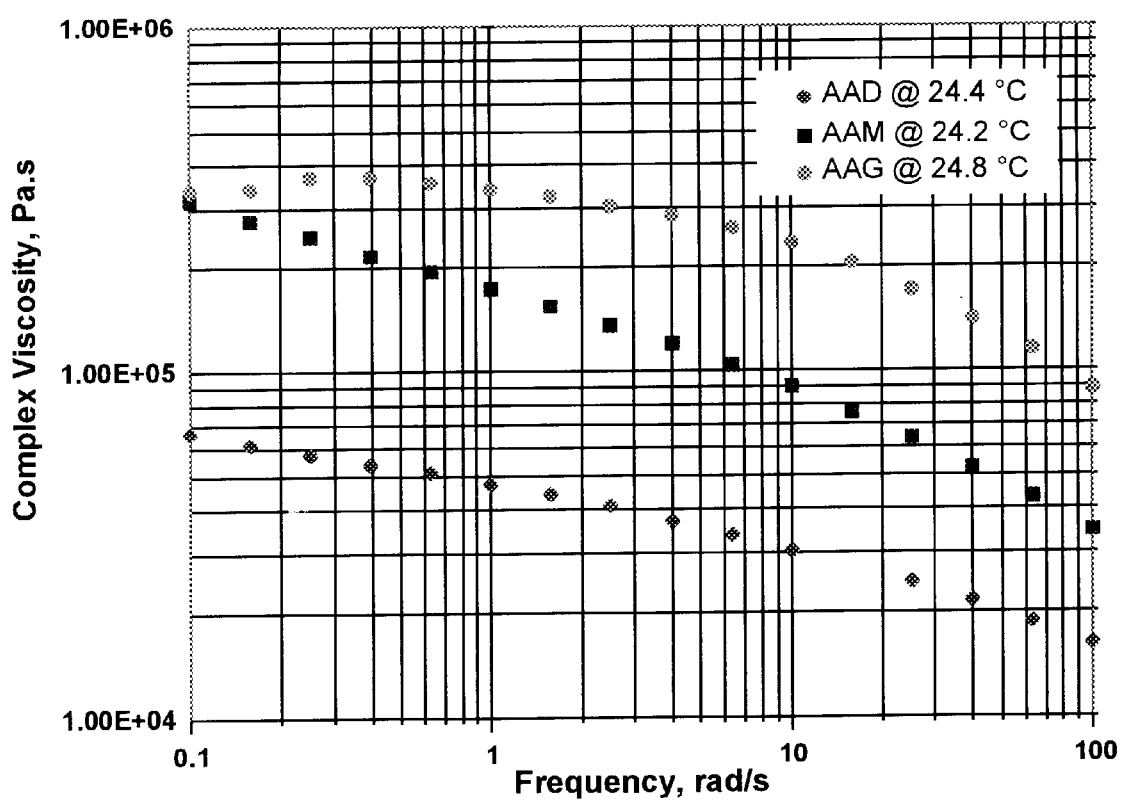
FIG. 4 shows a plot of complex viscosity as a function of frequency at 25° C. for three comparative examples.
Figure 5:
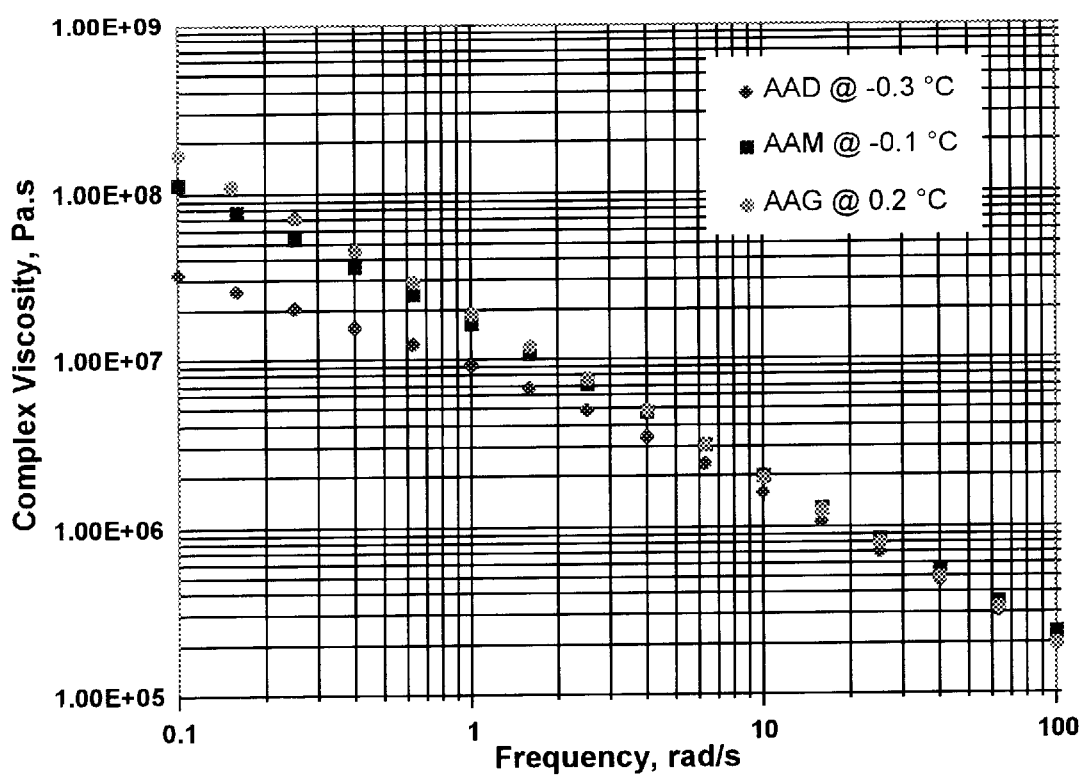
FIG. 5 shows a plot of complex viscosity as a function of frequency at 0° C. for three comparative examples.

FIGS. 4 and 5 show plots of complex viscosity against oscillatory frequency, $\omega$ for AAD, AAM, and AAG at 25° C., and 0° C., respectively. All the asphalts exhibited shear thinning behavior, i.e. viscosity decreased with increasing shear oscillatory frequency. The extent of shear thinning behavior depended on the type of asphalt and temperature. At high temperatures AAG exhibited higher viscosity than AAD and AAM (FIG. 4). In spite of their low viscosity, both AAD and AAM manifested a higher propensity to shear thinning in the range of oscillatory frequency used in the measurement. In contrast, at low temperatures (FIG. 5), AAG had a higher propensity to shear thinning than AAD and AAM. At low shear rates, AAG exhibited a Newtonian region at an oscillatory frequency<0.4 rad/s at about 25° C. (see FIG. 4). At about 5° C., plots of complex viscosity against oscillatory frequency (data not shown) exhibited one cross-over point (where one curve crosses another curve) between the curve for AAG and the curve for AAM at about 60 rad/s. At about 0° C., the plots of complex viscosity against oscillatory frequency (FIG. 5) exhibited two cross-over points: one between the AAG and AAM curves at about 17 rad/s and one for AAG, AAM and AAD curve at about 40 rad/s.

Figure 6:
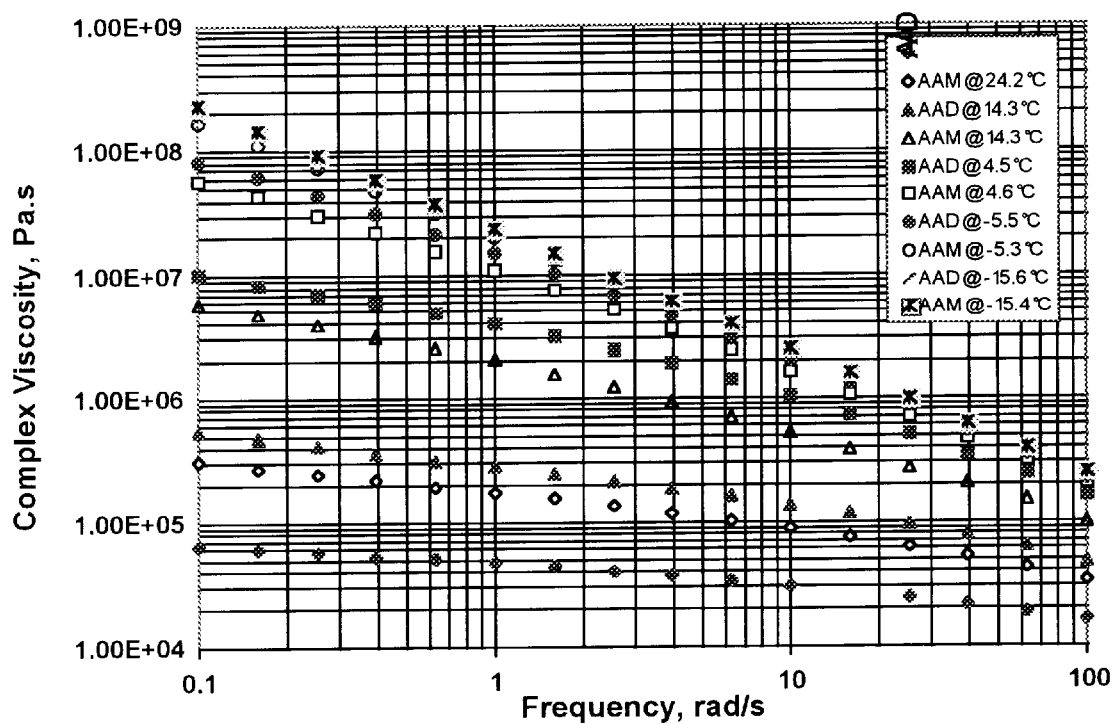
FIG. 6 shows a plot of complex viscosity as a function of frequency at several different temperatures for two comparative examples.

FIG. 6 shows the relationship of complex viscosity and oscillatory frequency for AAD and AAM at several temperatures ranging from 24° C. to −15° C. For AAD and AAM, the propensity for shear thinning increased with decreasing temperature. The difference in the viscosity behavior between AAD and AAM decreased with decreasing temperature until they became identical at 15° C. The absence of cross-over points, related to temperature alone or to various transitions (i.e., such as molten, rubbery, or glass transition), implies that AAD and AAM are similar type fluids. In contrast, the cross-over in FIG. 5 suggests that AAG may be a very different fluid compared to AAD and AAM in structure and composition.

Figure 7:
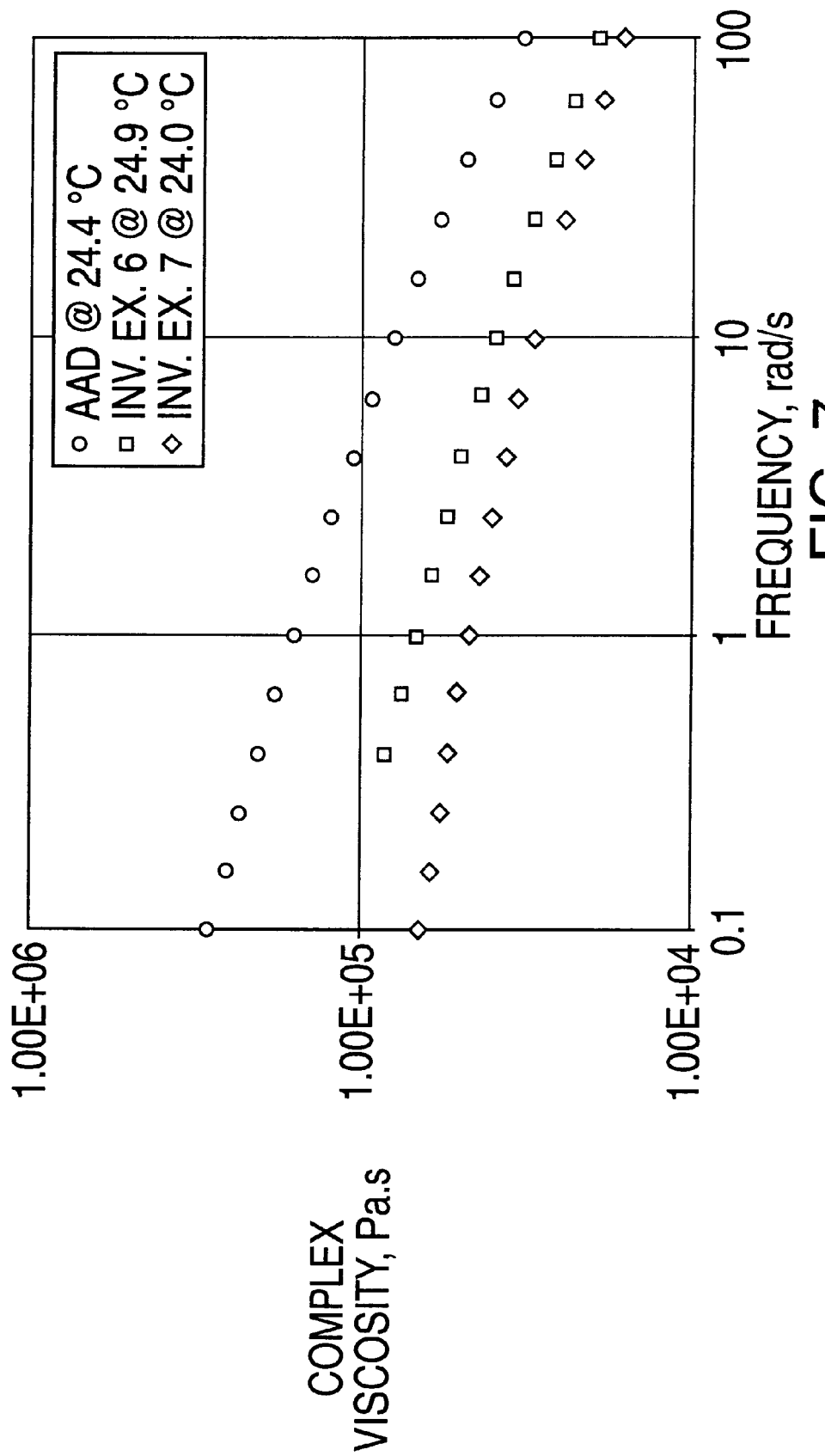
FIG. 7 shows a plot of complex viscosity as a function of frequency at 25° C. for a comparative and two inventive examples.
Figure 8:
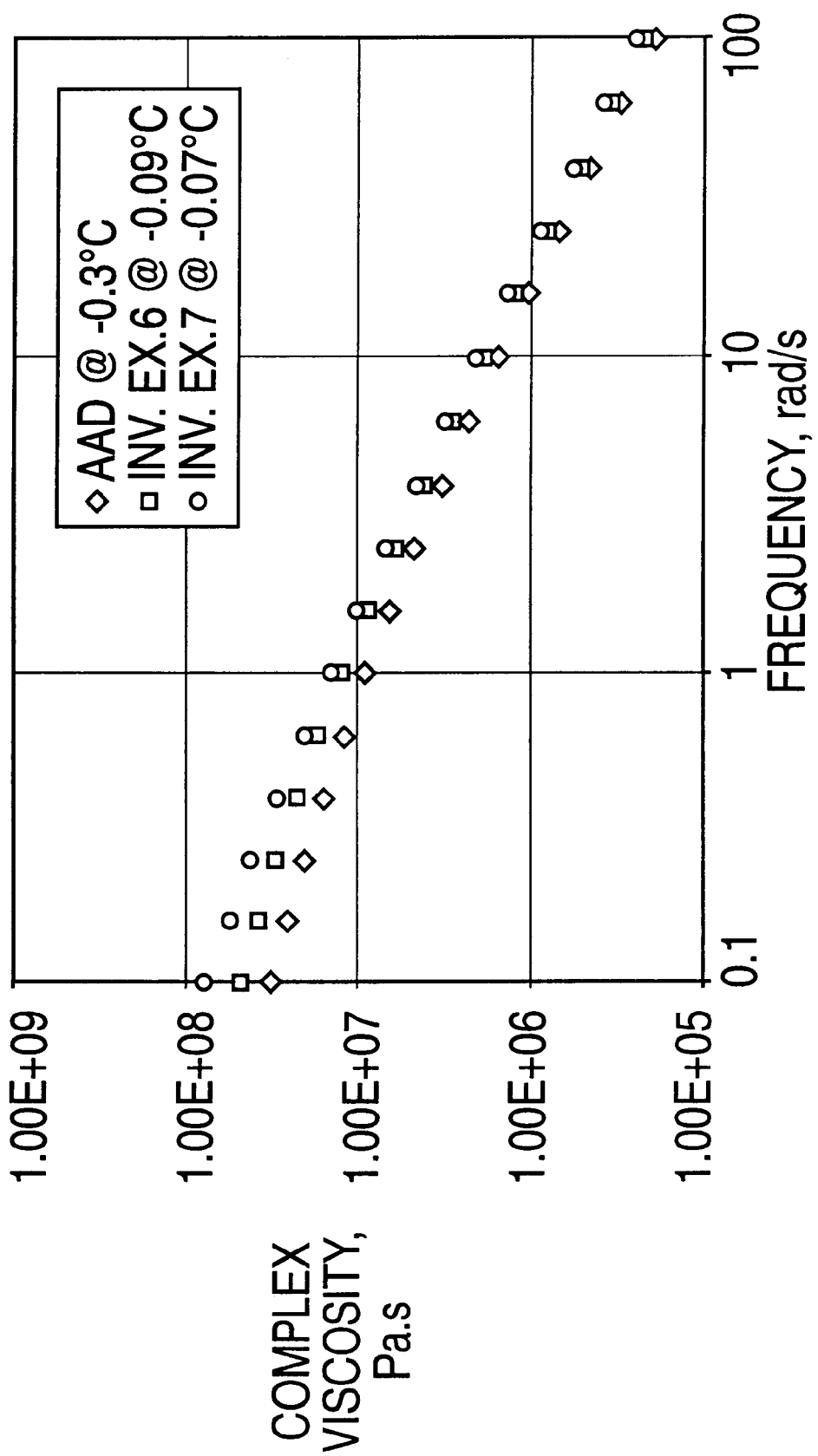
FIG. 8 shows a plot of complex viscosity as a function of frequency at 0° C. for a comparative and two inventive examples.

FIGS. 7 and 8 are plots of complex viscosity against frequency for: AAD (Comp. Ex. C), and AAD compounded with 7.5 wt % (Inv. Ex. 6) and 20 wt % coproduct (Inv. Ex. 7), at 25° C., and 0° C., respectively. Both coproduct-filled AAD samples exhibited shear thinning, while viscosity increases with increasing coproduct content. As shown in FIG. 7, at 25° C., AAD viscosity increased with coproduct in the range of oscillatory frequency evaluated. At low temperature, 20 wt % coproduct-filled AAD (Inv. Ex. 7) showed a higher tendency toward shear thinning than 7.5 wt % coproduct-filled AAD (Inv. Ex. 6) and unfilled AAD (Comp. Ex. C). At 0° C., there was one cross-over point between Inv. Ex. 7 and Inv. Ex. 6 samples at about 25 rad/s (FIG. 8).

Figure 9:
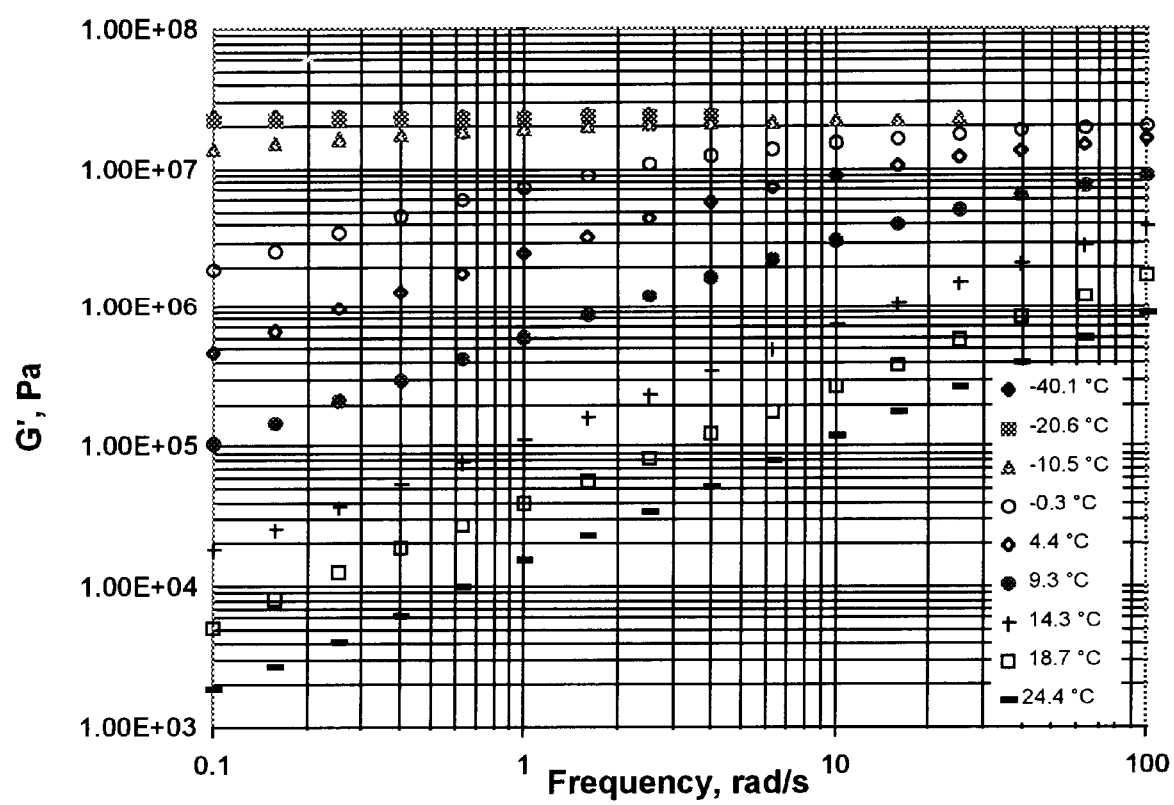
FIG. 9 shows a plot of G' as a function of frequency at several temperatures for a comparative example.
Figure 10:
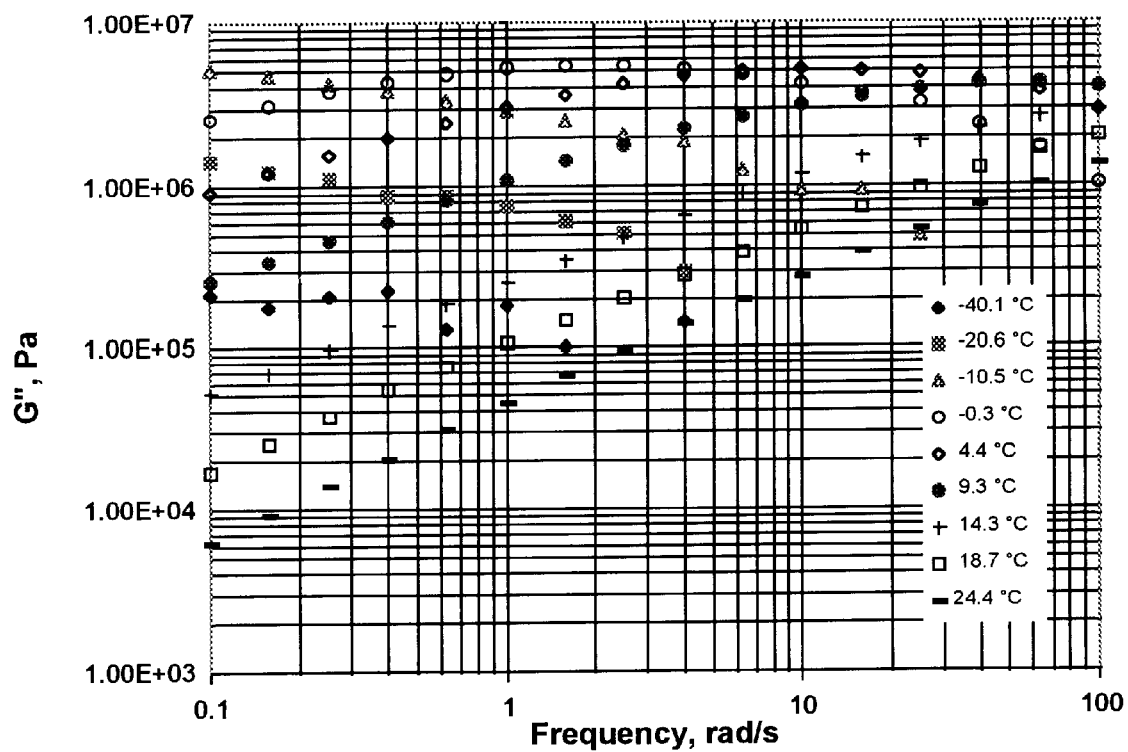
FIG. 10 shows a plot of G" as a function of frequency at several temperatures for a comparative example.

Two types of master curves (logarithmic plots of G' and G" against $a_T \omega$; logarithmic plots of G' against G") were used to interpret the Theological behavior of AAD (see FIGS. 9 and 10, and Table 14). The logarithmic plots of G' against G" were constructed according to the procedure of Rong and Chaffey (1988) and were used to determine the transition regions and the absolute glass transitions at $G''_{max}$ of pure and coproduct-filled asphalt binders.

Figure 11:
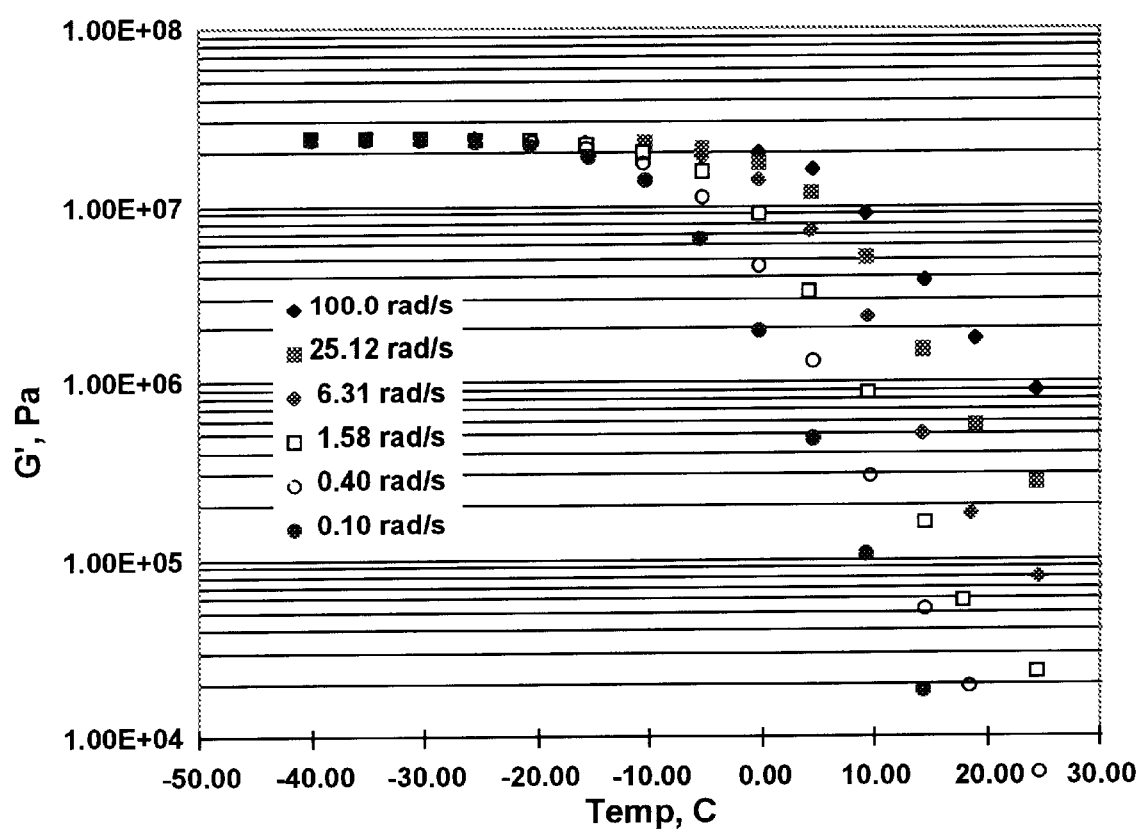
FIG. 11 shows a plot of G' as a function of temperature at various frequencies for a comparative example.
Figure 12:
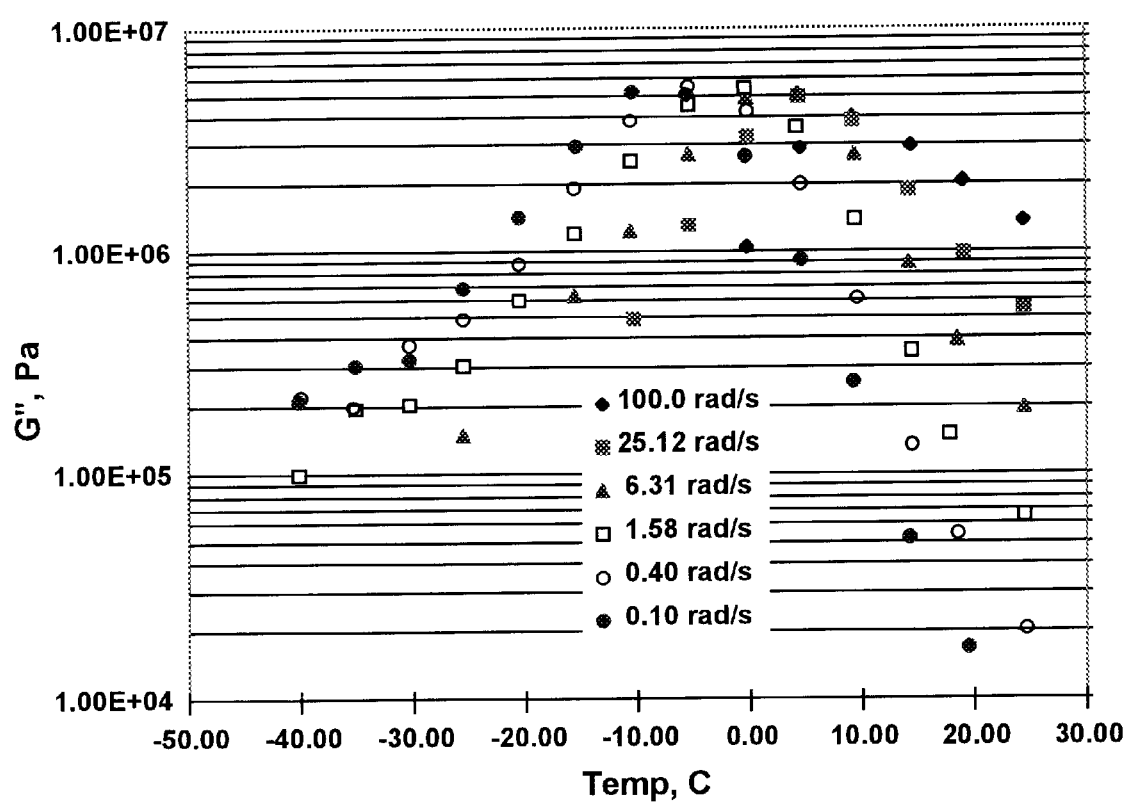
FIG. 12 shows a plot of G" as a function of temperature at various frequencies for a comparative example.
Figure 13:
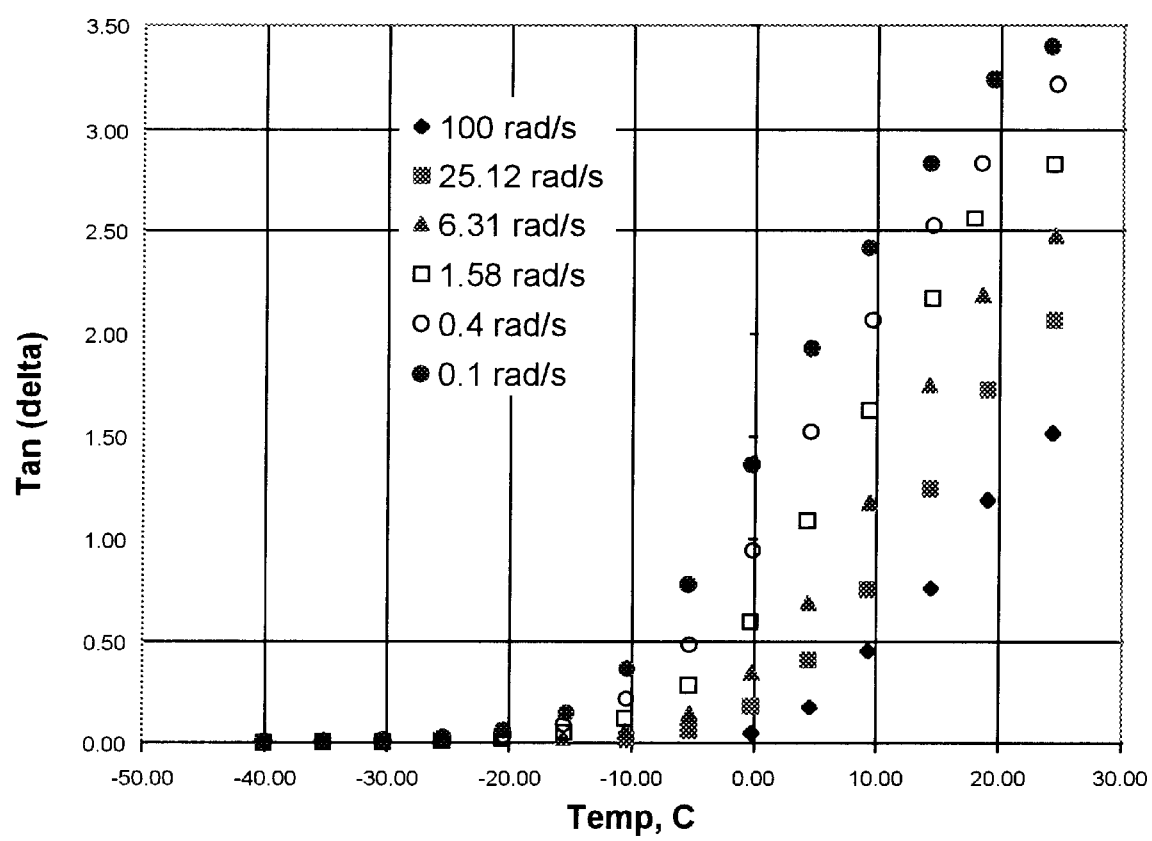
FIG. 13 shows a plot of tan($\delta$) as a function of temperature for a comparative example at various frequencies.

FIGS. 9 and 10 show G', and G" versus frequency at various temperatures for AAD (Comp. Ex. C). FIGS. 11 and 12 show G', and G" versus temperature at various frequencies. As expected, these figures demonstrate that the viscoelastic responses of AAD depend very much on the frequency and temperature. FIG. 13 gives the plots of tan ($\delta$) vs. temperature at various frequencies ranging from 0.1 to 100 rad/s. Unlike the plots of G" against temperature in FIG. 12 where the maximum of G" was visible, the maximum of tan ($\delta$) was not easily observable.

Figure 14:
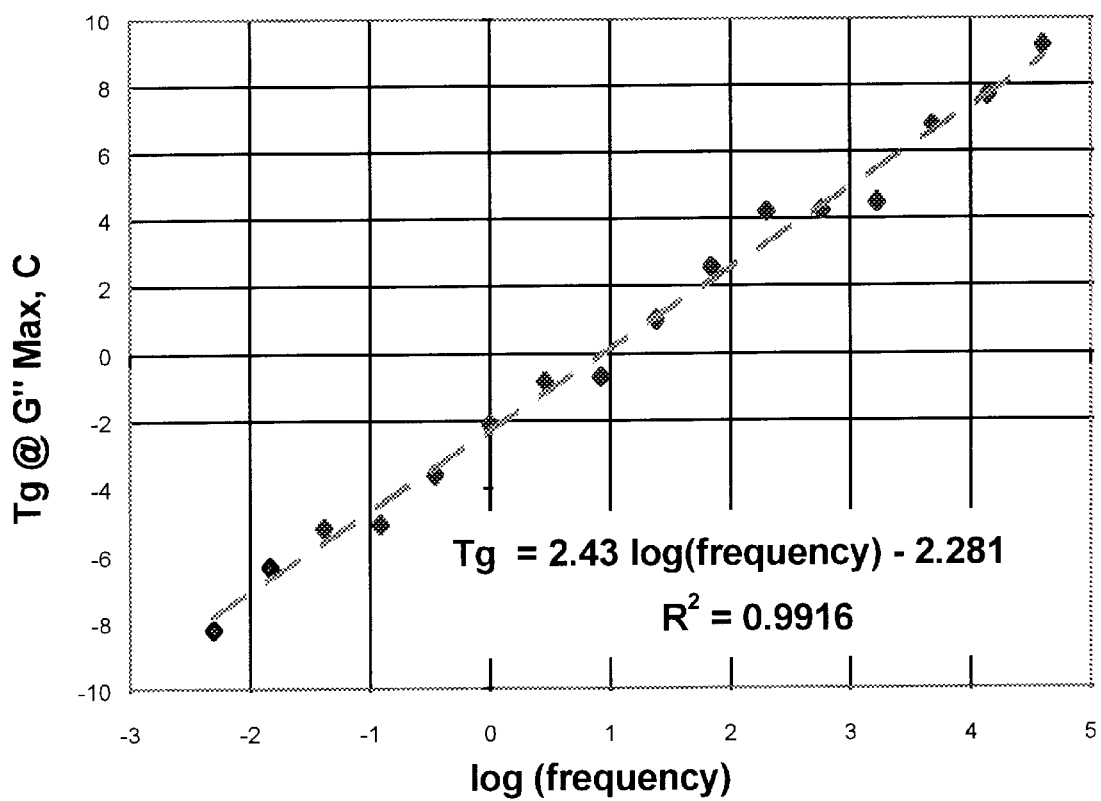
FIG. 14 shows an effect of frequency on $T_{G"max}$ for a comparative example.

In viscoelastic materials, long chain segment motions due to chemical bonds or association have a profound effect on the loss factors such as tan ($\delta$) or G"/G', and G" of the dynamic mechanical properties. The loss factors are very sensitive to molecular motion. For example, in the glassy region (around $-15°$ C.) the dynamic shear modulus (G') in FIG. 11 showed a small degree of change while the loss factors exhibited damping peaks (FIG. 12). According to Murayma (1987), the largest loss peak is associated with the glass-transition temperature (Tg). Rodriguez (1982) asserted that the maximum energy loss is always at the glass transition temperature (Tg), and the maximum in the peak of G" ($G"_{max}$) can be interpreted as Tg. This temperature is referred to herein as Tg @ $G"_{max}$. Values of Tg @ $G"_{max}$ are presented in Table 14. As evident in FIG. 12, the value of Tg @ $G"_{max}$ depends on frequency. Indeed, a plot of Tg @ $G"_{max}$ against $\log_e$ (frequency) in FIG. 14 showed a fairly good correlation.

Figure 15:
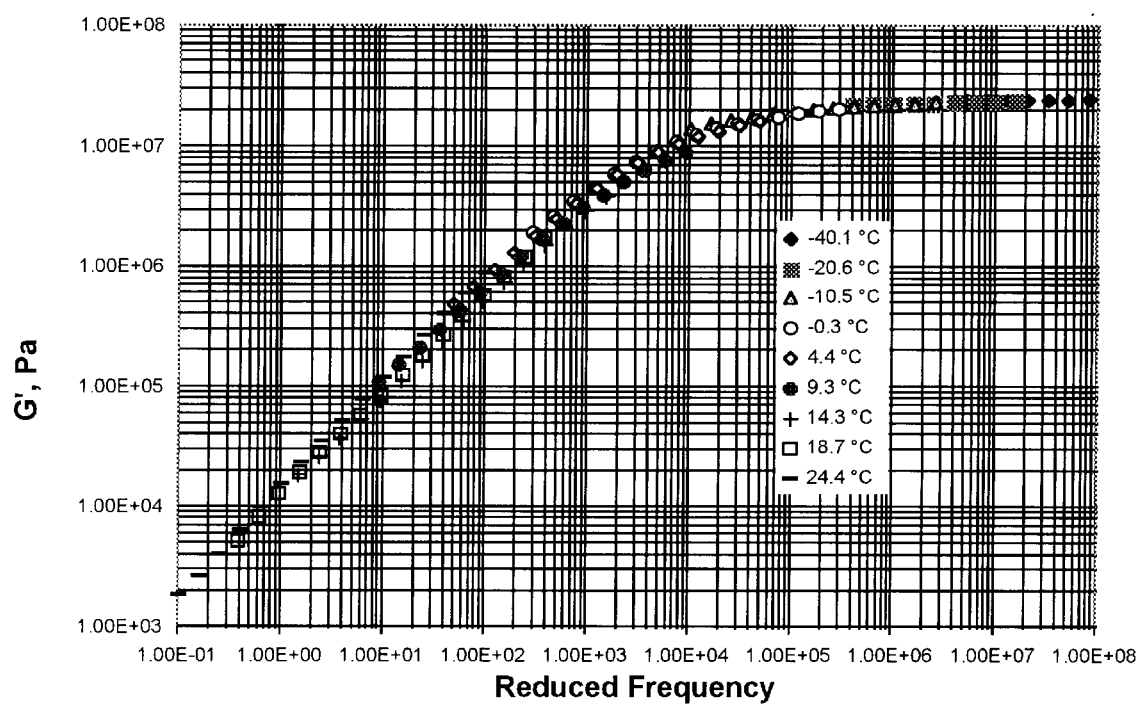
FIG. 15 shows a plot of G' as a function of reduced frequency for a comparative example at various temperatures.
Figure 16:
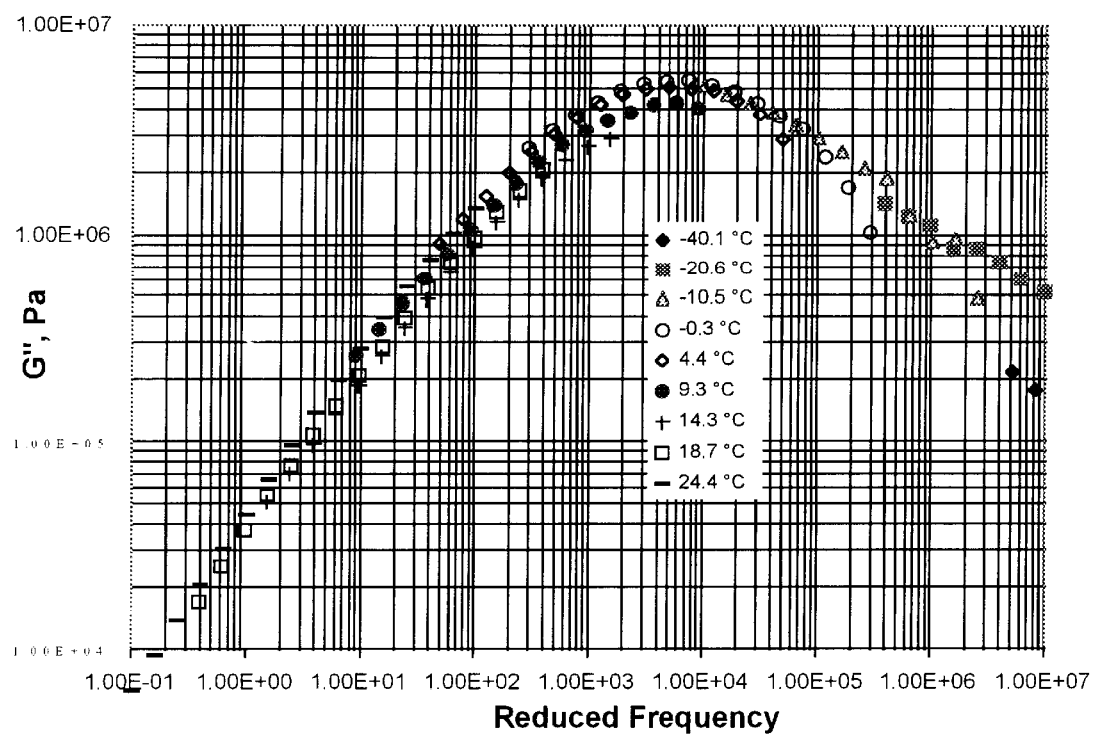
FIG. 16 shows a plot of G" as a function of reduced frequency for a comparative example at various temperatures.
Figure 17:
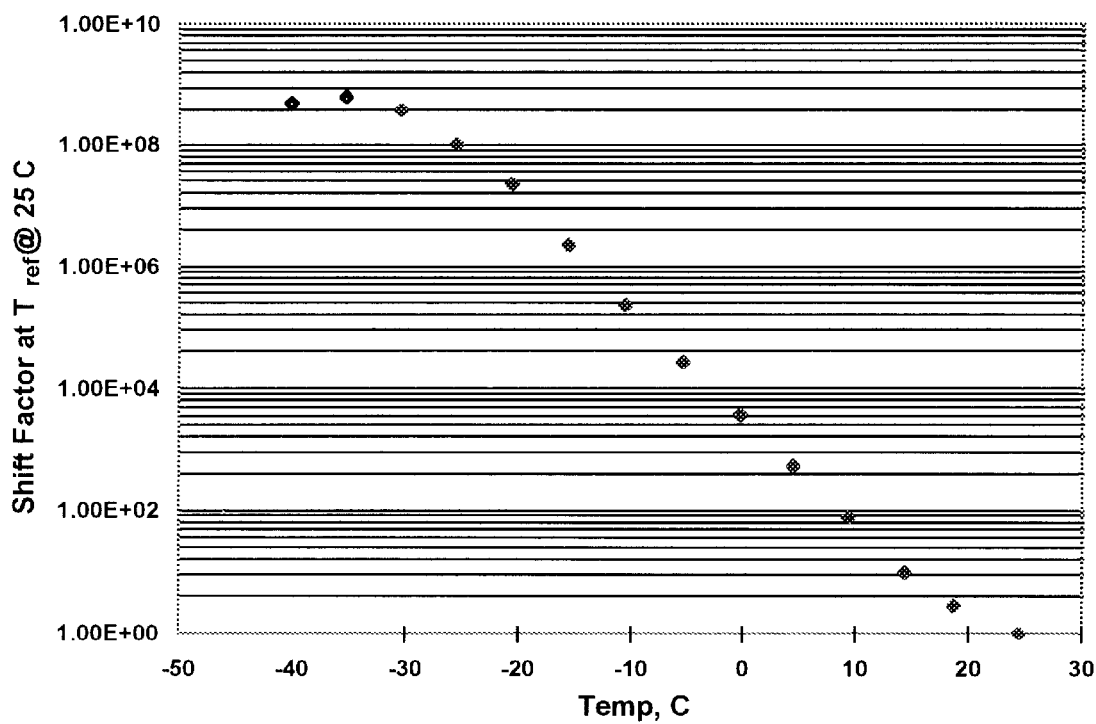
FIG. 17 shows a plot of shift factors as a function of temperature for a comparative example.

FIGS. 15 and 16 show mastercurves for G' and G", respectively, against $a_T \omega$ for AAD (Comp.Ex. C). As seen from these figures, the data presented in FIGS. 9 and 10 can indeed be shifted with an arbitrary shift factor to a reference temperature of 25° C. The temperature-dependence of the shift factor is shown in FIG. 17, in which a maximum is seen at $-35.3°$ C.

Figure 18:
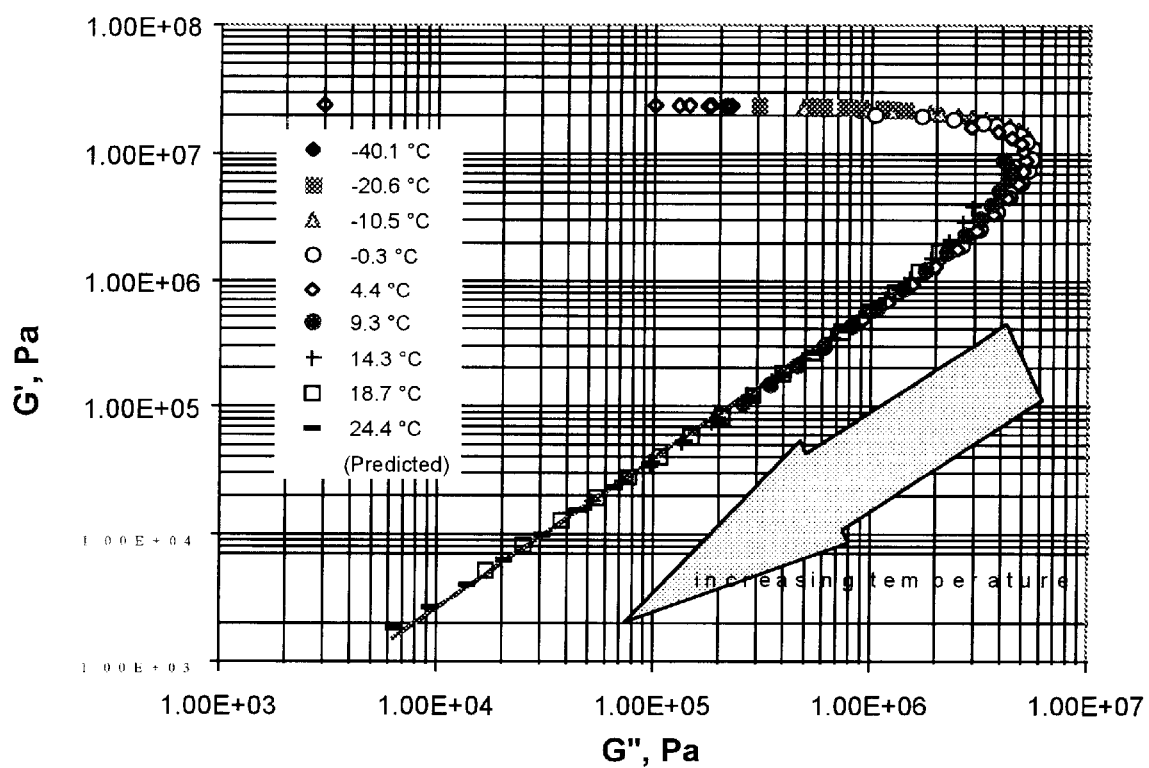
FIG. 18 shows a plot of G' versus G" for a comparative example at various temperatures.
Figure 19:
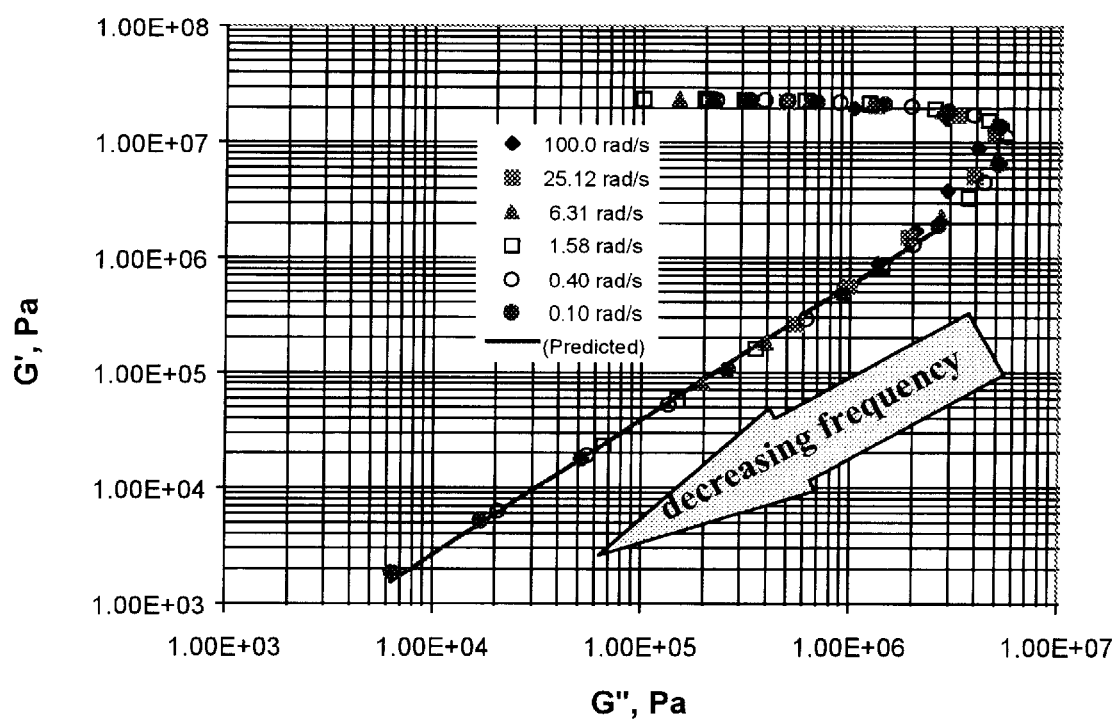
FIG. 19 shows a plot of G' versus G" for a comparative example at various frequencies.

FIGS. 18 and 19 show the relationship of G' and G" for AAD at various temperatures, and frequencies, respectively. The data was the same as that used in FIGS. 9 to 11. The plot of G' against G" is the same in both figures and is virtually independent of temperature and frequency. Unlike typical polymer melts, the linear portion in the viscous flow region on the logarithmic plots of G' against G" could be extended to a higher G" ($\sim 10^6$ Pa). This suggests that AAD asphalt has a relatively small rubbery region because of its low molecular weight. As seen in FIGS. 18 and 19, the linear portion of the logarithmic plots (the viscous flow region) of G' against G" for AAD could be predicted by Eq.(2).

$$G' = \kappa^*(G")^\chi \quad (2)$$

where $\kappa = 0.0541$ and $\chi = 1.1713$.

Figure 20:
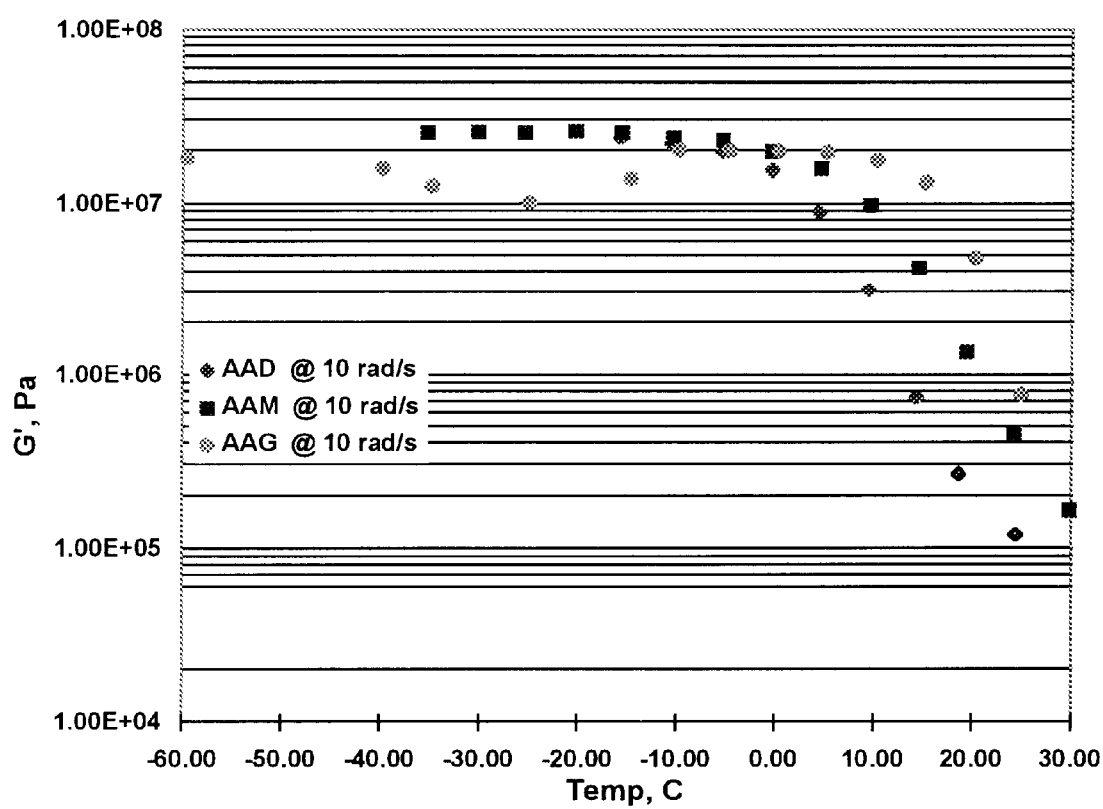
FIG. 20 shows a plot of G' as a function of temperature for three comparative examples at a specific frequency.
Figure 21:
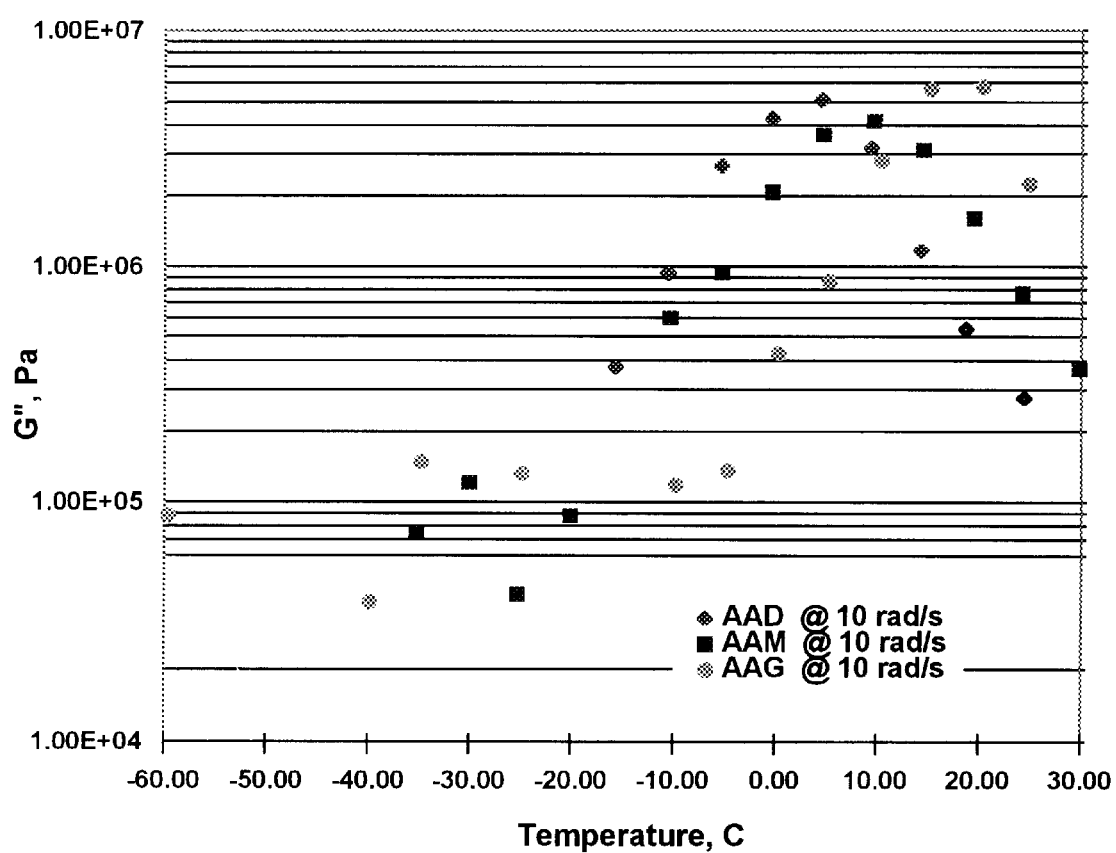
FIG. 21 shows a plot of G" as a function of temperature for three comparative examples at a specific frequency.

FIGS. 20 and 21 give the plots G', and G" against T at $\omega = 10$ rad/s (or 1.59 Hz), the frequency specified by SHRP in the DSR measurement. Both figures give an illustration of the performance classification for these asphalts studied. As seen from Table 6, AAM is a PG 64-16 performance graded asphalt, AAD a PG 58-28, and AAG a PG 58-10. Although in FIG. 20, AAG shows higher shear modulus at temperature below 25° C. than both AAM and AAD, its shear modulus has a higher sensitivity to temperature above Tg than both AAM and AAD. As seen from FIG. 21 and Table 14, among the asphalts evaluated, AAD has the lowest Tg, and hence it can maintain its flexibility at temperatures around $-28°$ C.

Figure 22:
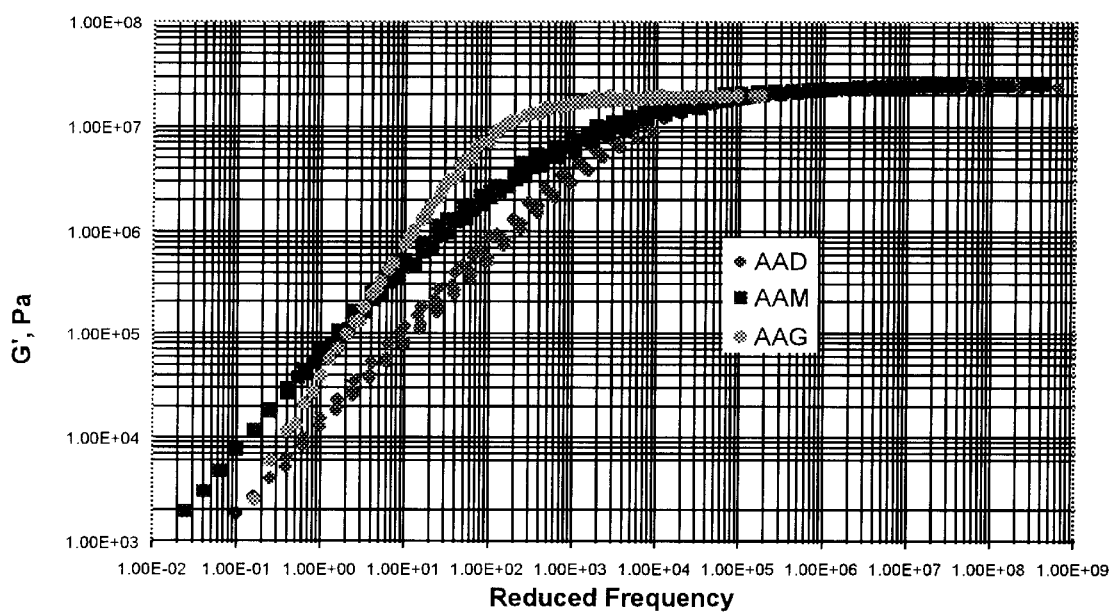
FIG. 22 shows a plot of G' as a function of reduced frequency for three comparative examples.
Figure 23:
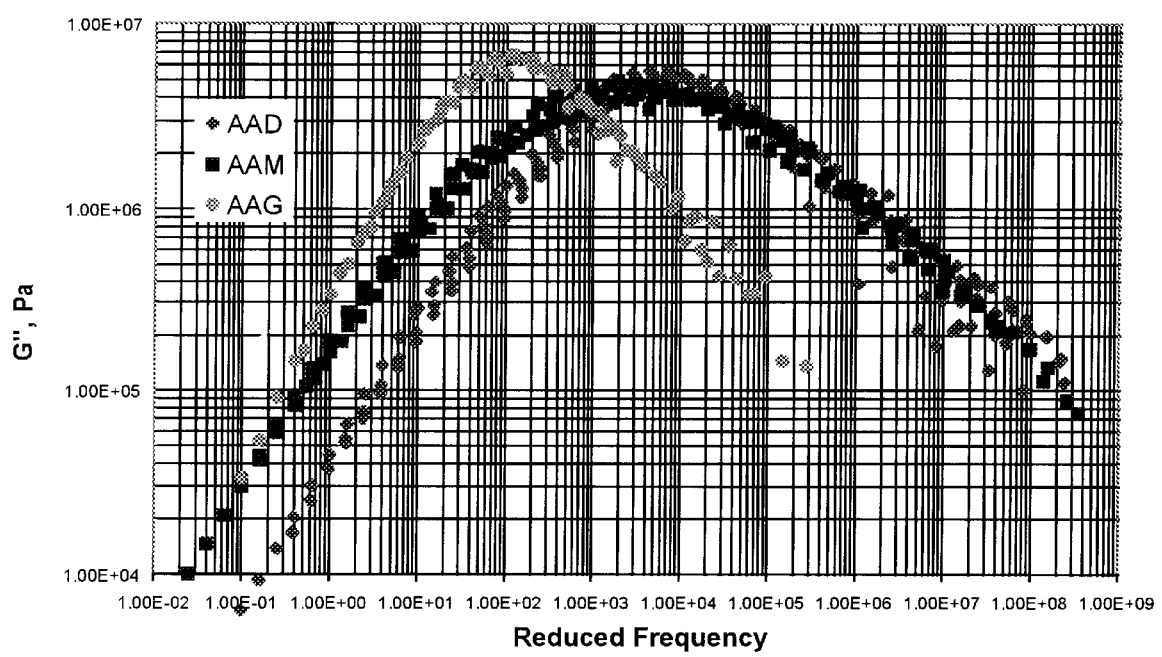
FIG. 23 shows a plot of G" as a function of reduced frequency for three comparative examples.
Figure 24:
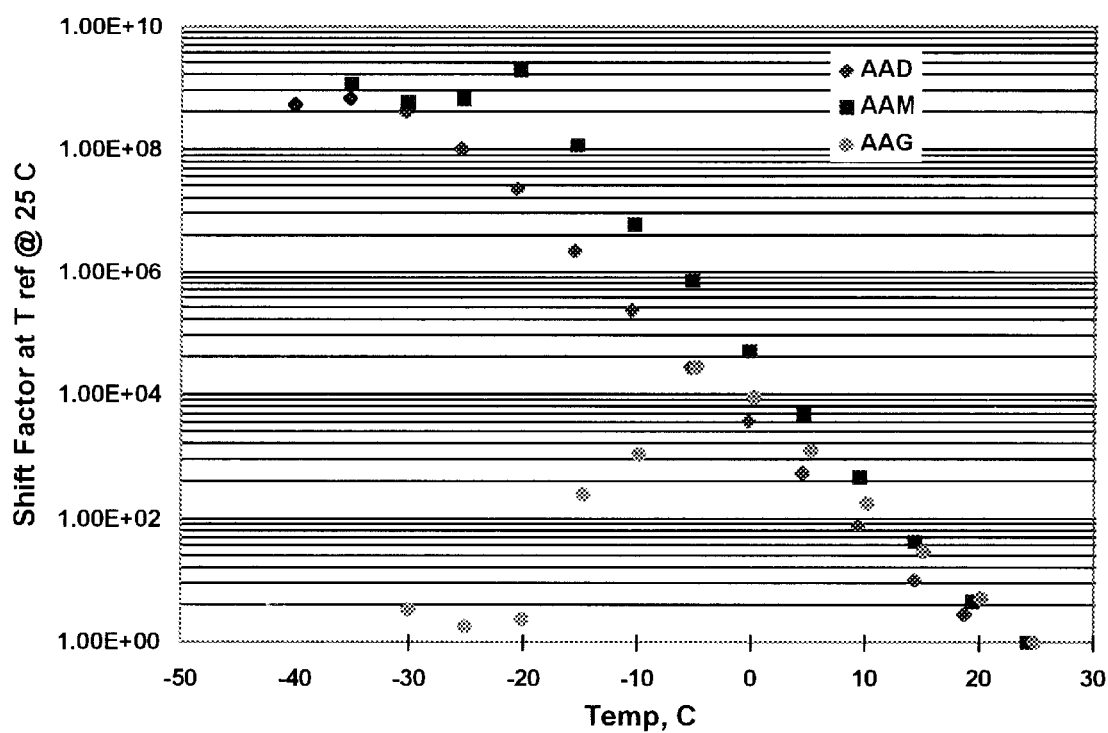
FIG. 24 shows a plot of shift factors as a function of temperature for three comparative examples.

FIGS. 22 and 23 give mastercurves of G', and G" against $a_T \omega$ (reduced frequency), respectively for AAD, AAM, and AAG. The temperature-dependent behavior of the shift factor at a reference temperature of 25° C. is shown in FIG. 24. Clearly AAG is a very different fluid compared to AAD and AAM in viscoelastic behavior. This finding is consistent with our earlier discussion on flow behavior. Data derived from these graphs are presented in Table 14.

Figure 25:
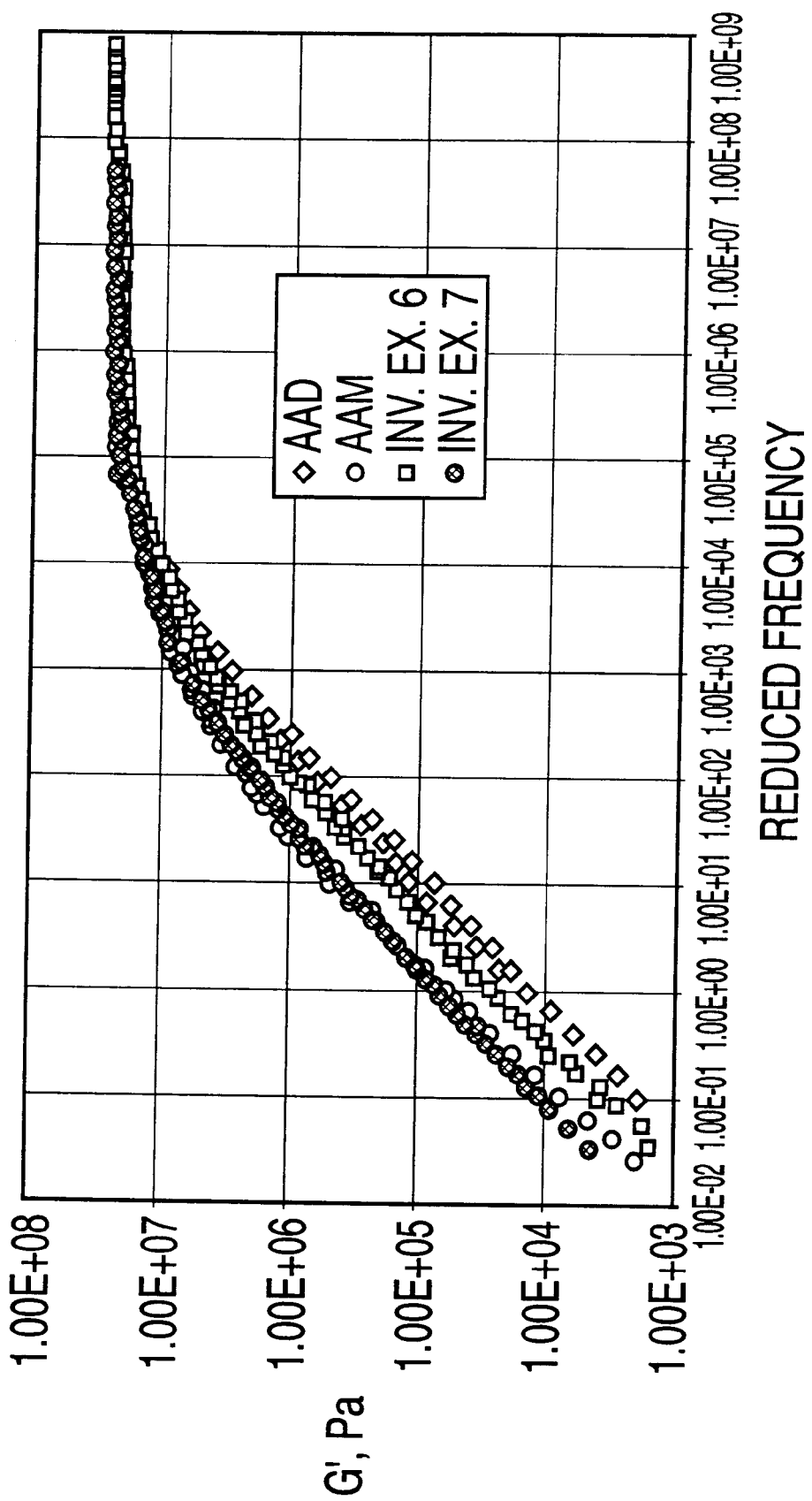
FIG. 25 shows a plot of G' as a function of reduced frequency for two comparative examples and two inventive examples.
Figure 26:
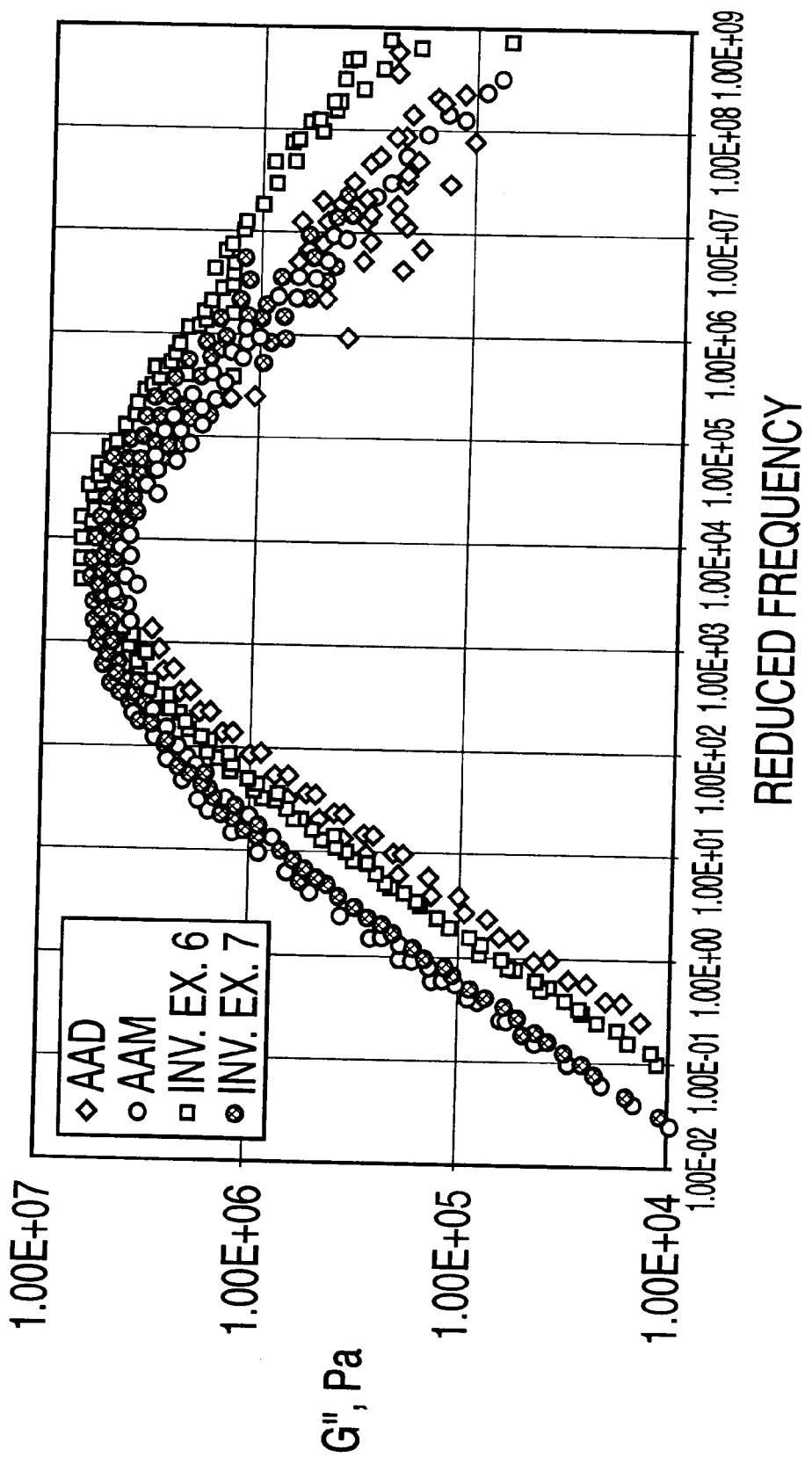
FIG. 26 shows a plot of G" as a function of reduced frequency for two comparative examples and two inventive examples.
Figure 27:
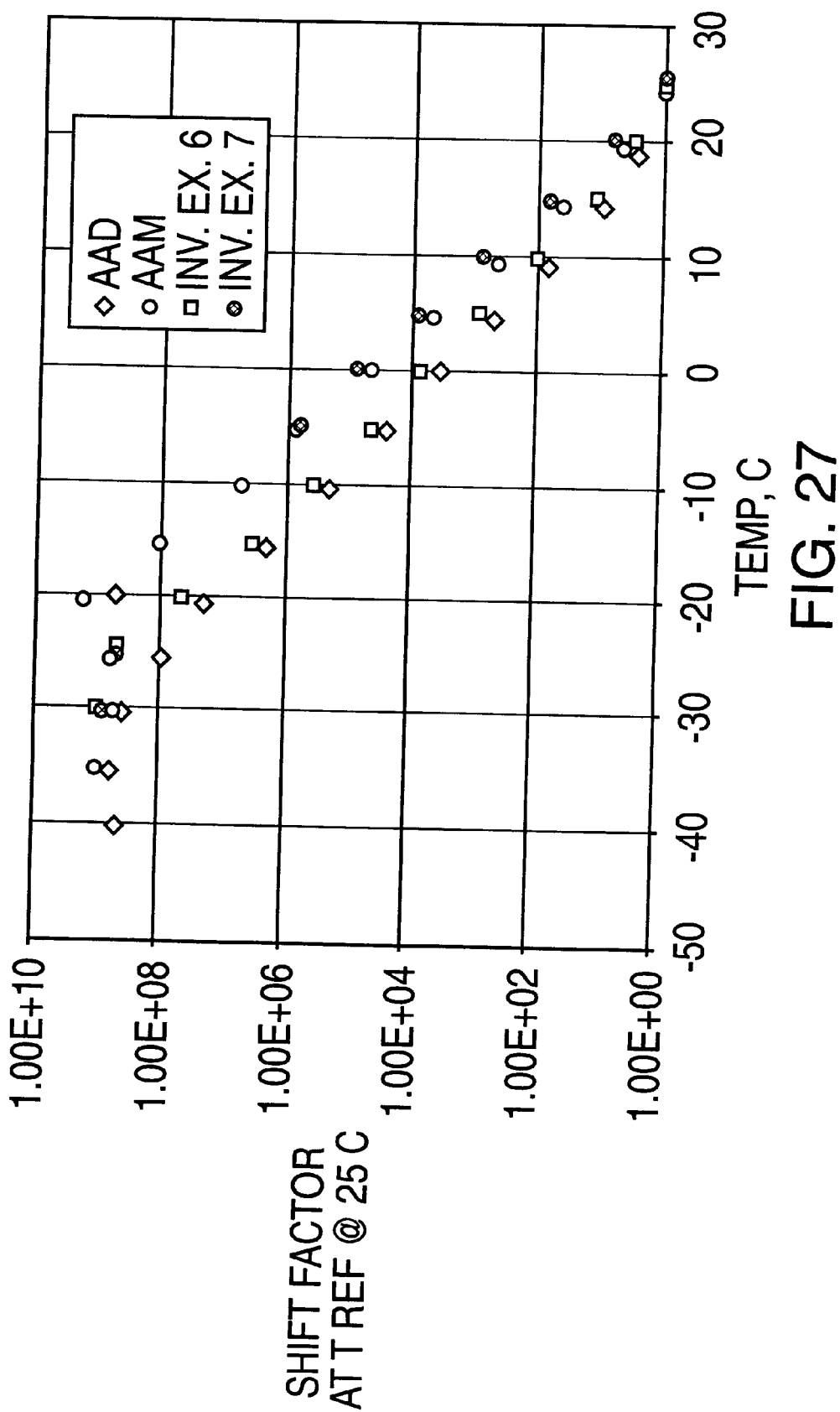
FIG. 27 shows a plot of shift factors as a function of temperature for two comparative examples and two inventive examples.

FIGS. 25 and 26 give mastercurves of G', and G" against $a_T \omega$, respectively for AAD (Comp. Ex. C), Inv. Exs. 6 and 7, and AAM (Comp. Ex. B). The temperature-dependent behavior of the shift factor at a reference temperature of 25° C. is shown in FIG. 27. Note a maximum in the temperature range tested was not observed for the two Inventive Examples. In FIGS. 25 and 26, with increasing coproduct concentration, it was observed that the viscoelastic behavior (even the temperature-dependent behavior of the shift factor) of coproduct-filled AAD matched that of AAM. This observation, that coproduct addition can enhance the performance of AAD asphalt, providing properties similar to AAM, was consistent with the other measurements made on this composition.

Figure 28:
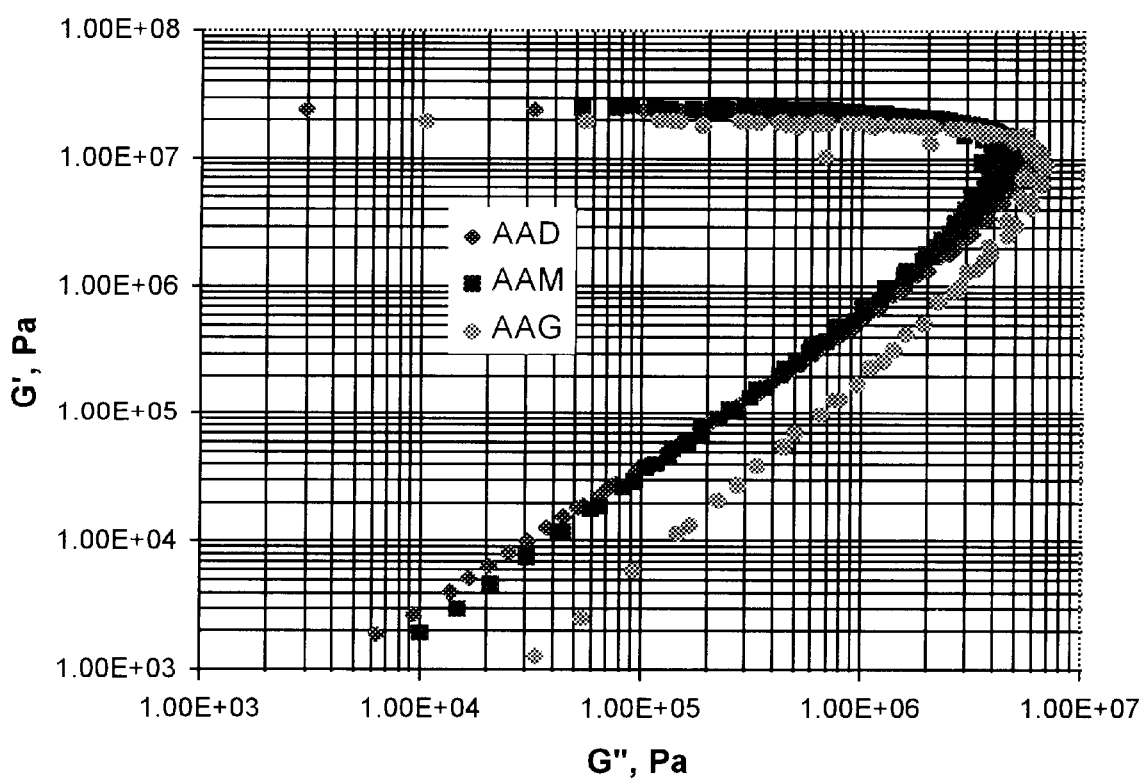
FIG. 28 shows a plot of G' versus G" for three comparative examples.
Figure 29:
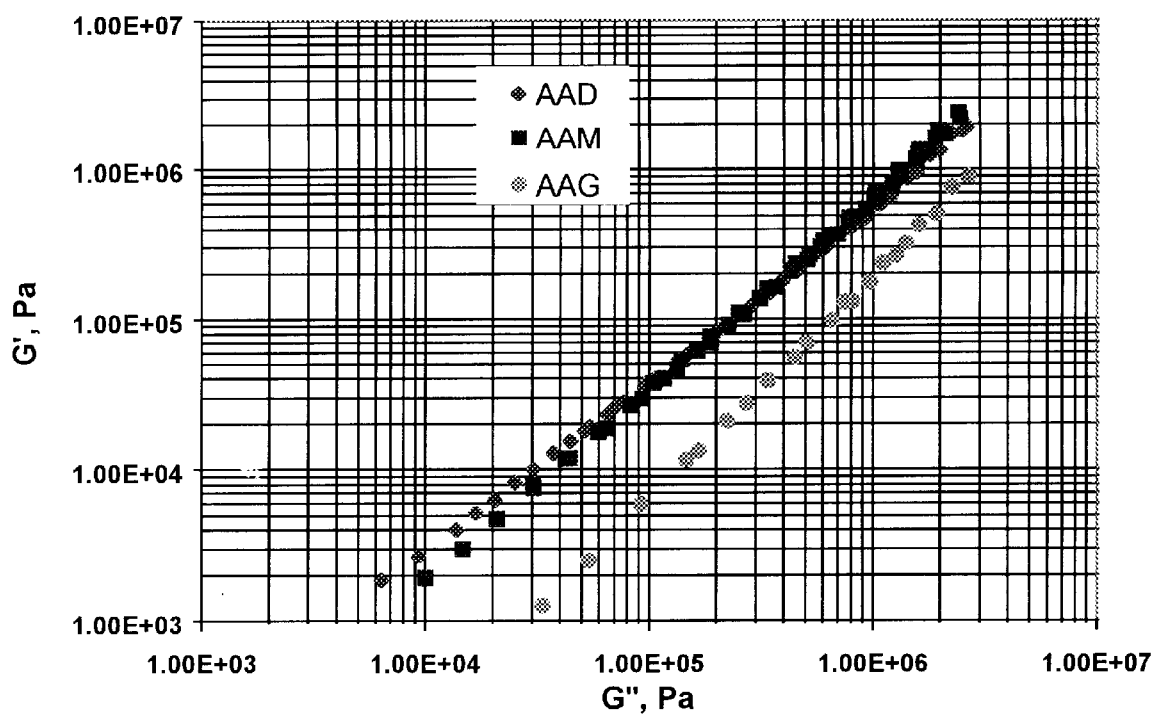
FIG. 29 shows the linear region in a plot of G' versus G" for three comparative examples.
Figure 30:
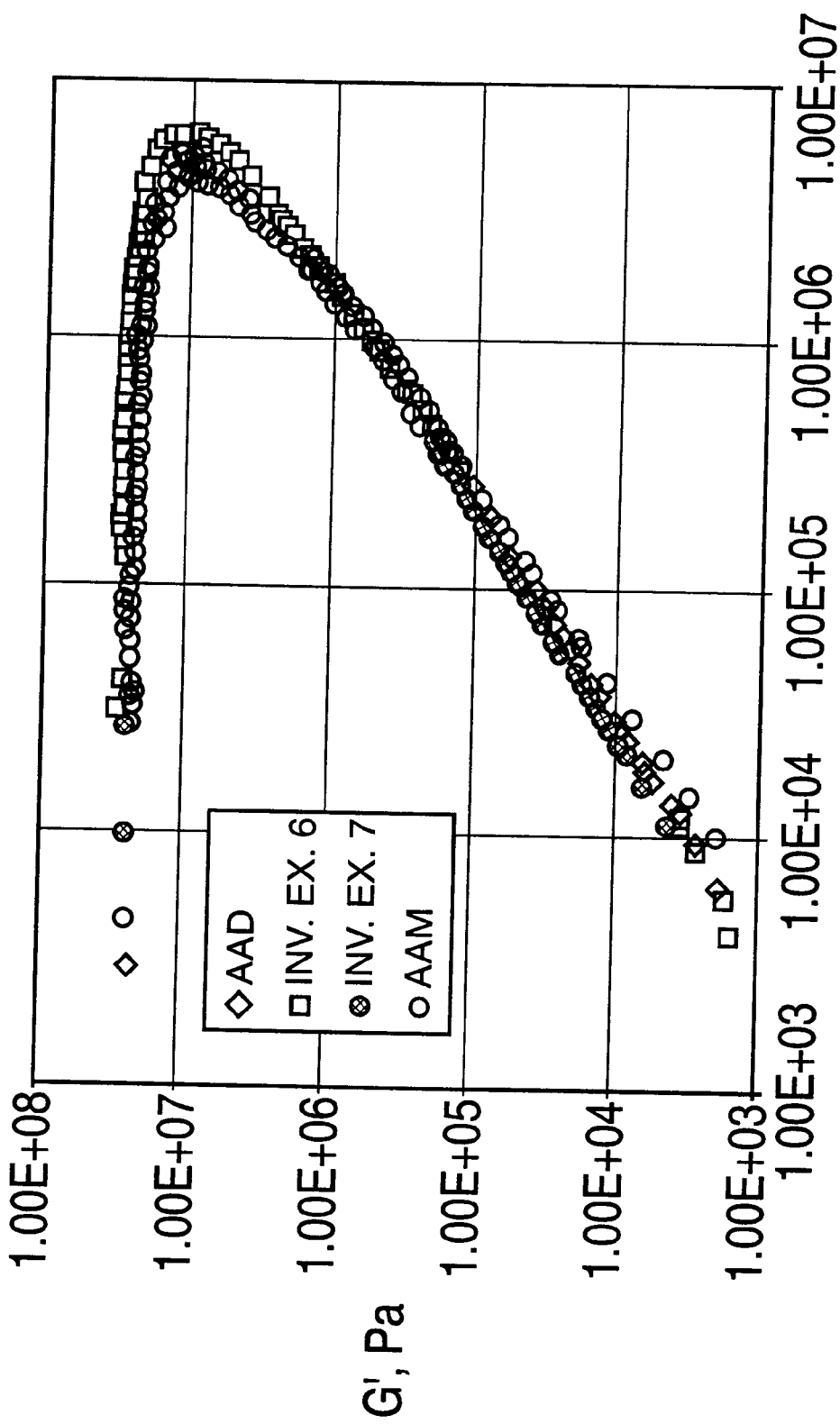
FIG. 30 shows a plot of G' versus G" for two comparative examples and two inventive examples.
Figure 31:
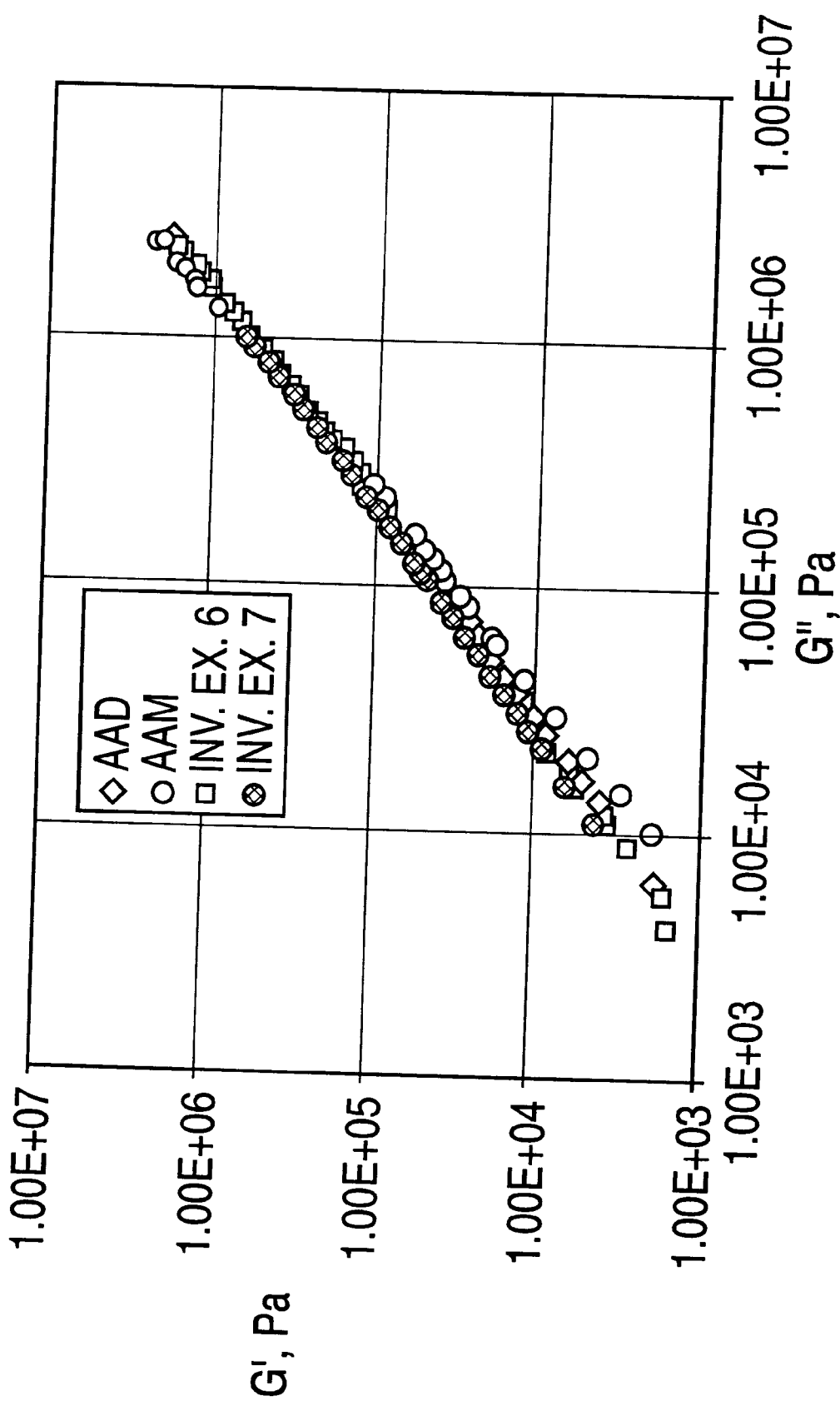
FIG. 31 shows the linear region in a plot of G' versus G" for two comparative examples and two inventive examples.

FIG. 28 plots G' against G" for AAD, AAM, and AAG. FIG. 20 gives an illustration of the linear region in the plots G' against G" for AAD, AAM, and AAG. Similarly, FIG. 30 gives the plots G' against G" for AAD, Inv. Exs. 6 and 7, and AAM. FIG. 31 gives an illustration of the linear region in the plots G' against G" for AAD, Inv. Exs. 6 and 7, and AAM. As seen from these figures, the plot of G' against G" was virtually independent of temperature. As discussed earlier, the linear portion of the logarithmic plots of G' against G" in FIGS. 29 and 31 can be extended up at G" about $10^6$ Pa. This suggests that the pure and coproduct-filled asphalt binders have a relatively small rubbery region because of the low molecular weight. As recorded in Table 14, Eq. (2) can be used to describe the linear region on the logarithmic plots of G' against G" for all the asphalt binders and modified asphalt binders.

TABLE 14

Flow Region and Glass Transition Region in the logarithmic plots of G' against G"

| Asphalts | Comp. Ex. | Inv. Ex. | Content wt. % | Viscous Flow Region: $G' = \kappa^*(G")^\chi$ | | | Glass Transition Region | | | |
|---|---|---|---|---|---|---|---|---|---|---|
| | | | | $\kappa$ | $\chi$ | $R^2$ | G"max (Pa) | G' (Pa) | tan ($\delta$) | $a_T \omega$ (rad/s) |
| AAG | A | | 0.0 | 0.00022 | 1.4928 | 0.999 | $6.78 \times 10^6$ | $8.97 \times 10^6$ | 0.756 | 115 |
| | | 1 | 13.0 | 1.18523 | 0.9470 | 0.995 | $8.80 \times 10^6$ | $1.60 \times 10^7$ | 0.548 | 40 |
| AAM | B | | 0.0 | 0.01323 | 1.2819 | 0.999 | $4.92 \times 10^6$ | $1.02 \times 10^7$ | 0.480 | 1855 |
| | | 3 | 7.5 | 0.03381 | 1.2188 | 0.999 | $5.68 \times 10^6$ | $1.48 \times 10^7$ | 0.384 | 43400 |
| | | 2 | 20.0 | 0.07076 | 1.1772 | 0.999 | $4.84 \times 10^6$ | $1.09 \times 10^7$ | 0.444 | 2106 |
| AAD | C | | 0.0 | 0.00541 | 1.1713 | 0.998 | $5.56 \times 10^6$ | $9.63 \times 10^6$ | 0.578 | 4310 |
| | | 6 | 7.5 | 0.11682 | 1.1155 | 0.999 | $6.53 \times 10^6$ | $1.31 \times 10^7$ | 0.498 | 11689 |
| | | 7 | 20.0 | 0.14801 | 1.1028 | 1.000 | $5.74 \times 10^6$ | $1.32 \times 10^7$ | 0.434 | 7065 |

TABLE 14-continued

Flow Region and Glass Transition Region in the logarithmic plots of G' against G"

| Asphalts | Comp. Ex. | Inv. Ex. | Content wt. % | Viscous Flow Region: $G' = \kappa^*(G'')^\chi$ | | | Glass Transition Region | | | |
|---|---|---|---|---|---|---|---|---|---|---|
| | | | | $\kappa$ | $\chi$ | $R^2$ | G"max (Pa) | G' (Pa) | tan ($\delta$) | $a\tau\omega$ (rad/s) |
| AAA | D | | 0.0 | 0.01617 | 1.2467 | 0.999 | $7.00 \times 10^6$ | $1.15 \times 10^7$ | 0.610 | 19313 |
| | | 14 | 7.5 | 0.02823 | 1.2058 | 0.997 | $6.79 \times 10^6$ | $1.16 \times 10^7$ | 0.587 | 6949 |
| | | 15 | 20.0 | 0.02535 | 1.2463 | 0.992 | $1.01 \times 10^7$ | $3.84 \times 10^6$ | 0.381 | 667000 |

Figure 32:
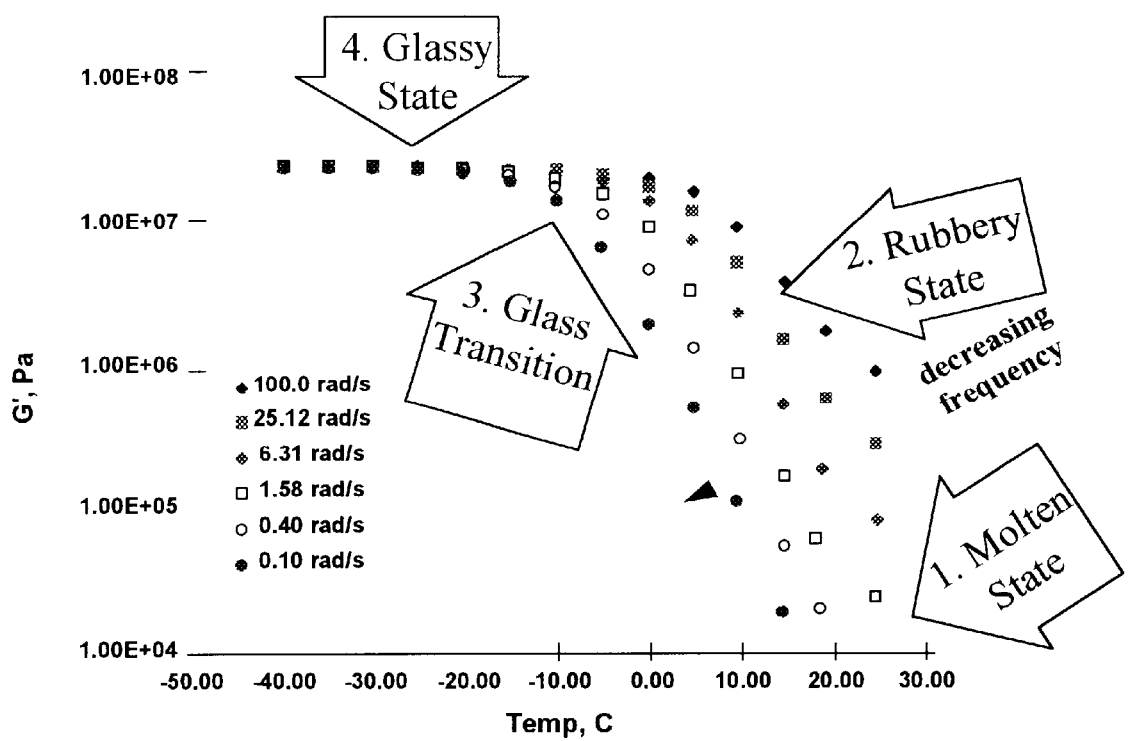
FIG. 32 shows the four transition regions in a plot of log G' as a function of temperature for a comparative example.
Figure 33:
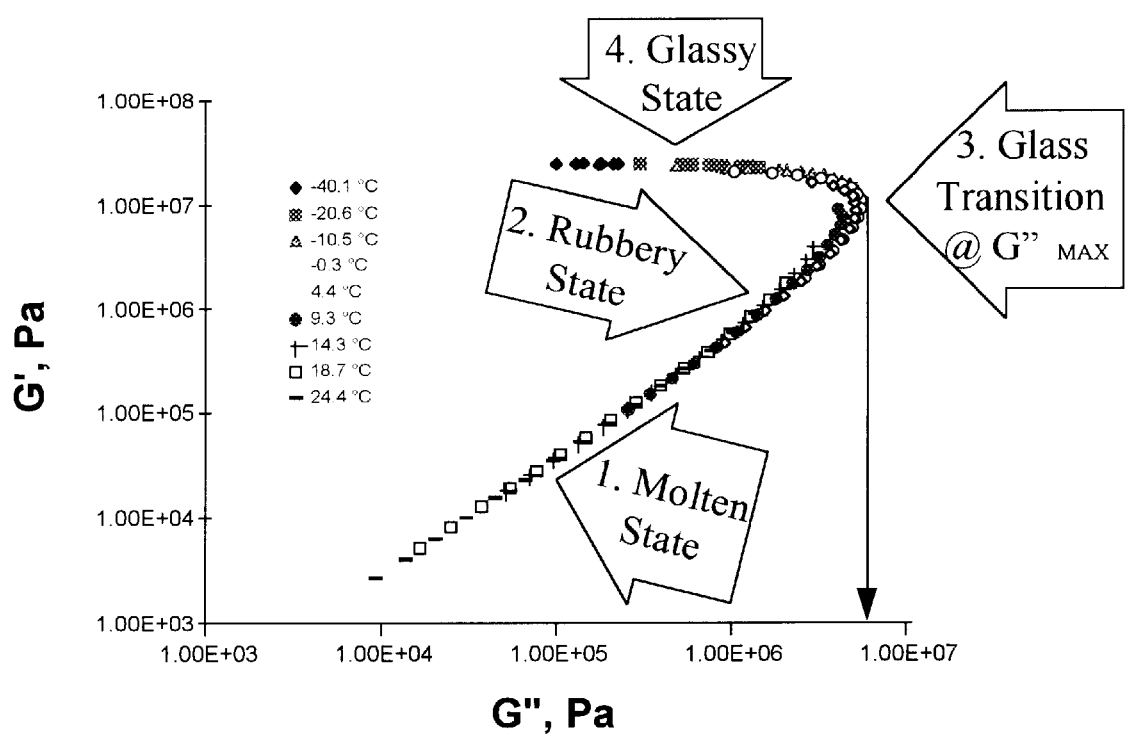
FIG. 33 shows the four transition regions in a plot of log G' versus log G' for a comparative example.

It was reported by Rong and Chaffey (1988) that the four transition states observed in the conventional logarithmic plots of modulus against temperature/frequency/time as seen in FIG. 32 can be translated into the logarithmic plots of G' against G" in FIG. 33. Rong and Chaffey recommended the use of the logarithmic plots of G' against G" to construct a mastercurve to interpret the viscoelastic response of material because it does not involve an arbitary shift factor. As illustrated in FIG. 33, they defined:

1. The glassy state when G' is greater than G' at G"$_{max}$ or d log G'/d log G" is negative.
2. The glassy transition where G' at G' (G"$_{max}$) or d log G'/d log G" is infinite.
3. The rubbery behavior, when G' is less than G' at G"$_{max}$ or d log G'/d log G" is positive but is not a constant.
4. The viscous flow or molten region is where G' is less than G' at G"$_{max}$ or d log G'/d log G" is positive and a constant.

The parameters obtained from the viscous flow regions and the glass transition region appear to the performance grading of the asphalt evaluated. A smaller value of $\chi$ (d log G'/d log G") in the viscous flow region implies that the asphalt may provide lower temperature flexibility. On the other hand, a smaller value of tan ($\delta$) at G"$_{max}$ in the glass transition region suggests that the asphalt may provide high temperature resistance. As seen from the Table 14, Inv. Ex. 7 that has a similar $\chi$ value to AAD (Comp. Ex. C) and a smaller value of tan ($\delta$) at G"$_{max}$ compared with AAM (Comp. Ex. B). This would suggest that the performance grading of AAD should be potentially around PG 76-28.

NMR has been a technique of growing interest to characterize the molecular motion of asphalts. Solid-state NMR has not been widely applied to these types of asphalts until recently. Netzel pointed out that solid state NMR spectra can be more advantageous than the solution-state NMR because carbon types in different crystalline and amorphous phase structure can be quantified. Both the $^{13}C$ NMR spectra and the spin lattice relaxation rate in the rotating frame ($T_{1_{\rho}C^{-1}}$) were examined on the selected asphalts and asphalt compositions. All of the asphalt samples have nearly the same CPMAS spectrum, implying similar chemical composition. There is a broad aliphatic component centered at ~30 ppm and an aromatic component at ~125 ppm. The aliphatic resonance has some structure, indicating some discreteness in the chemical structures monitored across the lineshape.

Since the spectra of all the samples were nearly identical, $^{13}C$ relaxation measurements were performed to detect possible differences in the molecular mobility. $T_{1_{\rho}C^{-1}}$ relaxation is an indirect measure of the spectral density of the motional correlation function at the frequency of the spin lock, $\omega_1/2\pi$, in this case, ~50 kHz. $^{13}C$ spin-lattice relaxation rates in the rotating frame across the aliphatic part of the lineshape at approximately the position indicated are presented in Table 15. Though variable temperature experiments are further required to measure the correlation times of the motions, certain trends can already be seen in the data of the various samples.

TABLE 15

| Comp. Ex. | Inv. Ex. | Asphalt | Wt % Additive | 30 ppm (sec$^{-1}$) | 25 ppm (sec$^{-1}$) | 22 ppm (sec$^{-1}$) | 16 ppm (sec$^{-1}$) |
|---|---|---|---|---|---|---|---|
| B | | AAM | AAM | 0.52 | — | 0.38 | 0.31 |
| | 2 | AAM | 20 wt % coproduct | 0.53 | — | 0.31 | 0.27 |
| C | | AAD | AAD | 0.81 | — | 0.59 | 0.67 |
| | 7 | AAD | 20 wt % coproduct | 0.51 | 0.38 | 0.26 | 0.35 |
| H | | AAD | 20 wt % limestone | 0.71 | — | 0.54 | 0.52 |
| E | | AAD | 20 wt % hydrated lime | 0.60 | — | 0.52 | 0.42 |

AAD (Comp. Ex. C) showed rapid relaxation rates at different positions across the lineshape. This is an indication of rapid chain mobility. AAM (Comp. Ex. B), which has superior rheological properties, exhibited much slower relaxation, indicating comparatively more restricted chain dynamics.

The addition of limestone to AAD (Comp. Ex. H) "improves" the product in the sense of adjusting the molecular dynamics to make it more similar to AAM (Comp. Ex. B). Hard lime continues to "improve" the product (Comp. Ex. E). The addition of 20% coproduct to AAD (Inv. Ex. 7) resulted in a material with molecular dynamics nearly identical to AAM. This is consistent with our conclusion based on Theological properties: addition of coproduct enhances the properties of AAD, making the resultant composition quite similar to AAM. The addition of the coproduct to AAM (Inv. Ex. 2) continued to slow the relaxation rates of the material slightly. Notably, the relaxation times across the entire lineshape were affected by the addition of coproduct. This is not simply a case of a slowly-relaxing component being added in at levels at which it dominates the average relaxation parameters, but instead appears to be a situation in which the coproduct is modifying the entire matrix by affecting the mobility of most of the asphalt chains. The results seem to agree with the data for tan ($\delta$) at G"$_{max}$ (Table 14). Thus, this is preliminary evidence for a significant correlation between enhanced rheological properties and molecular mobility as measured by solid-state NMR.

To evaluate rutting (permanent deformation) of asphalt-aggregate mixtures modified with coproduct, coproduct was added at two levels (7.5 wt % and 20 wt %) to three different asphalts: AAM, AAD and AAA (Comp. Exs. B, C and D, respectively). A siliceous gravel mixture was used to make the asphalt-aggregate mixtures. The results were compared with identical mixtures without coproduct modification of the asphalt. The total binder content was kept constant in all mixtures (total binder=asphalt plus coproduct).

The asphalt-aggregate mixtures evaluated were designed to have a high rut potential. Aggregate was chosen such that the resulting mix would be more susceptible to binder properties. The aggregate type used was sub-rounded, siliceous river gravel. Limestone fines were added to the aggregate blend to improve stability. This formulation proved to be highly rut susceptible in past tests with various binders and additives (D. E. Makunike, "An Evaluation of Permanent Deformation Properties of Crum Rubber Modified Asphalt Concrete Mixtures", 1995 Thesis, Texas A&M University). Aggregate for the mix design is shown in Table 16. This mix contained a top size aggregate of 9.5 mm of uncrushed siliceous river gravel, and a natural field sand. To increase rut potential, the formulation deliberately included a high field sand percentage of 18%.

TABLE 16

| Aggregate Type | Sieve size (mm) | Percentage retained on sieve |
| --- | --- | --- |
| Large river gravel | 9.5 | 15 |
| Small river gravel | 4.75 | 30 |
| Construction sand | 1.18 | 37 |
| Field sand | 0.6 | 18 |

Figure 34:
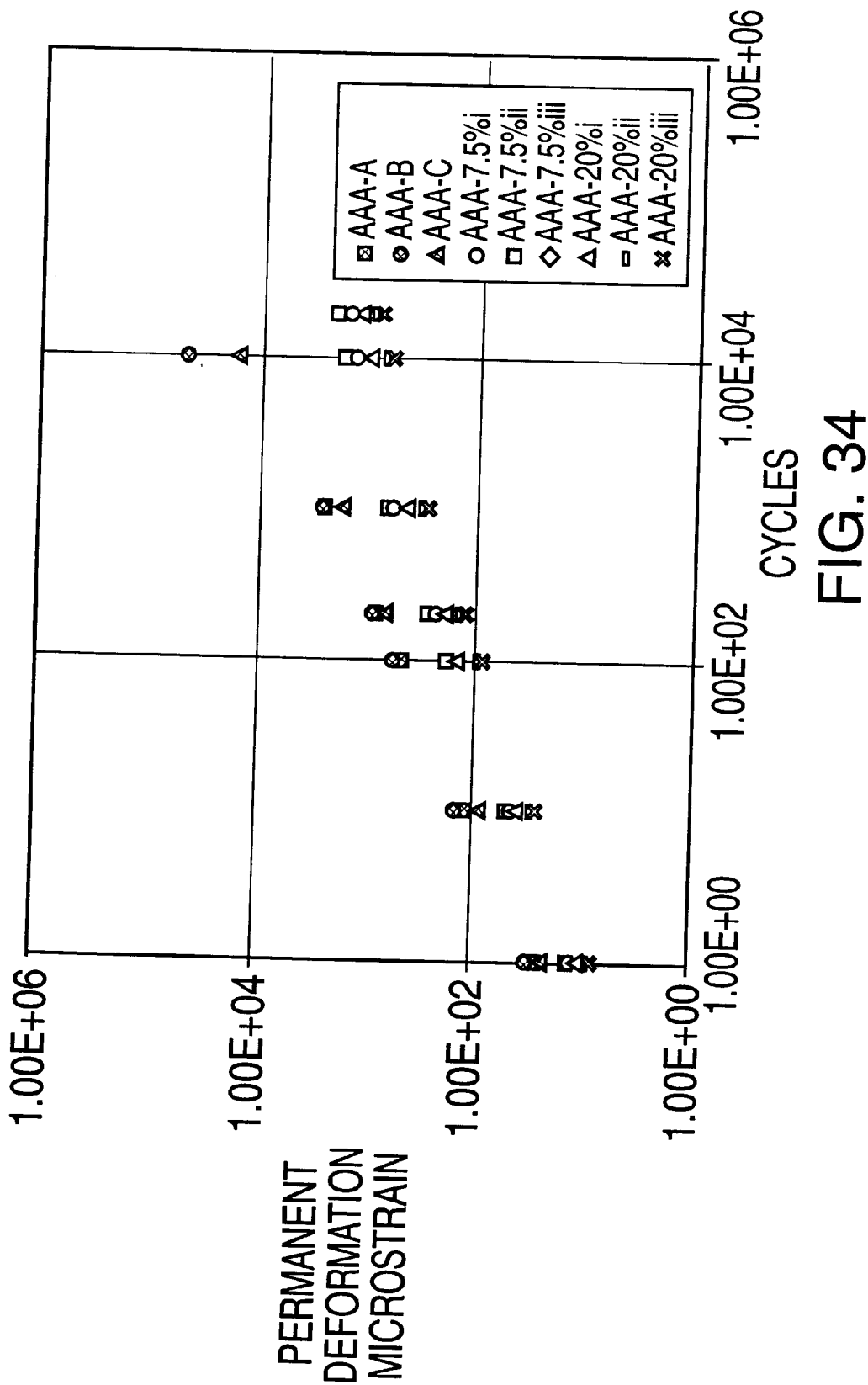
FIG. 34 shows a plot of permanent deformation as a function of cycle for a comparative example.
Figure 35:
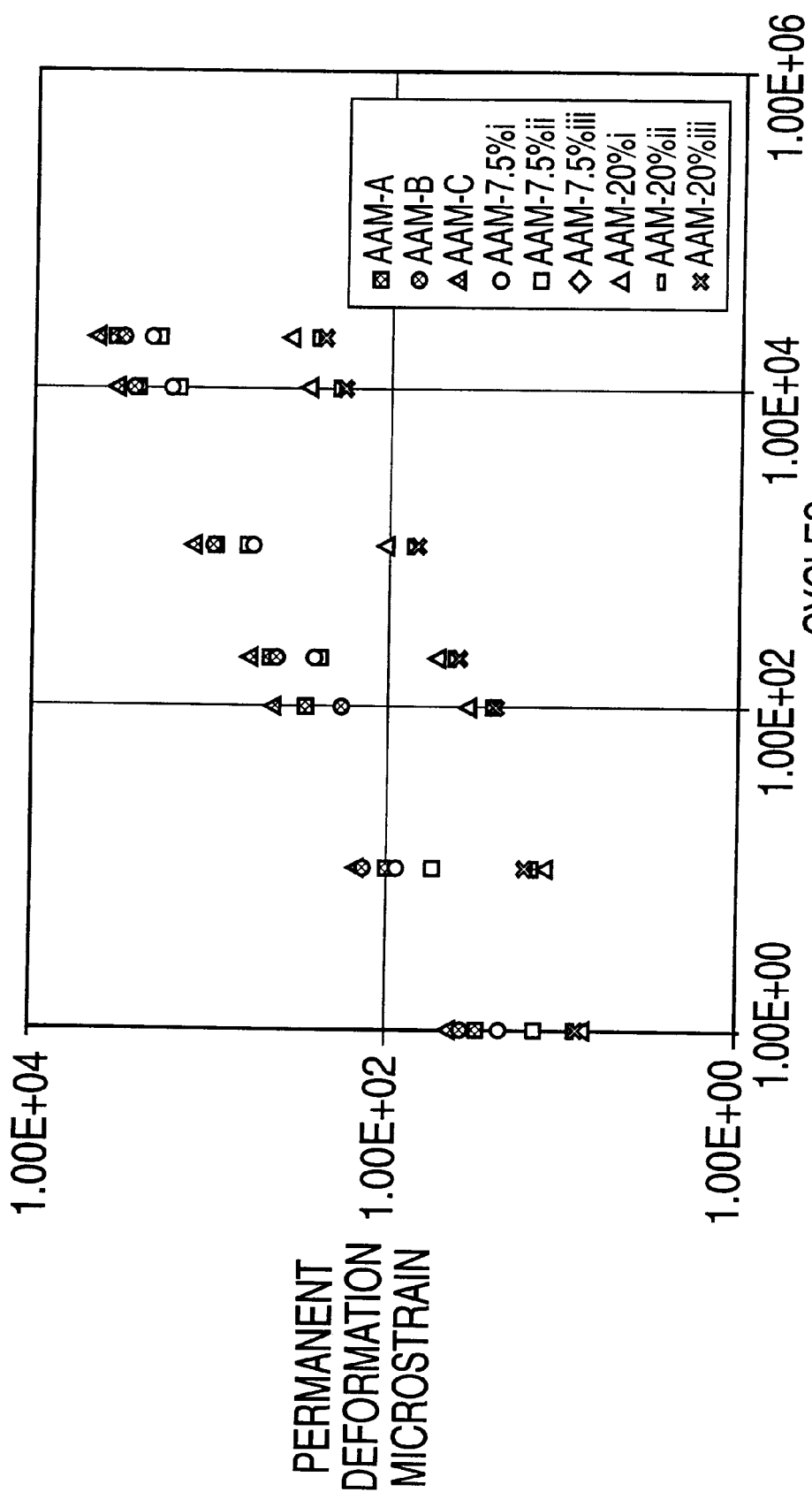
FIG. 35 shows a plot of permanent deformation as a function of cycle for another comparative example.
Figure 36:
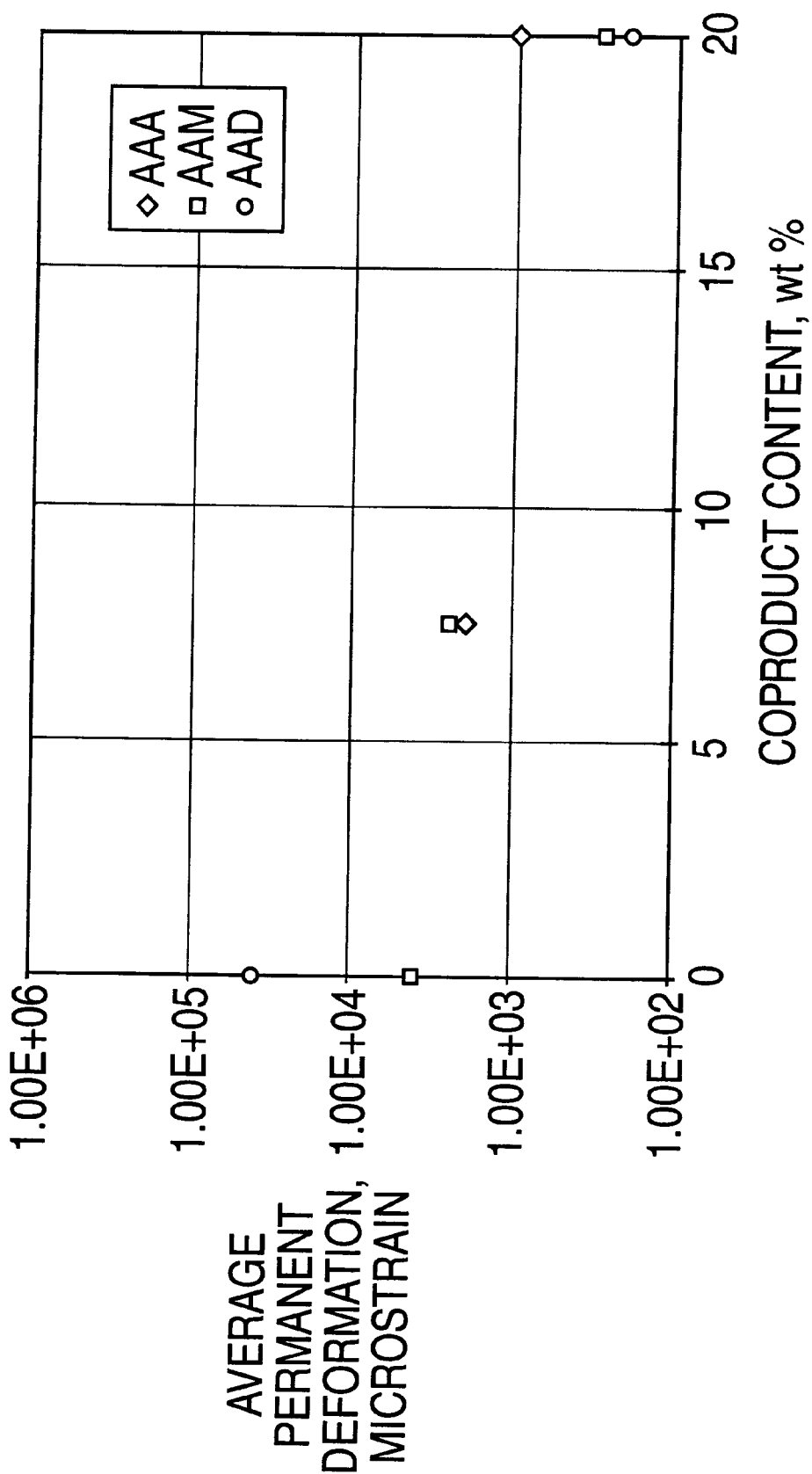
FIG. 36 shows a plot of average permanent deformation as a function of coproduct content.
Figure 37:
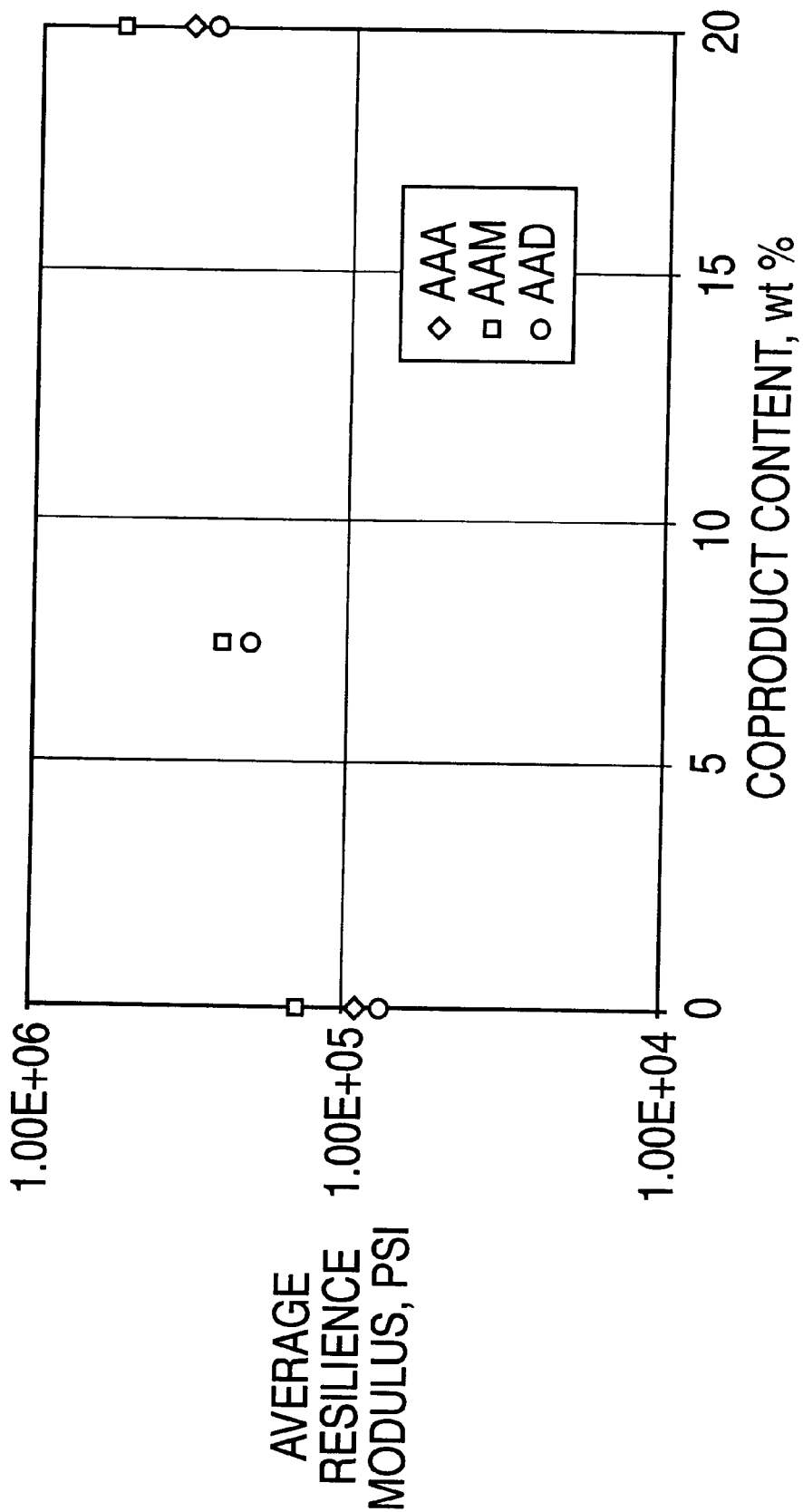
FIG. 37 shows a plot of average resilience modulus as a function of coproduct content.

FIGS. 34 and 35 show the permanent deformation as a function of the number of cycles for Comp. Ex. D and B, respectively; three replicates measurements were done on each sample (labeled i, ii and iii). FIG. 36 shows the average permanent deformation as a function of coproduct content, and FIG. 37 shows the average resilience modulus as a function of coproduct content, for compositions using Comp. Exs. B, C and D. From an analysis of the data, the following trends were noted:

1. For binder AAA, the addition of 7.5 wt % coproduct substantially improved deformation resistance and changed the rate of rutting from a tertiary rate of permanent deformation to a steady-state level. The addition of 20 wt % coproduct further improved the deformation resistance (when compared to the 7.5 wt % addition) but to a much lesser level. This was a logical and favorable trend as it demonstrated the very substantial improvement with reasonable levels of coproduct (7.5 wt %).
2. For binder AAD, the results compared only the neat binder with the 20 wt % coproduct modified binder. The results were similar to those from AAA in that the additive changed the mixture response from tertiary dynamic creep to steady-state dynamic creep. However, the magnitude of the deformation reduction was much greater for AAD than for AAA.
3. For binder AAM, the results were quite different than for AAA and AAD. In this case the addition of 7.5 wt % coproduct significantly reduced deformation, but not to the level that occurred in AAA or AAD. This was largely due to the fact that the AAM mixtures were more stable to begin with than the AAA and AAD mixtures and unlike the AAA and AAD mixtures did not exhibit tertiary dynamic creep. The addition of 20 wt % coproduct dramatically improved rut resistance over the 7.5 wt % additive rate.
4. The addition of the coproduct, like most polymer-type additives, was asphalt dependent; and the interaction between the coproduct and the bitumen was important. This interaction is controlled by the chemical and compositional makeup of the asphalt.

Experiment 2: Plastic Binders

The use of coproduct as a filler in plastic lumber products was tested by compounding coproduct with various polymers typically used in the manufacture of plastic lumber. These polymers were derived from recycled plastic products and included: a film fraction (LDPE), a hollow shaped container fraction (HDPE), a cup fraction (PP) and a mixed plastics fraction. The compounding was done using a twin screw extruder (Werner and Pfleiderer ZSK 25). Mill-ground coproduct was added to the polymer fraction to achieve approximately pre-determined levels of $CaCO_3$ in the final sample, based on a coproduct composition of about 65 wt % $CaCO_3$. Control samples were also made using pure $CaCO_3$ (Socal 2G31UF, supplier) to achieve the pre-determined levels of $CaCO_3$. The parameters of extrusion for all four polymer types were: the processing temperature was 200° C., the screw-speed was 200 rpm and the vent zone was a vacuum.

Various properties were measured for each sample. To determine $CaCO_3$ content, the samples were burned to a carbonaceous substance and then ashed at 625° C. in a muffle furnace in conformity with ISO 1172. Small amounts of CaO, which had been formed at this temperature were recalculated as $CaCO_3$. The melt volume index (MVI) was determined using a Gottfert-melt-tester MPR at 230° C. and 2.16 kilogram loading in conformity with ISO 1133. The Charpy impact strength, notched (NCH) and unnotched (UNCH), was determined at 23° C. and −30° C. using a Zwick-Pendelschlagwerk in conformity with DIN EN ISO 179 1e. The tensile strength (TS) and modulus (TM) were determined according to DIN EN ISO 527-1 (tensile test) using an Instron test system. The flexural modulus (FM) and the flexural stress (FS) were determined using an Instron test system in conformity with DIN EN ISO 178 (three point flexural test). The heat deflection temperature (HDT) was determined using the HDT-Vicat test system (Coesfeld Comp.) in conformity with DIN EN ISO 75 (procedure A). The thermal expansion was determined using the dilatometer TMA 200 (Netzsch Comp.) in conformity with DIN 53 752. The specimens were prepared using an injection molding machine (Aarburg Comp.). All measurements for the thermal expansion tests were carried out under standard conditions (23° C. and 50% relative humidity) on fresh injection molded specimens. These data are reported in Table 17.

TABLE 17

| Comp. Ex. | Inv. Ex. | Plastic | Co-product (wt %) | CaCO₃ (wt %) | MVI (cm³/10 min) | HDT/A (° C.) | TS (MPa) | TM (MPa) | Impact strength, 23° C. (kJ/m²) UNCH | NCH | Impact strength, -30° C. (kJ/m²) UNCH | NCH | FS (MPa) | FM (MPa) | Thermal expansion, α× 10⁵ (K⁻¹) TD[9] | MD[10] |
|---|---|---|---|---|---|---|---|---|---|---|---|---|---|---|---|---|
| I | | LP[11] | 0 | 1.07 | 1.56 | 36.0 | 15.50 | 259.3 | n.b.[12] | n.b. | n.b. | 9.12 | 5.23 | 343.8 | 12.5614 | 43.4421 |
| | 16 | LP | 9.3 | 6.05 | 2.40 | 35.5 | 12.60 | 327.8 | n.b. | 61.80 | n.b. | 4.28 | 6.33 | 287.4 | 15.8567 | 21.0672 |
| | 17 | LP | 23.5 | 15.26 | 1.81 | 38.0 | 12.10 | 474.7 | n.b. | 30.00 | 135 (2 × n.b.) | 3.88 | 9.22 | 500.4 | 15.8944 | 21.8335 |
| | 18 | LP | 43.0 | 27.94 | 2.09 | 43.0 | 10.81 | 792.2 | 52.30 | 6.93 | 16.90 | 2.75 | 12.88 | 767.8 | 17.6575 | 13.6150 |
| | 19 | LP | 59.0 | 38.33 | 2.76 | 45.0 | 9.58 | 1371.0 | 9.72 | 2.85 | 5.74 | 2.84 | 16.05 | 1087.0 | 16.1032 | 9.8986 |
| J | | LP | 0 | 9.27 | 1.14 | 40.2 | 15.48 | 329.7 | n.b. | 84.60 | n.b. | 7.75 | 6.34 | 416.7 | 12.1280 | 41.0484 |
| K | | LP | 0 | 20.67 | 0.70 | 37.1 | 15.33 | 404.4 | n.b. | 87.20 | n.b. | 7.14 | 7.51 | 321.2 | 13.8356 | 32.4734 |
| L | | LP | 0 | 30.82 | 0.40 | 37.9 | 15.75 | 511.4 | n.b. | 81.50 | n.b. | 5.44 | 9.52 | 572.2 | 12.6521 | 28.9618 |
| M | | LP | 0 | 39.49 | 0.30 | 40.3 | 17.41 | 695.1 | n.b. | 42.50 | 165 (3 × n.b.) | 4.05 | 11.96 | 641.9 | 14.4712 | 25.3377 |
| N | | HP[14] | 0 | 1.01 | 1.22 | 47.0 | 23.50 | 958.8 | n.b. | 25.50 | n.b. | 3.79 | 16.30 | 853.9 | 11.2967 | 23.4004 |
| | 20 | HP | 10.6 | 6.87 | 0.80 | 43.2 | 21.93 | 1111.0 | n.b. | 6.49 | 64.40 | 3.58 | 18.55 | 1022.0 | 11.1659 | 19.5129 |
| | 21 | HP | 30.0 | 19.46 | 1.78 | 46.7 | 20.21 | 1454.0 | 37.40 | 3.98 | 18.40 | 2.77 | 22.43 | 1238.0 | 11.9384 | 17.7688 |
| | 22 | HP | 39.7 | 25.78 | 2.49 | 47.4 | 16.88 | 1777.0 | 14.40 | 2.85 | 9.34 | 2.52 | 25.72 | 1538.0 | 10.5066 | 11.5784 |
| | 23 | HP | 57.6 | 37.46 | 4.61 | 50.9 | 15.98 | 2304.0 | 6.77 | 1.87 | 5.31 | 1.31 | 27.70 | 2054.0 | 10.5515 | 10.5961 |
| O | | HP | 0 | 9.94 | 0.70 | 42.7 | 23.71 | 1089.0 | n.b. | 28.60 | 215 (9 × n.b.) | 3.77 | 18.15 | 1016.0 | 10.1920 | 24.5992 |
| P | | HP | 0 | 20.49 | 0.50 | 44.0 | 22.40 | 1276.0 | n.b. | 23.60 | 78.90 | 3.28 | 20.40 | 1205.0 | 9.8186 | 22.7335 |
| Q | | HP | 0 | 31.49 | 0.30 | 47.3 | 22.45 | 1609.0 | 110.0 | 13.90 | 31.10 | 2.89 | 23.97 | 1585.0 | 9.5276 | 17.6164 |
| R | | HP | 0 | 41.51 | 0.30 | 52.0 | 23.35 | 1923.0 | 64.60 | 9.04 | 17.00 | 3.16 | 28.68 | 1907.0 | 9.4693 | 17.6012 |
| S | | PP[19] | 0 | 2.16 | 11.95 | 49.8 | 28.80 | 1436.0 | 73.40 | 4.21 | 18.80 | 2.14 | 28.58 | 1251.0 | 14.2833 | 12.7442 |
| | 24 | PP | 16.0 | 10.38 | 11.39 | 56.1 | 26.34 | 1770.0 | 29.40 | 3.31 | 13.40 | 2.27 | 33.90 | 1529.0 | 12.7227 | 9.9954 |
| | 25 | PP | 27.8 | 18.05 | 11.69 | 56.5 | 23.67 | 2017.0 | 18.20 | 2.36 | 10.80 | 2.23 | 36.30 | 1820.0 | 11.0257 | 9.3262 |
| | 26 | PP | 45.4 | 29.49 | 14.10 | 58.4 | 19.84 | 2416.0 | 10.80 | 2.20 | 7.39 | 2.05 | 37.39 | 2095.0 | 10.0646 | 7.7831 |
| | 27 | PP | 57.7 | 37.51 | 17.26 | 59.4 | 17.33 | 3041.0 | 6.28 | 1.96 | 5.13 | 1.22 | 34.01[a] | 2568.0 | 8.3881 | 7.8196 |
| T | | PP | 0 | 9.48 | 8.79 | 50.8 | 26.93 | 1631.0 | 58.80 | 3.99 | 17.90 | 2.20 | 30.86 | 1299.0 | 13.0815 | 9.6314 |
| U | | PP | 0 | 16.74 | 6.62 | 53.9 | 23.50 | 1821.0 | 34.70 | 3.48 | 13.00 | 2.17 | 33.72 | 1550.0 | 11.2601 | 12.2704 |
| V | | PP | 0 | 24.27 | 5.02 | 57.1 | 21.55 | 2136.0 | 17.40 | 2.80 | 8.73 | 1.74 | 36.98 | 1885.0 | 10.8040 | 10.8612 |
| W | | PP | 0 | 36.73 | 2.97 | 57.1 | 20.54 | 2574.0 | 10.80 | 1.93 | 5.51 | 1.22 | 37.46 | 2357.0 | 8.5191 | 10.7480 |
| X[15] | | MP[16] | 0 | 8.66 | 19.86 | 43.5 | 13.58 | 929.0 | 68.60 | 8.79 | 19.30 | 3.04 | 15.20 | 841.0 | 18.3807 | 13.6230 |
| | 28 | MP | 21.3 | 13.85 | 13.40 | 43.6 | 12.78 | 1056.0 | 30.70 | 6.14 | 14.60 | 2.51 | 16.28 | 989.0 | 16.2555 | 9.6800 |
| | 29 | MP | 35.5 | 23.09 | 8.20 | 43.8 | 12.19 | 1100.0 | 27.00 | 5.02 | 12.10 | 2.34 | 16.04 | 969.0 | 15.0044 | 12.6137 |
| | 30 | MP | 39.3 | 25.52 | 7.40 | 47.0 | 10.69 | 1720.0 | 8.20 | 2.48 | 6.45 | 2.03 | 19.28 | 1378.0 | 14.2947 | 8.0148 |
| | 31 | MP | 56.0 | 36.41 | 10.70 | 49.1 | 11.35 | 2285.0 | 5.25 | 1.74 | 4.71 | 1.22 | 20.96[a] | 2010.0 | 11.2151 | 7.6050 |
| Y | | MP | 0 | 13.24 | 15.00 | 45.3 | 13.03 | 970.0 | 58.80 | 8.16 | 18.00 | 2.60 | 15.93 | 886.0 | 15.5621 | 11.6972 |
| Z | | MP | 0 | 23.77 | 6.20 | 44.1 | 13.45 | 1119.0 | 38.00 | 6.78 | 14.10 | 2.36 | 16.91 | 1012.0 | 16.2925 | 11.8804 |
| AA | | MP | 0 | 45.32 | 9.50 | 45.1 | 12.48 | 1618.0 | 15.00 | 3.74 | 6.95 | 1.42 | 20.90 | 1467.0 | 13.2661 | 11.1823 |
| BB | | MP | 0 | 35.05 | 6.63 | 46.4 | 12.94 | 1317.0 | 23.00 | 4.89 | 9.49 | 2.26 | 18.47 | 1234.0 | 11.8159 | 12.2513 |

[9]"TD" stands for transverse direction.
[10]"MD" stands for machine direction.
[11]"LP" stands for LDPE, film fraction.
[12]"n.b." stands for no break.
[13]"HP" stands for HDPE, hollow shaped container fraction.
[14]"PP" stands for polypropylene, cup fraction.
[a]These values are flexural stress at break.
[15]This sample contained 5% CaCO₃ to avoid the formation of hydrochloric acid from the small quantity of PVC present in this waste stream.
[16]"MP" stands for the mixed-plastics fraction.

The flowability (MVI) decreases with increasing coproduct addition up to about 25 wt % CaCO₃ content. Above 25 wt % CaCO₃ content, the organic content of coproduct appeared to influence the MVI to get higher values, as the corresponding CaCO₃-alone samples did not show the same increase. With the exception of the mixed plastics samples, the addition of coproduct, especially at the higher contents, generally improved the MVI compared to the unfilled polymer. In contrast, the CaCO₃-filled samples decreased the MVI compared to the unfilled polymer.

In contrast to the CaCO₃-filled samples, the increased content of coproduct may cause a slight decrease in tensile strength. Thus, this tendency was apparently due to the coproduct's organic components. Both the tensile and flexural moduli increased dependent on ash content compared to the unfilled polymer. At the higher coproduct concentrations, the moduli of the coproduct filled samples are especially increased compared to the corresponding Comparative Examples, again suggesting this tendency was influenced by the organic components of coproduct. The impact strength decreased at higher CaCO₃ contents dependent on the kind of polymer. The heat deflection temperature was improved with increased additive content and thermal expansion is reduced.

These data demonstrated that coproduct could be successfully used as a filler in plastics without adversely affecting processability or properties, and possibly enhancing some properties.

Subsequently, a plant trial at a commercial recycling plant in Germany was performed using mixed plastics with about 31 wt % coproduct added to achieve a 20 wt % CaCO₃ content in the composition. Compounding was done using a twin screw extruder (Werner and Pfleiderer ZSK 40). The extrusion parameters were as before. To generate palisades, for use in landscaping, the following process data for intrusion were used: screw speed was 44 rpm; injection pressure was 17 bar; injection time was 80 seconds; the barrel temperatures were 125° C., 160° C. and 100° C. for sections 1,2 and 3 respectively; the melt temperature was 160–170° C. and the output rate was about 20–25 kilograms per hour. The palisade sample was tested in the same methods described for the data in Table 17 and the data are presented Table 18.

TABLE 18

|  |  | Inv. Ex. 32 |
| --- | --- | --- |
| $CaCO_3$ content |  | 20 wt % |
| MVI |  | 8.1 cm$^3$/10 min |
| HDT/A |  | 44.0° C. |
| Thermal expansion | TD | 16.6958 × 10$^{-5}$ K$^{-1}$ |
|  | MD | 7.3578 × 10$^{-5}$ K$^{-1}$ |
| Tensile strength |  | 12.38 MPa |
| Tensile modulus |  | 1013.0 MPa |
| Flexural stress |  | 14.67 MPa |
| Flexural modulus |  | 926.5 MPa |
| Charpy impact strength, 23° C. | unnotched | 27.0 kJ/m$^2$ |
|  | notched | 6.81 kJ/m$^2$ |
| Charpy impact strength, −30° C. | unnotched | 13.7 kJ/m$^2$ |
|  | notched | 2.77 kJ/m$^2$ |

These data demonstrated that coproduct-filled mixed plastics can be made into palisades using a process of intrusion. Furthermore, the properties of the resultant palisade achieved the standard quality of palisades from the recycling plant.

Experiment 3: Thermosetting Polyester Binder

In view of its high calcium carbonate content, coproduct may have value as a low cost filler for thermosetting molding compounds such as bulk molding compounds (BMC), sheet molding compounds (SMC), and thick molding compounds (TMC). From its composition, coproduct may in fact offer more than just an inorganic filler; potentially it may be a low-profile performance additive. Synergy may be found if it can partially replace the current calcium carbonate in the current formulations.

A typical valve cover formulation (Comp. Ex. CC) was used to determine the effect of coproduct in performance. Comp. Ex. CC utilized this typical formulation. In the Inventive Examples, two different sizes of coproduct particles were used: coarsely ground chip (<32 mesh) and finely ground and screened (<325 mesh). As seen in Table 19, some of the aluminum trihydrate and all the $CaCO_3$ were replaced by coproduct in the Inventive Examples.

TABLE 19

| Materials | Function | Comp. Ex. CC | Inv. Ex. 33 | Inv. Ex. 34 |
| --- | --- | --- | --- | --- |
| Vinyl Ester Resin (Blended) | Resin | 22 | 22 | 22 |
| Peroxide | Catalyst |  |  |  |
| Additives | Low profile, glass bubles, chopped glass fibers | 31.5 | 31.5 | 31.5 |
| Aluminum Trihydrate | Flame Retardant | 40 | 30 | 30 |
| $CaCO_3$ (Precipitated) | Filler | 5 | 0 | 0 |
| Coproduct (<32 mesh) | New Filler | 0 | 15 | 0 |
| Coproduct (<325 mesh) | New Filler | 0 | 0 | 15 |
| TOTAL |  | 98.5 | 98.5 | 98.5 |

Resin with peroxide was poured into a 5 kg Baker-Perkin mixer with a sigma blade mixing elements. The materials were mixed at a low speed. After 5 minutes, all the fillers were added and mixed for an additional 5 minutes. Once the mixture looked very good (as a paste) after 1.5 minutes, a $Mg(OH)_2$ paste was added as a thickener and mixed for an additional minute. Then the fibers were added to the mixture and the materials were mixed for another 6 minutes. After the mixing procedure, the materials were poured into a container for thickening aging. It normally takes about two or three days to complete the thickening reactions.

Right after mixing, molding resin was placed into a cavity mold to compression mold samples to prepare samples for testing as outlined in Table 6.5. Mold temperatures were 320° F. top and 330° F. for 2 minutes.

A 12"×12"×0.110" plaque was used to determine surface defects. A low profile surface is desirable. Only Inv. Ex. 34 having the finely ground and screened coproduct showed an acceptable level of roughness and pitting, comparable to the Comparative Example.

The tensile properties, measured in accordance with ASTM D 638, were measured on the three samples and are presented Table 20.

TABLE 20

| Comp. Ex. | Inv. Ex. | Energy at Break (lbs-in) | Strength at Break (psi) | Strain at Break (%) |
| --- | --- | --- | --- | --- |
| CC |  | 16.3 | 7110 | 1.58 |
|  | 33 | 6.1 | 4660 | 1.00 |
|  | 34 | 16.6 | 7708 | 1.73 |

These results were notable since the properties of the typical formulation (Comp.Ex. CC) were matched by inv. Ex. 34, having coproduct at <325 mesh. Thermoset polyester is brittle and is quite poor in fatigue resistance. Proper design of resin matrix/toughener, surface treatment of fillers and fibers can overcome the problem somewhat However, the major issue for this type of bulk molding compound material is cost Therefore, the surface of the fillers and fibers used is not treated. The coproduct may provide an advantage because its surface has been "treated" with SBR that itself may be a good coupling agent between $CaCO_3$ and the thermoset resin.

Figure 38:
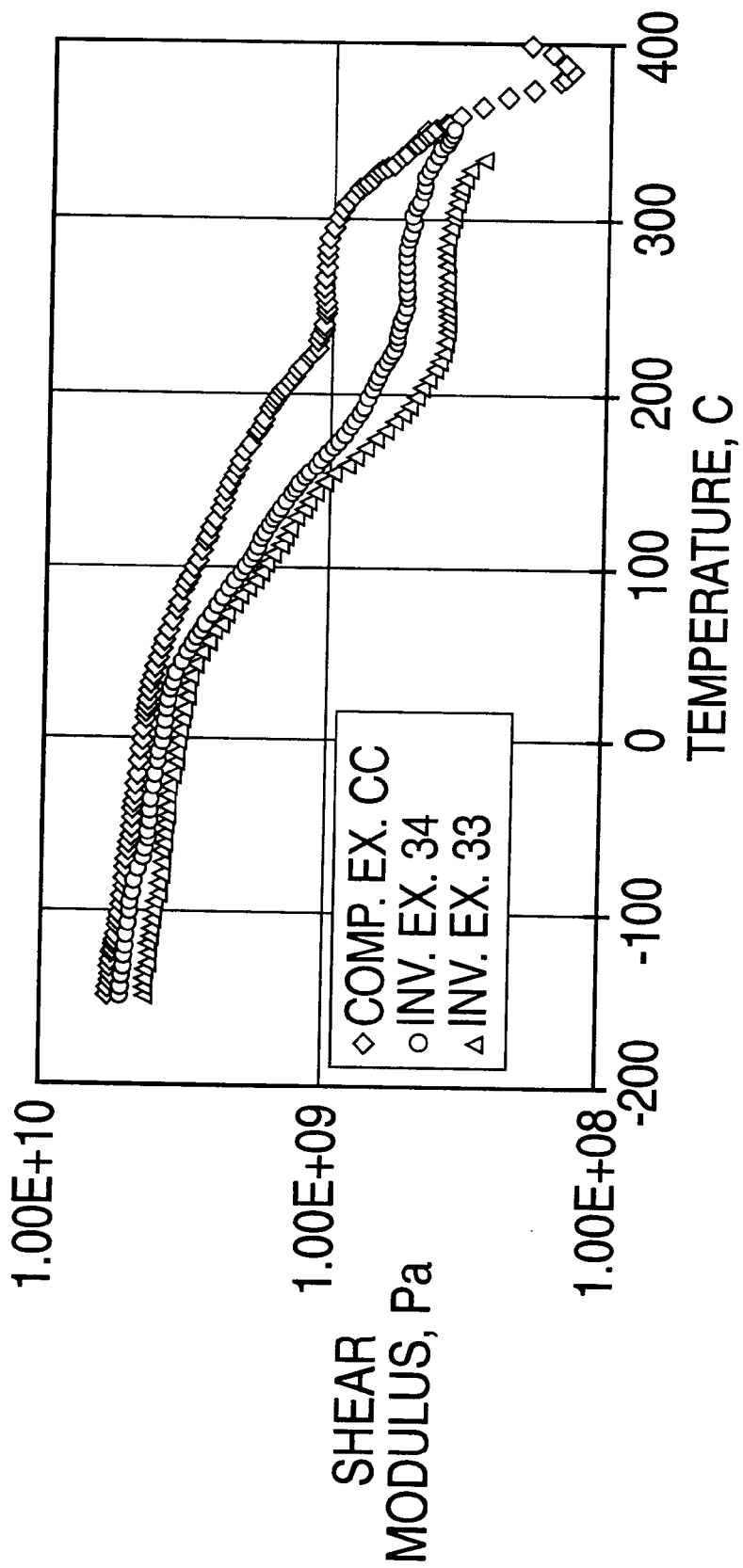
FIG. 38 shows a plot of shear modulus as a function of temperature for a comparative example and two inventive examples of bulk molding compounds.
Figure 39:
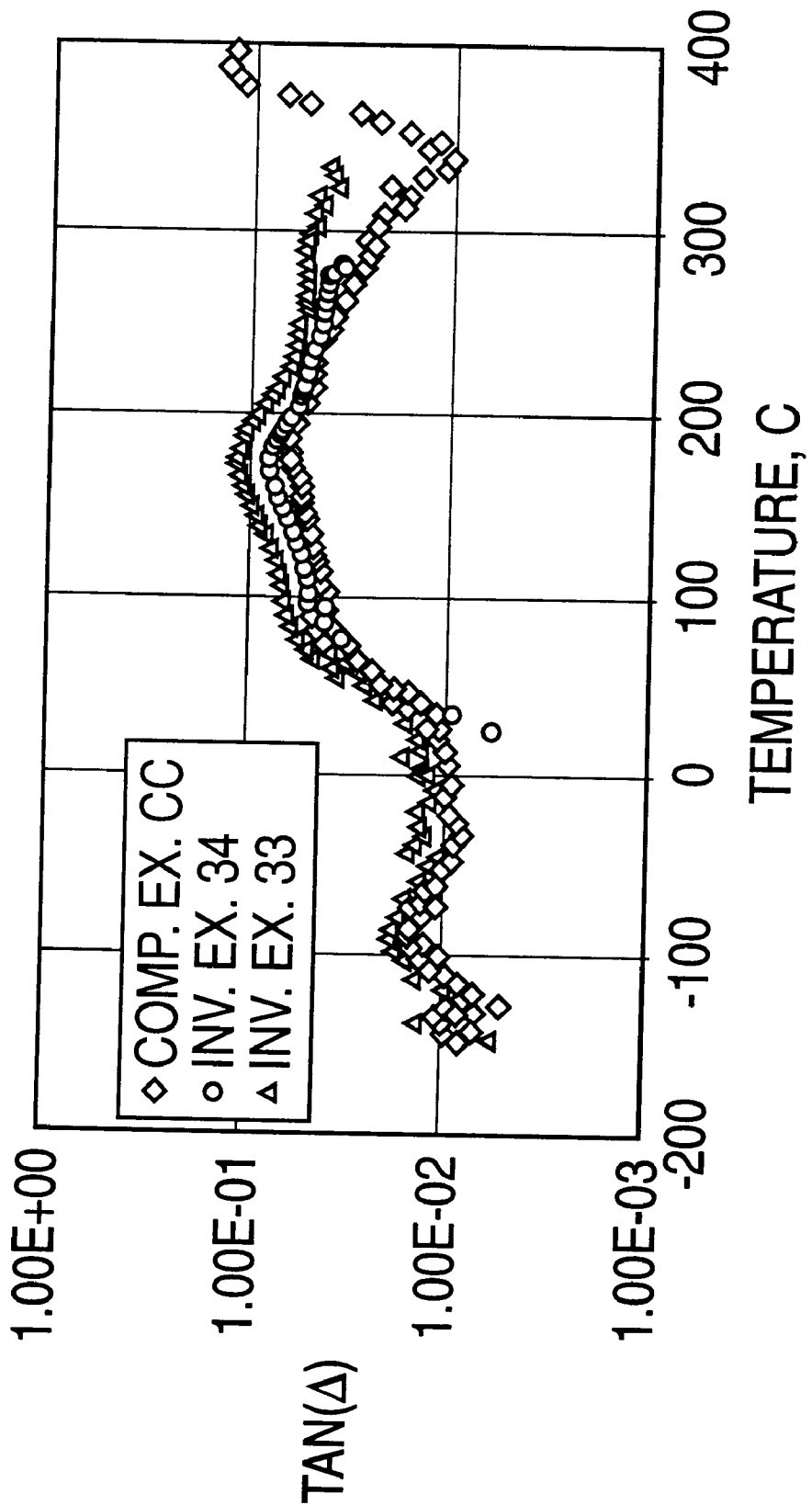
FIG. 39 shows a plot of tan($\delta$) as a function of temperature for a comparative example and two inventive examples of bulk molding compounds.

The dynamic mechanical results in FIGS. 38 and 39 were consistent with the tensile measurement, suggesting that the polyolefins in the coproduct exhibited a toughening effect. Notably, at higher temperatures (>300°), Inv. Ex. 34 showed a reduced rate of modulus drop with temperature compared to Comp. Ex. CC. Thus addition of fine mesh coproduct to thermoset polyesters may provide improved property retention at higher temperatures. This trend may prove very useful in that thermoset polyesters are generally known to be brittle and have poor property retention at higher temperatures.

Experiment 4: Cement Manufacturing Study

The coproduct, due to its high calcium carbonate content and thermal fuel value averaging 6,600 BTU/pound, may be used as a residue to enhance the cement manufacturing process. This use is advantageous because it fully employs the components of coproduct.

Cement is a product formed when limestone (calcium carbonate) is mixed with smaller amounts of sand, clay and iron oxide and calcined at temperatures between 2000 to 3000° F. Such a process is practiced on a large scale and is known, to those in the industry, as the dry Portland cement process. The high temperature required for calcination of the limestone and other reactants is typically generated in a coal fired rotary kiln.

It has been shown by example that the addition of the coproduct to the cement feedstock stream into the lower section of the preheater stage located above the top section of the rotary kiln enhances the production of cement. Two key enhancements are observed. Firstly, there is a reduction in the amount of the primary fuel source for the kiln due to the BTU value of the added coproduct. Secondly, the calcium carbonate fraction of the coproduct is incorporated into the calcined incoming limestone feed and assimilated into the final cement product. This reduces the amount of limestone needed from a quarry.

Trials were performed at the Blue Circle Cement Company manufacturing plant in Harleyville, S.C. Coproduct was introduced to the preheater section of the kiln at flow rates ranging from 2 to 6.5 tons/hour. A reduction in the quantity of primary fuel coal consistent with the BTU value of the coproduct was observed. Additionally, the added calcium carbonate fraction in the coproduct was converted into cement of acceptable quality.

Experiment 5: Roofing Membrane

A roofing membrane is made using preferably about 5 to about 50 weight percent of the present composition.

What is claimed is:

1. A composition comprising:
   a binder comprising asphalt and
   a residue wherein said residue is a coproduct of the medium pressure depolymerization of nylon 6 waste carpet and comprises a blend of polypropylene, styrene butadiene resin and calcium carbonate and essentially no residual nylon 6 polyamide material.

2. The composition of claim 1 wherein said composition has improved hardness compared to said asphalt alone.

3. The composition of claim 1 wherein said composition has improved rut resistance compared to said asphalt alone.

4. The composition of claim 1 wherein said composition has improved fatigue resistance compared to said asphalt alone.

5. The composition of claim 1 wherein said composition has improved healing compared to said asphalt alone.

6. The composition of claim 1 wherein said residue comprises about 2 to about 50 weight percent of said composition.

7. The composition of claim 1 wherein said residue acts as a plasticizer and wherein said residue is present at about 7.5 weight percent.

8. The composition of claim 1 wherein said asphalt has a performance grade of PG 58-28, said residue is present at about 20 weight percent, and said composition has a performance grade of PG 76-28.

9. The composition of claim 1 wherein said polypropylene has a weight average molecular weight from about 9,700 daltons to equal to or less than about 10,000 daltons.

10. The composition of claim 1 wherein said depolymerization is in the absence of added catalyst.

11. The composition of claim 1 further comprising aggregate.

12. The composition of claim 1 wherein said blend comprises about 63% by weight said calcium carbonate, about 18% by weight said polypropylene, and about 19% by weight said styrene butadiene rubber.

13. A method comprising the step of: determining the performance grade of a composition using a plot of G' versus G" wherein said composition comprises a binder and a residue wherein said binder is asphalt and wherein said residue is a coproduct of the medium pressure depolymerization of nylon 6 waste carpet and comprises a blend of polypropylene, styrene butadiene rubber and calcium carbonate and essentially no residual nylon 6 polyamide material.

14. The method of claim 13 wherein said residue comprises about 2 to about 50 weight percent of said composition.

15. The method of claim 13 wherein said blend comprises about 63% by weight said calcium carbonate, about 18% by weight said polypropylene, and about 19% by weight said styrene butadiene rubber.

\* \* \* \* \*